(12) United States Patent
Wussow et al.

(10) Patent No.: US 12,527,858 B2
(45) Date of Patent: Jan. 20, 2026

(54) MVA VECTORS FOR EXPRESSING MULTIPLE CYTOMEGALOVIRUS (CMV) ANTIGENS AND USE THEREOF

(71) Applicant: CITY OF HOPE, Duarte, CA (US)

(72) Inventors: Felix Wussow, Glendora, CA (US); Don J. Diamond, Glendora, CA (US)

(73) Assignee: CITY OF HOPE, Duarte, CA (US)

( * ) Notice: Subject to any disclaimer, the term of this patent is extended or adjusted under 35 U.S.C. 154(b) by 686 days.

(21) Appl. No.: 17/095,318

(22) Filed: Nov. 11, 2020

(65) Prior Publication Data

US 2021/0060155 A1 Mar. 4, 2021

Related U.S. Application Data

(63) Continuation of application No. PCT/US2018/042054, filed on Jul. 13, 2018.

(60) Provisional application No. 62/670,607, filed on May 11, 2018.

(51) Int. Cl.
 *A61K 39/245* (2006.01)
 *A61P 31/20* (2006.01)
 *C12N 15/86* (2006.01)

(52) U.S. Cl.
 CPC ............ *A61K 39/245* (2013.01); *A61P 31/20* (2018.01); *C12N 15/86* (2013.01)

(58) Field of Classification Search
 CPC .. A61K 39/245; A61K 2039/53; A61K 39/12; A61P 31/20; A61P 31/22; C12N 15/86; C12N 2710/16134; C07K 16/08
 See application file for complete search history.

(56) References Cited

U.S. PATENT DOCUMENTS

| | | |
|---|---|---|
| 2004/0265325 A1 | 12/2004 | Diamond et al. |
| 2005/0244428 A1 | 11/2005 | Howley et al. |
| 2008/0187545 A1 | 8/2008 | Shenk et al. |
| 2010/0143402 A1* | 6/2010 | Moss ................ C12N 15/86 435/235.1 |
| 2010/0316667 A1 | 12/2010 | Diamond et al. |
| 2013/0142823 A1 | 6/2013 | Picker et al. |
| 2014/0030292 A1 | 1/2014 | Franti et al. |
| 2015/0216965 A1* | 8/2015 | Diamond ................ C12N 7/00 435/320.1 |
| 2017/0119874 A1 | 5/2017 | Lanzavecchia et al. |
| 2017/0246292 A1 | 8/2017 | Diamond et al. |
| 2019/0321464 A1* | 10/2019 | Ciaramella ........ A61K 31/7115 |

FOREIGN PATENT DOCUMENTS

| | | |
|---|---|---|
| CN | 1653184 A | 8/2005 |
| CN | 104853772 A | 8/2015 |
| JP | 2015-524271 A | 8/2015 |
| JP | 2017-503482 A | 2/2017 |
| WO | 03/097845 A1 | 11/2003 |
| WO | 2014/018117 A1 | 1/2014 |
| WO | 2014/048500 A1 | 4/2014 |
| WO | 2014/068001 A1 | 5/2014 |
| WO | 2015/082570 A1 | 6/2015 |

OTHER PUBLICATIONS

Pavon-Eternod M, David A, Dittmar K, Berglund P, Pan T, Bennink JR, Yewdell JW. Vaccinia and influenza A viruses select rather than adjust tRNAs to optimize translation. Nucleic Acids Res. Feb. 1, 2013;41(3):1914-21. Epub Dec. 18, 2012. (Year: 2012).*
Adler, S. P., et al., "Immunity Induced by Primary Human Cytomegalovirus Infection Protects against Secondary Infection among Women of Childbearing Age," J. Infect. Dis. 171:26-32 (1995).
Anderholm, K.M., et al., "Cytomegalovirus Vaccines: Current Status and Future Prospects," Drugs 76(17):1625-1645 (2016).
Andreoni, M., et al., "A Rapid Microneutralization Assay for the Measurement of Neutralizing Antibody Reactive with Human Cytomegalovirus," J. Virol. Meth. 23:157-168 (1989).
Bernstein, D. I., et al., "Safety and efficacy of a cytomegalovirus glycoprotein B (gB) vaccine in adolescent girls: a randomized clinical trial," Vaccine 34(3):313-319 (2016).
Britt, W., "Manifestations of Human Cytomegalovirus Infection: Proposed Mechanisms of Acute and Chronic Disease," Curr. Topics Microbiol. Immunol. 325:417-470 (2008).
Britt, W., "Controversies in the Natural History of Congenital Human Cytomegalovirus Infection: The Paradox of Infection and Disease in Offspring of Women with Immunity Prior to Pregnancy," Med. Microbiol. Immunol. 204:263-271 (2015).
Britt, W. J., "Neutralizing Antibodies Detect a Disulfide-Linked Glycoprotein Complex within the Envelope of Human Cytomegalovirus," Virol. 135:369-378 (1984).
Britt, W. J., et al., "Identification of a 65 000 Dalton Virion Envelope Protein of Human Cytomegalovirus," Virus Res. 4:31-36 (1985).
Britt, W. J., et al., "Induction of complement-dependent and -independent neutralizing antibodies by recombinant-derived human cytomegalovirus gp55-116 (gB)," J. Virol. 62(9):3309-3318 (1988).
Britt, W. J., et al., "Congenital human cytomegalovirus infection and the enigma of maternal immunity," J. Virol. 91:e02392-16 (2017).
Cannon, M. J., et al., "Washing our hands of the congenital cytomegalovirus disease epidemic," BMC Public Health 5:70 (2005).
Cannon, M. J., et al., "Awareness of and behaviors related to child-to-mother transmission of cytomegalovirus," Prev. Med. 54(5):351-357 (2012).
Center for Disease Control and Prevention, "Impact of expanded newborn screening—United States, 2006," MMWR: Morbidity and Mortality Weekly Report 57(37):1012-1015 (2008).

(Continued)

*Primary Examiner* — Rachel B Gill
(74) *Attorney, Agent, or Firm* — Perkins Coie LLP; Lara J. Dueppen

(57) ABSTRACT

An expression system for co-expressing multiple human cytomegalovirus (HCMV) antigens to stimulate potent humoral and cellular immune responses against HCMV infection. The expression system may include a vector inserted with multiple nucleic acid sequences that encode multiple subunits of HCMV antigens linked by one or more linking sequences such that the subunits are coexpressed simultaneously. Vaccine compositions comprising the expression system or the vector and methods of preventing or treating HCMV infections using the vaccine compositions.

19 Claims, 40 Drawing Sheets

Specification includes a Sequence Listing.

(56) References Cited

OTHER PUBLICATIONS

Chiuppesi, F., et al., "Vaccine-derived neutralizing antibodies to the human cytomegalovirus gH/gL pentamer potently block primary cytotrophoblast infection," J. Virol. 89(23):11884-11898 (2015).

Chiuppesi, F., et al., "Identification of a continuous neutralizing epitope within UL128 of human cytomegalovirus," J. Virol. 91:e01857-16 (2017).

Chiuppesi, F., et al., "Comparison of homologous and heterologous prime-boost vaccine approaches using Modified Vaccinia Ankara and soluble protein to induce neutralizing antibodies by the human cytomegalovirus pentamer complex in mice," PLoS One 12(8):e0183377 (2017).

Chiuppesi, F., et al., "Multiantigenic modified vaccinia virus ankara vaccine vectors to elicit potent humoral and cellular immune reponses against human cytomegalovirus in mice," J. Virol. 92(19):e01012-e01018 (2018).

Cottingham, M. G., et al., "Recombination-mediated genetic engineering of a bacterial artificial chromosome clone of modified vaccinia virus Ankara (MVA)," PLoS One 3(2):e1638 (2008).

Cottingham, M. G., et al., "Rapid generation of markerless recombinant MVA vaccines by en passant recombineering of a self-excising bacterial artificial chromosome," J. Virol. Meth. 168:233-236 (2010).

Diamond, D. J., et al., "Development of a candidate Hla A*0201 restricted peptide-based vaccine against human cytomegalovirus infection," Blood 90(5):1751-1767 (1997).

Draper, S. J., et al., "Utilizing poxviral vectored vaccines for antibody induction—Progress and prospects," Vaccine 31:4223-4230 (2013).

Earl, P. L., et al., "Generation of recombinant vaccinia viruses," Curr. Protoc. Protein Sci. 89:5.13.1-5.13.18 (2018).

European Patent Office, Partial Supplementary European Search Report dated Feb. 15, 2022 for European Patent Application No. 18918002.9, 21 pages.

Fowler, K. B., et al., "Maternal Immunity and Prevention of Congenital Cytomegalovirus Infection," JAMA 289(8):1008-1011 (2003).

Gardner, T. J., et al., "Virion glycoprotein-mediated immune evasion by human cytomegalovirus: a sticky virus makes a slick getaway," Microbiol. Mol. Biol. Rev. 80(3):663-677 (2016).

Gerna, G., et al., "Monoclonal antibodies to different components of the human cytomegalovirus (HCMV) pentamer gH/gL/pUL128L and trimer gH/gL/gO as well as antibodies elicited during primary HCMV infection prevent epithelial cell syncytium formation," J. Virol. 90(14):6216-6223 (2016).

Gibson, L., et al., "Reduced frequencies of polyfunctional CMV-specific T cell responses in infants with congenital CMV infection," J. Clin. Immunol. 35(3):289-301 (2015).

Gilbert, S. C., "Clinical Development of Modified Vaccinia Virus Ankara Vaccines," Vaccine 31:4241-4246 (2013).

Griffiths, P. D., et al., "Cytomegalovirus glycoprotein-B vaccine with MF59 adjuvant in transplant recipients: a phase 2 randomized placebo-controlled trial," Lancet 377:1256-1263 (2011).

Hahn, G., et al., "Human cytomegalovirus UL131-128 genes are indispensable for virus growth in endothelial cells and virus transfer to leukocytes," J. Virol. 78(18):10023-10033 (2004).

Heldwein, E. E., et al., "gH/gL supercomplexes at early stages of herpesvirus entry," Curr. Opin. Virol. 18:1-8 (2016).

Itell, H. L., et al., "Maternal immune correlates of protection against placental transmission of cytomegalovirus," Placenta 60(Suppl. 1):S73-S79 (2017).

Jackson, S. E., et al., "Human Cytomegalovirus Immunity and Immune Evasion," Virus Res. 157:151-160 (2011).

Japanese Patent Office, Office Action dated May 31, 2022 for Japanese Patent Application No. 2020-563641, 10 pages with English translation.

Japanese Patent Office, Notice of Allowance dated Aug. 8, 2023 for Japanese Patent Application No. 2020-563641, 3 pages. No English translation available.

John, S., et al., "Multi-antigenic human cytomegalovirus mRNA vaccines that elicit potent humoral and cell-mediated immunity," Vaccine 36:1689-1699 (2018).

Kabanova, A., et al., "Antibody-driven design of a human cytomegalovirus gHgLpUL128L subunit vaccine that selectively elicits potent neutralizing antibodies," PNAS 111(50):17965-17970 (2014).

Kim, J. H., et al., "High cleavage efficiency of a 2A peptide derived from porcine teschovirus-1 in human cell lines, zebrafish and mice," PLoS One 6(4):e18556 (2011).

Klenerman, P., et al., "T Cell Responses to Cytomegalovirus," Nat. Rev. Immunol. 16:367-377 (2016).

Koszinowski, U. H., et al., "The Role of CD4 and CD8 T Cells in Viral Infections," Curr. Opin. Immunol. 3:471-475 (1991).

Krishnan, A., et al., "A novel approach to evaluate the immunogenicity of viral antigens of clinical importance in HLA transgenic murine models," Immunol. Lett. 120(1-2):108-116 (2008).

Lacey, S. F., et al., "Characterization of immunologic properties of a second HLA-A2 epitope from a granule protease in CML patients and HLA-A2 transgenic mice," Blood 118(8):2159-2169 (2011).

La Rosa, C., et al., "The immune response to human CMV," Future Virol. 7(3):279-293 (2012).

La Rosa, C., et al., "MVA vaccine encoding CMV antigens safely induces durable expansion of CMV-specific T cells in healthy adults," Blood 129(1):114-125 (2017).

Lilleri, D., et al., "Maternal Immune Correlates of Protection from Human Cytomegalovirus Transmission to the Fetus After Primary Infection in Pregnancy," Rev. Med. Virol. 27:e1921 (2017).

Loomis, R. J., et al., "Vectored co-delivery of human cytomegalovirus gH and gL proteins elicits potent complement-independent neutralizing antibodies," Vaccine 31:919-926 (2013).

Macagno, A., et al., "Isolation of human monoclonal antibodies that potently neutralize human cytomegalovirus infection by targeting different epitopes on the gH/gL/UL128-131A complex," J. Virol. 84(2):1005-1013 (2010).

Manicklal, S., et al., "The "silent" global burden of congenital cytomegalovirus," Clin. Microbiol. Rev. 26(1):86-102 (2013).

Manuel, E. R., et al., "Intergenic region 3 of modified vaccinia Ankara is a functional site for insert gene expression and allows for potent antigen-specific immune responses," Virol. 403(2):155-162 (2010).

Murphy, E., et al., "Human Cytomegalovirus Genome," Curr. Topics Microbiol. Immunol. 325:1-19 (2008).

Nimmerjahn, F., et al., "Fcγ receptors: Old friends and new family members," Immunity 24:19-28 (2006).

O'Connor, C. M., et al., "A myeloid progenitor cell line capable of supporting human cytomegalovirus latency and reactivation, resulting in infectious progeny," J. Virol. 86(18):9854-9865 (2012).

Parekh, B. S., et al., "Development and validation of an antibody-dependent cell-mediated cytotoxicity-reporter gene assay," mAbs 4(3):310-318 (2012).

Pascolo, S., et al., "HLA-A2.1-restricted education and cytolytic activity of CD8+ T lymphocytes from β2 microglobulin (β2m) HLA-A2.1 monochain transgenic H-2D$^b$ βm double knockout mice," J. Exp. Med. 185(12):2043-2051 (1997).

Pass, R. F., et al., "Vaccine prevention of maternal cytomegalovirus infection," N. Engl. J. Med. 360(12):1191-1199 (2009).

Permar, S. R., et al., "Advancing our understanding of protective maternal immunity as a guide for development of vaccines to reduce congenital cytomegalovirus infections," J. Virol. 92(7):e00030-18 (2018).

Plotkin, S. A., "Complex correlates of protection after vaccination," Vaccines 56:1458-1465 (2013).

Potzsch, S., et al., "B cell repertoire analysis identifies new antigenic domains on glycoprotein B of human cytomegalovirus which are target of neutralizing antibodies," PLoS Pathog. 7(8):e1002172 (2011).

Rawlinson, W. D., et al., "Congenital Cytomegalovirus Infection in Pregnancy and the Neonate: Consensus Recommendations for Prevention, Diagnosis, and Therapy," Lancet Infect. Dis. 17:e177-188 (2017).

(56) References Cited

OTHER PUBLICATIONS

Rohrlich, P.S., et al., "HLA-B*0702 transgenic, H-2K$^b$D$^b$ double-knockout mice: Phenotypical and functional characterization in response to influenza virus," Int. Immunol. 15(6):765-772 (2003).
Ryckman, B. J., et al., "Characterization of the human cytomegalovirus gH/gL/UL128-131 complex that mediates entry into epithelial and endothelial cells," J. Virol. 82(1):60-70 (2008).
Schleiss, M. R., "Cytomegalovirus vaccine development," Curr. Top. Microbiol. Immunol. 325:361-382 (2008).
Schleiss, M. R., "Guinea pig cytomegalovirus (GPCMV): A model for the study of the prevention and treatment of maternal-fetal transmission," Future Virol. 5(2):207-217 (2010).
Schleiss, M. R., "Cytomegalovirus in the neonate: Immune correlates of infection and protection," Clin. Dev. Immunol. 2013:501801 (2013).
Schleiss, M. R., "Cytomegalovirus vaccines under clinical development," J. Virus Eradication 2:198-207 (2016).
Schleiss, M. R., et al. "Progress toward development of a vaccine against congenital cytomegalovirus infection," Clin. Vaccine Immunol. 24(12):300268-17 (2017).
Schmelz, M., et al., "Assembly of vaccinia virus: The second wrapping cisterna is derived from the trans golgi network," J. Virol. 68(1):130-147 (1994).
Shedlock, D. J., et al., "Vaccination with synthetic constructs expressing cytomegalovirus immunogens is highly T cell immunogenic in mice," Hum. Vaccines Immunother. 8(11):1668-1681 (2012).
Simpson, J. A., et al., "Neutralizing monoclonal antibodies that distinguish three antigenic sites on human cytomegalovirus glycoprotein H have conformationally distinct binding sites," J. Virol. 67(1):489-496 (1993).
Sylwester, A. W., et al., "Broadly targeted human cytomegalovirus-specific CD4+ and CD8+ T cells dominate the memory compartments of exposed subjects," JEM 202(5):673-685 (2005).
Sutter, G., et al., "Nonreplicating vaccinia vector efficiently expresses recombinant genes," Proc. Natl. Acad. Sci. USA 89:10847-10851 (1992).
Sutter, G., et al., Vaccinia vectors as candidate vaccines: The development of modified vaccinia virus Ankara for antigen delivery Curr. Drug Targets Infect. Disord. 3:263-271 (2003).
Tan, T., et al., "Pertussis Across the Globe: Recent Epidemiologic Trends From 2000 to 2013," Pediatr. Infect. Dis. J. 34:e222-232 (2015).
Tischer, B. K., et al., "Two-step red-mediated recombination for versatile high-efficiency markerless DNA manipulation in *Escherichia coli*," BioTechniques 40:191-197 (2006).
Tischer, B. K., et al., "A self-excisable infectious bacterial artificial chromosome clone of varicella-zoster virus allows analysis of the essential tegument protein encoded by *ORF9*," J. Virol. 81(23):13200-13208 (2007).
Tischer, B. K., et al., "*En passant* mutagenesis: A two step markerless red recombination system," Meth. Mol. Biol. 634:421-430 (2010).

United States Patent and Trademark Office, International Search Report and Written Opinion dated Oct. 22, 2018 for PCT/US2018/042054, 12 pages.
Wang, D., et al., "Human cytomegalovirus virion protein complex required for epithelial and endothelial cell tropism," PNAS 102(50):18153-18158 (2005).
Wang, Z., et al., "Recombinant modified vaccinia virus Ankara expressing a soluble form of glycoprotein B causes durable immunity and neutralizing antibodies against multiple strains of human cytomegalovirus," J. Virol. 78(8):3965-3976 (2004).
Wang, Z., et al., "Modified H5 promoter improves stability of insert genes while maintaining immunogenicity during extended passage of genetically engineered MVA vaccines," Vaccine 28:1547-1557 (2010).
Wen, Y., et al., "Human cytomegalovirus gH/gL/UL128/UL130/UL131A complex elicits potently neutralizing antibodies in mice," Vaccine 32:3796-3804 (2014).
Willie, P. T., et al., "A human cytomegalovirus gO-null mutant fails to incorporate gH/gL into the virion envelope and is unable to enter fibroblasts and epithelial and endothelial cells," J. Virol. 84(5):2585-2596 (2010).
Willie, P. T., et al., "Human cytomegalovirus (HCMV) glycoprotein gB promotes virus entry in trans acting as the viral fusion protein rather than as a receptor-binding protein," mBio 4(3):e00332-13 (2013).
Wussow, F., et al., "Red-mediated transposition and final release of the mini-F vector of a cloned infectious herpesvirus genome," PLoS One 4(12):e8178 (2009).
Wussow, F., et al., "A vaccine based on the rhesus cytomegalovirus UL128 complex induces broadly neutralizing antibodies in rhesus macaques," J. Virol. 87(3):1322-1332 (2013).
Wussow, F., et al., "Human cytomegalovirus vaccine based on the envelope gH/gL pentamer complex," PLoS Pathog. 10(11):e1004524 (2014).
Wussow, F., et al., "Neutralization of human cytomegalovirus entry into fibroblasts and epithelial cells," Vaccines 5:39 (2017).
Wussow, F., et al., "Exploiting 2A peptides to elicit potent neutralizing antibodies by a multi-subunit herpesvirus glycoprotein complex," J. Virol. Meth. 251:30-37 (2018).
Wyatt, L. S., et al., "Elucidating and minimizing the loss by recombinant vaccinia virus of human immunodeficiency virus gene expression resulting from spontaneous mutations and positive selection," J. Virol. 83(14):7176-7184 (2009).
Zhong, J., et al., "Induction of pluripotent protective immunity following immunization with a chimeric vaccine against human cytomegalovirus," PLoS One 3(9):e3256 (2008).
Zhou, M., et al., "Human cytomegalovirus gH/gL/gO promotes the fusion step of entry into all cell types, whereas gH/gL/UL128-131 broadens virus tropism through a distinct mechanism," J. Virol. 89:8999-9009 (2015).
China National Intellectual Property Administration, First Office Action mailed Dec. 9, 2023 for Chinese Patent Application No. 201880095572.9, 41 pages with unofficial English translation.

* cited by examiner

MVA$^B$-7Ag1

MVA$^B$-7Ag2

MVA$^B$-7Ag3

MVA$^B$-7Ag4

MVA^B-7Ag5

MVA^B-7Ag6

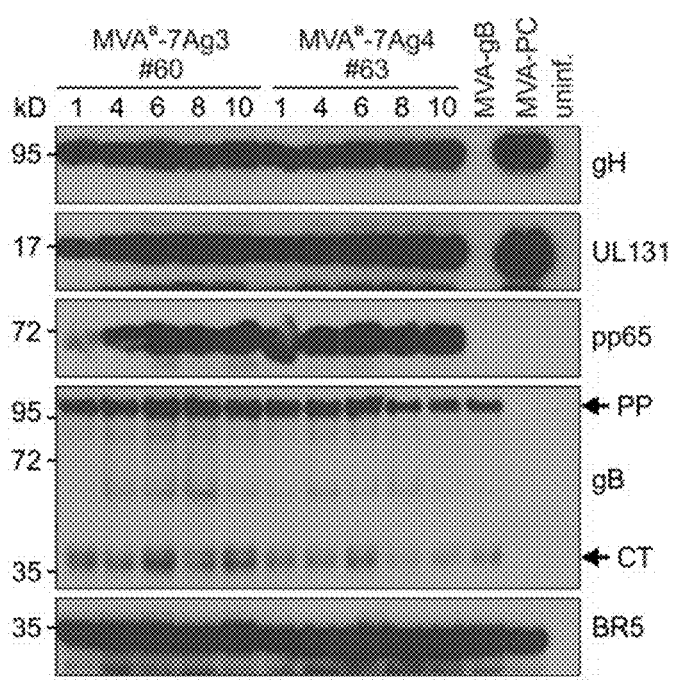

MVA$^B$-8Ag1

MVA$^B$-8Ag2

MVA VECTORS FOR EXPRESSING MULTIPLE CYTOMEGALOVIRUS (CMV) ANTIGENS AND USE THEREOF

PRIORITY CLAIM

This application is a continuation of International Application No. PCT/US2018/042054, filed Jul. 13, 2018, which claims priority to U.S. Provisional Application No. 62/670,607, filed May 11, 2018, which is incorporated by reference herein in its entirety, including drawings.

STATEMENT OF GOVERNMENT INTEREST

This invention was made with government support under Grant Numbers AI103960 and AI063356, awarded by the National Institutes of Health. The government has certain rights in the invention.

SEQUENCE LISTING

This application contains a Sequence Listing, which was submitted in ASCII format via EFS-Web, and is hereby incorporated by reference in its entirety. The ASCII copy, created on Nov. 11, 2020, is named SequenceListing.txt and is 21 KB in size.

BACKGROUND

Human cytomegalovirus (HCMV) infection of the developing fetus is the most common infectious cause of permanent birth defects (6, 44), resulting in more congenital disease than all currently tested newborn conditions in the US combined (13). Each year over 5000 children in the US alone suffer from long-term medical conditions caused by intrauterine HCMV infection (11), which most commonly results in auditory and cognitive impairments, but can also lead to more severe consequences including brain calcification, microcephaly, and stillbirth (6, 44). Yet, despite the recognition of HCMV as a major health concern (66), most women are unaware of congenital HCMV infection (12), and interventions to prevent or treat congenital HCMV transmission or disease remain elusive (55). Although many HCMV vaccine strategies have been developed (70), only two approaches based on the live-attenuated vaccine strain Towne or recombinant glycoprotein B (gB) combined with MF59 adjuvant have been evaluated for efficacy to prevent HCMV infection in women of childbearing age (2, 60). While Towne failed to prevent infection in mothers whose children attended dare care (1), gB/MF59 showed 50% efficacy to prevent infection in postpartum HCMV seronegative (HCMV⁻) young women (51). In addition, gB/MF59 showed efficacy to reduce HCMV viremia and need for antiviral therapy in solid organ transplant recipients, whereby gB antibody titers correlated inversely with the reduction in viral load (26). Although 50% efficacy rates could not be reproduced with the gB/MF59 vaccine in HCMV⁻ adolescent girls (4), gB/MF59 remains the only promising vaccine candidate that could reduce the risk of maternal HCMV infection.

As for the development of other viral vaccines (53), special emphasis in developing a congenital HCMV vaccine has been devoted to the induction of neutralizing antibodies (NAb) that prevent in vitro envelope glycoprotein complex-mediated virus entry (59, 70). In the past years it has been recognized that HCMV utilizes distinct routes of entry for the infection of fibroblasts (FB) and epithelial cells (EC) that depend on different sets of envelope glycoprotein complexes (22, 28, 80). While HCMV infection of both FB and EC appears to depend on glycoprotein complexes composed of gM/gN, gB, and gH/gL/gO (78, 79, 89), EC infection additionally requires the pentamer complex (PC) composed of gH, gL, UL128, UL130, and UL131A (27, 57, 74). Consistent with these envelope glycoprotein requirements for HCMV entry, NAb targeting epitopes of gB or gH can effectively interfere with both FB and EC infection (15, 33, 43, 54, 81), and similar inhibitory capacity appears to be mediated by NAb targeting gO or gM/gN (23, 43). In contrast, NAb predominantly recognizing quaternary conformational epitopes of the UL128/130/131A subunits of the PC are unable to prevent FB infection, though they confer exceptionally high potency to block EC entry (15, 33, 43, 80). While it is unclear which glycoprotein combination could optimally promote HCMV NAb induction, preclinical vaccine studies have consistently shown that gB and gH/gL can stimulate high-titer NAb against both FB and EC infection (33, 42), whereby the PC is remarkably immunogenic to elicit NAb that block EC entry (33, 77, 81, 85). However, since the PC elicits NAb that target epitopes of the UL128/130/131A subunits, and additionally NAb that target epitopes of gH (15, 33), the PC alone can elicit potent NAb that prevent HCMV infection of EC and FB (33, 80, 81).

While both humoral and cellular immune responses are thought to be important for preventing congenital HCMV infection (30, 41, 58), HCMV vaccine development is impeded by poorly understood immune correlates of protection, intricate immune evasion mechanisms, and the absence of animal models that are susceptible to HCMV infection (5, 29, 31, 61). In addition, the feasibility and potential health impact of an effective HCMV vaccine is currently vigorously discussed in light of the quandary that congenital HCMV infection can occur in pregnant women as a consequence of either primary infection or recurrent infection resulting from re-infection or virus reactivation (7, 52). Yet, despite the ill-defined protection by pre-existing HCMV immunity, naturally acquired maternal HCMV immunity is considered to provide substantial protection against congenital HCMV infection and disease (21, 30, 52). Under this premise, it is hypothesized that the incidence of congenital infection and severity of congenital disease could be reduced by a vaccine capable of eliciting robust preconceptional HCMV immunity (52, 58).

Besides being a leading cause of congenital infection, HCMV is also a common cause of complications in transplant recipients. In addition, HCMV is associated with other diseases such as atherosclerosis, immunosenescence, and pediatric acute lymphoblastic leukemia. Thus, the development of a multiantigenic HCMV vaccine candidate that stimulates robust humoral and cellular immune responses to potentially prevent HCMV-associated disease in different target populations is highly desirable. This invention satisfies the needs in the field.

SUMMARY

In one aspect, this disclosure relates to an expression system for co-expressing multiple HCMV antigens simultaneously. The expression system may include a vector inserted with multiple nucleic acid sequences that encode multiple HCMV antigens, linked by one or more linking sequences, such that the multiple HCMV antigens can be co-expressed simultaneously. The vector can be a viral vector such as an MVA vector. In some embodiments, the linking sequences is an internal ribosomal entry site (IRES)

or nucleic acid sequences encoding 2A peptides that mediate ribosomal skipping. In some embodiments, the vector is inserted with a single promoter before the multiple nucleic acid sequences such that the single promoter controls the expression of the multiple nucleic acid sequences. In some embodiments, the multiple nucleic acid sequences encoding the multiple HCMV antigens are inserted in only one MVA insertion site. In some embodiments, the multiple nucleic acid sequences encoding the multiple HCMV antigens are inserted in two or more MVA insertion sites. In some embodiments, the HCMV antigen gene sequences can be codon-optimized for vaccine virus expression to enhance their stability within MVA.

In another aspect, a vaccine composition for preventing HCMV infection is provided. The vaccine composition may include a vector capable of co-expressing multiple HCMV antigens simultaneously and a pharmaceutically acceptable carrier, adjuvant, additive or combination thereof. In some embodiments, the two or more HCMV antigens are linked by one or more linking sequences, such that the multiple HCMV antigens can be co-expressed simultaneously. In some embodiments, the linking sequences include RES and nucleic acid sequences encoding 2A peptides. In some embodiments, the vector is inserted with a single promoter before the multiple nucleic acid sequences such that the single promoter controls the expression of the multiple nucleic acid sequences.

In another aspect, a method of preventing or treating HCMV infection is provided. Such a method may include infecting the cell with an effective amount of a viral vector, the viral vector comprising multiple nucleic acids encoding multiple HCMV antigens, linked by one or more linking sequences.

In another embodiment, a method of inducing robust HCMV-specific humoral and cellular immune responses for preventing or treating HCMV infection in a subject is provided. Such a method may include administering a therapeutically effective amount of a vaccine to the subject, wherein the vaccine comprises a vector capable of co-expressing multiple HCMV antigens simultaneously, and a pharmaceutically acceptable carrier, adjuvant, additive (e.g. CD40L) or combination thereof.

According to the embodiments described above, the viral vector is Modified Vaccinia Ankara (MVA) and the expressed HCMV antigens include all five subunits of the envelope pentamer complex (PC; UL128, UL130, UL131A, glycoprotein L (gL), and glycoprotein H (gH)), glycoprotein B (gB), phosphoprotein 65 (pp65), and/or the immediate early 1 and 2 proteins (IE1 and IE2). Other important immune targets such as glycoproteins gM, gN, or gO or antigenic fragments thereof, or any other HCMV antigens or fragments thereof may also be included in the expression system.

BRIEF DESCRIPTION OF THE DRAWINGS

FIG. 1A is a graphic illustration of BAC vector removal. A genomic duplication of the Thymidine kinase (TK) gene sequences and an mRFP expression cassette was inserted by En passant mutagenesis in *E. coli* into the BAC vector sequences (cat, OriS, repE, sopA/B/C, cos, loxP, GFP marker) between the resistance marker (cat) and the OriS bacterial replication origin in MVABAC-TK-derived recombinant MVA$^B$-7Ag1. After virus reconstitution from the recombinant BAC vector in BHK cells, the genomic duplication mediated spontaneous removal of the bacterial vector sequences, and the TK gene was seamlessly restored, resulting in MVA-7Ag1. mH5=modified H5 promoter, P11=Vaccinia P11 promoter, B=BAC vector. FIG. 1B shows confirmation of BAC removal by PCR. BHK cells were infected with MVA$^B$-7Ag1 (with BAC), MVA-7Ag1 (without BAC) or parental MVA, and DNA isolated from the infected cells were investigated by PCR using primers that flank the TK gene (P1 and P2 as indicated in FIG. 1A) to confirm the restoration of the TK gene locus (expected fragments of 1598 bp), and primers pairs specific for the cat and sopA (see FIG. 1A) to verify the removal of residual vector sequences (expected fragments of 580 bp and 476 bp, respectively). Uninfected BHK cells were used as additional control in the PCR analysis.

FIG. 4A-4C show stability tests of the HCMV antigen expression by the seven-antigenic MVA vaccine vectors. Different clones (#) of the seven-antigenic vaccine vectors MVA$^B$-7Ag1, MVA$^B$-7Ag2, MVA$^B$-7Ag3, and MVA$^B$-7Ag4 as illustrated in FIGS. 2A-2D that contained codon-optimized HCMV gene sequence were propagated at low multiplicity of infection via 10 virus passages on BHK cells. Virus from the 10 virus passages (1-10) was used to infect BHK cells, and whole cell lysates of infected BHK cells were evaluated by Immunoblot with polyclonal (UL131A) and monoclonal (gH, UL130, pp65, gB) antibodies specific for the individual antigens. BHK cells infected with previously generated MVA-gB and MVA-PC vectors (81) as well as uninfected cells were used as controls. The vaccinia virus BR5 protein was detected for loading control. PP=precursor protein; CT=C-terminal cleavage product.

FIG. 6A shows immunoblot analysis. Cell lysates of BHK cells infected with MVA-7Ag1 (FIG. 2A; in 6A indicated as MVA$^B$-PC/gB/pp65) or the control vectors expressing only antigen subsets (MVA$^B$-PC/gB, MVA$^B$-PC/pp65, FIG. 3) or single antigens (MVA$^B$-PC, MVA$^B$-gB, MVA$^B$-pp65, FIG. 3) were evaluated by Immunoblot using polyclonal (gL, UL128, UL131A) and monoclonal (gH, UL130, gB, pp65) antibodies specific for the HCMV antigens. The vaccinia virus BR5 protein was detected as loading control. PP=precursor protein; CT=gB C-terminal cleavage product. FIG. 6B shows flow cytometry analysis. Live, non-permeabilized BHK cells infected with MVA$^B$-7Ag1 or the control vectors were evaluated by cell surface flow cytometry analysis using monoclonal NAb targeting conformational epitopes formed by UL128/130/131A (1B2, 12E2) or UL130/131A (54E11), an epitope within UL128 (1365), or epitopes within gH (18F10, 21E9, 62-11, 2-80). The X-axis represents the log 10 of fluorescence intensity, and the y-axis represents cell count. BHK cells infected with MVA expressing the fluorescence marker Venus (MVA-Venus) or uninfected cells were analyzed as controls in FIGS. 6A and 6B.

FIGS. 10A-10B show ADCC. Serial dilutions of immunized mice serum samples were investigated for their ability to induce ADCC following binding to TB40/E (FIG. 10A) or TR (FIG. 10B) infected ARPE-19 cells by using an ADCC surrogate reporter assay. Bars represent standard deviation of duplicates. FIGS. 10C-10D show binding antibodies. gB-specific (10C) and PC-specific (10D) binding IgG endpoint titers were evaluated by ELISA using purified gB and PC protein. Dotted lines in indicate minimum serum dilution analyzed. Bars represent geometric mean with 95% confidence interval. Statistical significance of differences comparing each group was calculated using one-way analysis of variance (ANOVA) followed by Tukey's multiple comparison test (NS=p>0.05).

FIGS. 12A-12C show NAb titers. At the indicated time points over a period of 30 weeks following immunization, NAb titers that prevented 50% infection (NT50) were measured against HCMV strain TB40/E on MRC-5 cells in the absence (12A) or presence (12B) of 5% guinea pig complement and on ARPE-19 cells in the absence of complement (12C). FIG. 12D shows ex vivo T cell responses induced by the vaccinia vectors. Following an additional booster immunization at week 30, ex vivo T cell responses were determined for the immunized mice by IFNγ-ELISPOT utilizing pp65 and gB peptide libraries. Bars in FIGS. 12A-12C represent geometric mean with 95% confidence intervals. Bars in FIG. 12D represent mean with standard deviation. Statistical significance of differences comparing each group was calculated using one-way analysis of variance (ANOVA) followed by Tukey's multiple comparison test.

FIGS. 13A-13B show NT50 titers measured against TB40/E on ARPE-19 cells in the absence of guinea pig complement, and on MRC-5 FB in the absence and presence of 5% guinea pig complement. FIG. 13C shows T cell responses confirmed for the immunized animals via IFNγ-ELISPOT using pp65 and gB libraries. Dotted lines in A and B indicate minimum serum dilution analyzed. Bars in FIGS. 13A and 13B represent 95% conference interval of the geometric mean. Bars in FIG. 13C represent mean values with standard deviation. Statistical significance of differences comparing each group in FIGS. 13A and 13B was calculated using one-way analysis of variance (ANOVA) followed by Sidak's multiple comparison test. Differences between groups in FIG. 13C were calculated by multiple t-test (NS=p>0.05).

FIG. 14C shows T cell responses confirmed for the immunized animals via IFNγ-ELISPOT using pp65 and gB libraries. Dotted lines in FIGS. 14A and 14B indicate minimum serum dilution analyzed. Bars in FIGS. 14A and 14B represent 95% conference interval of the geometric mean. Bars in FIG. 14C represent mean values with standard deviation. Differences between groups were calculated by multiple t-test (NS=p>0.05).

FIGS. 16A-16C show that HLA-B*0702 (B7) transgenic mice (n=5) were immunized two times in four weeks intervals with MVA-7Ag1, MVA$^B$-pp65 (n=5) or MVA-Venus (n=1). One week post immunization, antigen-specific T cell responses were evaluated by multicytokine-ICS following stimulation with pp65- and PC-specific peptide libraries, or a HLA-B*0702-restricted immunodominant pp65 peptide epitope. Shown in the figures are the percentages of CD8+ T cells secreting IFNγ (FIG. 16A), TNFα (FIG. 16B) or IL2 (FIG. 16C) following stimulation of splenocytes from B7 Tg immunized mice with different stimuli. FIGS. 16D-16F show the frequency of antigen-specific CD8+ T cells producing all combinations of IFN-γ, TNF-α and IL-2 cytokines following in vitro stimulation with the HLA-B*0702-restricted pp65 peptide epitope (FIG. 16D), pp65-specific peptide library (FIG. 16E), or PC-specific peptide library (FIG. 16F) in MVA-7Ag1, MVA$^B$-pp65 or MVA-Venus immunized B7 mice. Horizontal bars represent the median values. FIG. 16G are pie charts showing the relative contribution of each polyfunctional subset among the total polyfunctional response to the pp6$_{epitope}$, PP65$_{library}$ or PC$_{library}$ in MVA-7Ag1 or MVA$^B$-pp65 immunized B7 mice. Each pie chart represents the mean response across the immunized mice to the three different antigen stimulations. The average total percentage of CD8+ T cells responding to the peptide stimulation is shown under each pie chart. Polyfunctional subsets and functions (Fn$^+$) are indicated in the legend. Significance of the difference between the groups was calculated using multiple t-test.

FIGS. 17D-17F show the frequency of antigen-specific CD8+ T cells producing all combinations of IFN-γ, TNF-α and IL-2 cytokines following in vitro stimulation with the HLA-A*0201-restricted peptide epitope (FIG. 17D), pp65-specific peptide library (FIG. 17E) or PC-specific peptide library (FIG. 17F) in MVA-7Ag1, MVA$^B$-pp65 or MVA-Venus immunized B7 mice. Horizontal bars represent the median values. FIG. 17G are pie charts showing the relative contribution of each polyfunctional subset among the total polyfunctional response to the pp65$_{epitope}$, pp65$_{library}$ or PC$_{library}$ in MVA-7Ag1 or MVA$^B$-pp65 immunized A2 mice. Each pie chart represents the mean response across the immunized mice to the three different antigen stimulations. Average total percentage of CD8+ T cells responding to the peptide stimulation is shown under each pie chart. Polyfunctional subsets and functions (Fn°) are indicated in the legend. Significance of the difference between the groups was calculated using multiple t-test.

FIGS. 23A and 23B show NAb responses. C57BL/6 mice received two doses one month apart of MVA$^B$-8Ag3, MVA$^B$-8Ag4, or MVA-7Ag5 (as control) and serum NAb titers (NT50) were measured against HCMV strain TB40/E on ARPE-19 cells or MRC-5 fibroblasts in the absence (C−) or presence (C+) of 5% guinea pig complement. No significant differences were determined between the vaccine groups using multiple t-test (NS=p>0.05). Bars represent 95% confidence interval of the geometric mean. FIGS. 23C-23E show cell-mediated responses induced by the eight-antigen vectors MVA$^B$-8Ag3 and MVA$^B$-8Ag4 in HLA-B*0702 transgenic (B7 Tg) C57BL/6 mice (N=3). Splenocytes from B7 Tg mice immunized twice with MVA$^B$-8Ag3, MVA$^B$-8Ag4, or MVA-7Ag5 (as control) were in vitro stimulated with an HLA-B*07-restricted epitope, or a pp65-specific or PC-specific peptide library. Intracellular cytokine staining was performed to quantify the percentage of CD8+ T-cells secreting IFN-γ, TNF-α or IL-2 following peptide stimulation. Mock stimulation was performed with DMSO. Bars represent the mean values with the standard deviation.

FIG. 24 shows examples of P2A sequences (SEQ ID NOS:37-43). Different DNA sequences (P2A1-P2A6) were used herein to encode for the P2A signal peptides between the HCMV antigens as indicated in FIGS. 2, 3, and 18. Lower 6 lines show different P2A signal sequences with mutated nucleotides. The top line shows the amino acid sequences of the P2A peptide.

DETAILED DESCRIPTION

Figure 1A:
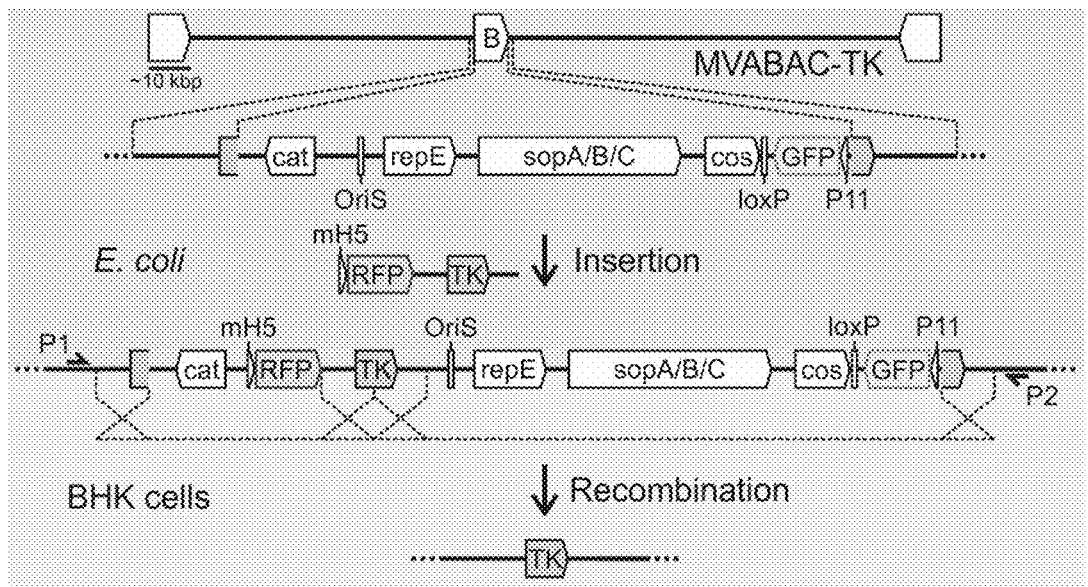
FIGS. 1A-1B show seamless removal of the BAC sequences of MVABAC-TK-derived recombinants expressing multiple HCMV antigens.

Expression systems, vectors, vaccines for use in preventing or treating human cytomegalovirus (HCMV) infection are provided herein. The expression systems, vectors and vaccines, which are described in detail below, generate robust humoral and cellular immune responses against HCMV infections and, hence, can potentially be used to prevent or treat HCMV infections and associated diseases in different target populations, including but not limited to, HCMV seropositive and seronegative pregnant women and hematopoietic stem cell (HSCT) and solid organ transplant (SOT) recipients. This disclosure relates to the simultaneous expression of multiple HCMV antigens or fragments thereof by Modified Vaccinia Ankara (MVA) or other expression systems, vectors, or vaccines to stimulate potent humoral and cellular immune responses against HCMV infections. For example, humoral and cellular immune responses include neutralizing antibodies, antibodies promoting ADCC, CDC, or CDV, and polyfunctional CD4+ and CD8+ T cell responses. In some embodiments, seven or more HCMV antigens are co-expressed simultaneously by MVA. Such a multi-antigenic expression system or vaccine strategy using MVA could be applied to develop vaccines for other infectious diseases and cancer.

In some embodiments disclosed herein, the HCMV antigens can be expressed by viral vectors such as Modified Vaccinia Ankara (MVA). The individual HCMV antigens can be linked by cleavage or self-processing sequences such that the co-expressed subunits can be "self-cleaved" into the individual antigens.

In some embodiments, the expression systems, vectors, vaccines described herein include one or more expression cassettes, each of which includes a single promoter and a sequence that encodes two or more HCMV antigens. In another embodiment, two or more of the HCMV antigens are linked together by RES or 2A sequences so that two or more of the HCMV are expressed via a single transcript using only a single promoter. As a result, multiple HCMV antigens are co-expressed simultaneously while limiting the number of promoter elements and insertion sites needed to express the HCMV antigens. In certain embodiments, each expression cassette includes two, three, four, five, six, seven, eight, or even higher numbers of HCMV antigens, the expression of which is under control of a single promoter. In other embodiments, each expression cassette includes more than ten HCMV antigens. In some embodiments, a vector may include more than one such expression cassette.

Figure 24:
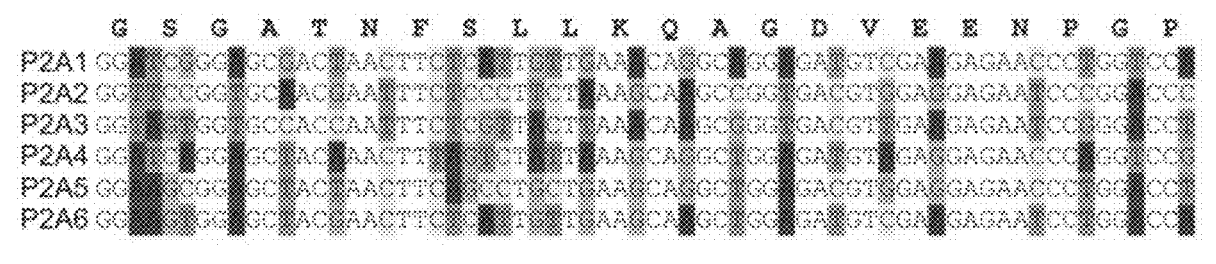

Described herein is a multiantigenic vaccine strategy based on Modified Vaccinia Ankara (MVA) to stimulate robust humoral and cellular immunity against HCMV infection. Such a multi-antigenic vaccine strategy could potentially be used to prevent HCMV-associated diseases in different target populations, including pregnant women or transplant recipients. More specifically, the proposed invention relates to the construction of MVA vectors simultaneously expressing multiple immunodominant HCMV antigens, which can include all five subunits (gH, gL, UL128, UL130, UL131A) of the envelope pentamer complex (PC), glycoprotein B (gB), phosphoprotein 65 (pp65), the immediately-early protein 1 (IE1), and the immediately-early protein 2 (IE2) of HCMV, or any other HCMV protein. These vectors can be constructed either by bacterial artificial chromosome (BAC) technology, homologous recombination in eukaryotic cells, or CRISPR/Cas9 procedures. The HCMV antigens can be either based on their natural DNA sequences or they can be codon-optimized for Vaccinia virus expression. The individual HCMV antigens can be either inserted all together into only one MVA insertion site or separately into two or more commonly or non-commonly used MVA insertion sites. These insertion sites include MVA deletion sites 1 to 6 as well as any intergenic region (IGR) of the 189 designated MVA genes (Accession Nr. U94848). Expression of the HCMV antigens from the MVA vectors can be either induced by endogenous vaccinia promoters or ectopically inserted natural, modified, or artificial vaccinia promoters such as the modified H5 (mH5), pSyn, P11, or p7.5 promoter. Two or more of the simultaneously expressed individual HCMV antigens can be linked by 2A cleavage signals or internal ribosomal entry sites (IRES) to allow polycistronic expression of the individual antigens. The 2A signal sequences can encode for either the 2A peptide of food-and-mouth disease virus (F2A), equine rhinitis A virus (E2A); porcine teschovirus-1 (P2A) or Thoseaasigna virus (T2A). Examples of some 2A signal sequences used herein are shown in FIG. 24. A Furin cleavage site directly preceding the 2A signal sequences can be incorporated to remove the 2A peptides following self-processing of the 2A-linked HCMV polyproteins. As examples for this disclosure, BAC technology is used to generate different recombinant MVA vectors simultaneously expressing all five PC subunits, gB, pp65 of HCMV, or these seven antigens and HCMV IE1, utilizing different combinations of polycistronic and single antigenic expression constructs inserted into two, four, or five MVA insertion sites.

Modified Vaccinia Ankara (MVA) is a widely-used and clinically-deployable poxviral vector to develop vaccines for infectious diseases and cancer. MVA has an excellent safety record in animals and humans, a large capacity and versatile expression system to incorporate and express heterologous DNA sequences, and proven ability to stimulate robust humoral and cellular immune responses against foreign antigens (17, 20, 25).

Described herein is a novel vaccine approach based on Modified Vaccinia Ankara (MVA) to stimulate robust HCMV humoral and cellular immunity by an antigen combination composed of all five PC subunits, gB, and the immunodominant T cell target phosphoprotein 65 (pp65) (69). In addition, provided herein are examples showing that co-expression of the PC subunits and gB by MVA can improve the induction of in vitro measurable antibody responses that mediate HCMV neutralization and antibody-dependent cellular cytotoxicity (ADCC). These findings contribute to the development of multi-antigenic subunit vaccine strategy to prevent or mitigate the sequelae of congenital HCMV infection and suggest a beneficial effect of eliciting humoral immune responses by an antigen combination composed of the PC and gB.

As demonstrated in the working examples, utilizing a BAC system, seven or eight HCMV antigens were assembled in a single MVA vector, whereby the BAC vector can be efficiently removed without leaving behind any traces of bacterial vector sequences. These multi-antigenic MVA vectors can stably co-express all five PC subunits, gB, pp65, and IE1 and elicit robust HCMV humoral and cellular immune responses in mice, including complement-independent and complement-dependent NAb responses preventing FB and EC infection, antibodies promoting ADCC, and antigen-specific mouse and human MHC-restricted T cell responses by all individual antigens. Co-expression of these immunodominant HCMV antigens by the MVA vectors does not significantly interfere with the immunogenicity of the individual antigens, which is in contrast to findings by others (32). On the contrary, co-expression of the PC subunits together with gB by $MVA^B$-7Ag1 augments the induction of in vitro measurable complement-independent and complement-dependent antibody responses that mediate HCMV neutralization and ADCC (FIGS. 9 and 10). These findings could guide the development of a multi-antigenic vaccine strategy to prevent or ameliorate congenital HCMV infection and suggest a beneficial effect of including both the PC subunits and gB in a subunit vaccine formulation to stimulate robust humoral immunity.

Antibodies to gB, gH and the UL128/130/131A subunits as well as CD4+ T cells are important to prevent congenital HCMV infection (29, 30, 62). This may suggest that the induction of antibodies by all of these glycoproteins in addition to CD4+ T cells may be essential for a congenital HCMV vaccine candidate. Preexisting antibody responses that prevent HCMV entry, mediate complement-dependent virolysis, or promote ADCC could be important as a first line of defense to interfere with HCMV acquisition at mucosal membranes, virus dissemination and spread, and transplacental virus transmission at the fetal maternal interface (15, 52). However, since maternal HCMV immunity acquired through natural HCMV infection confers only imperfect protection against congenital infection as a result of recurrent infection (5), the induction of antibodies alone will likely not suffice to completely prevent infection in the either the mother or the fetus. Cytotoxic T cell responses may be important as a second line of defense to contain and clear HCMV infection once maternal infection has occurred at mucosal membranes (35, 36). In addition, T cell responses are well-known to control HCMV reactivation and HCMV-associated disease in transplant patients (38). This may suggest that a vaccine candidate able to boost T cell immunity in HCMV seropositive pregnant women may enhance the control of HCMV reactivation in these women and, consequently, reduce the risk of transferring the virus to the developing fetus.

A few studies indicate that naturally acquired HCMV immunity as a consequence of primary HCMV infection provides substantial protection against re-infection and can significantly reduce the risk of congenital infection in future pregnancies (1, 7, 21). In addition, congenital disease following primary infection is in general considered to be less severe compared to congenital disease following non-primary infection (52). A vaccine candidate capable of inducing immunity similar to that induced by HCMV may therefore afford significant, albeit imperfect protection against congenital HCMV infection and disease in vaccinated HCMV seronegative, pregnant women. Because of the imperfect protection by naturally acquired maternal HCMV immunity, it has been suggested that in order for a congenital HCMV vaccine to be effective, it may need to stimulate immune responses that are quantitatively or qualitatively different from those induced by HCMV during natural infection (52). While vaccine stimulation of sterilizing HCMV immunity may be difficult to achieve (7) licensing of an HCMV vaccine candidate may even be considered by imperfect efficacy rates in light of the health impact of congenital HCMV (52).

Expression Systems, Vectors and Vaccines

According to the embodiments described herein, an HCMV antigen expression system is provided herein. In one embodiment, the antigen expression system may include a cloning vector to clone an expression vector that is able to express one or more HCMV antigens or antigenic fragments thereof.

In one embodiment, the cloning vector is a BAC, which is a DNA construct that may be used to clone a viral vector (e.g. MVA) or other expression vectors by transformation of bacteria (e.g., E. coli). The viral or expression vector may include one or more HCMV antigen sequences. The use of a BAC as a cloning vector allows for stable cloning of very large DNA sequences, and can be easily manipulated using genetic techniques established for E. coli. In some embodiments, the BAC cloning vector is used to clone an expression vector. The expression vector may be a plasmid, a BAC, a viral vector (e.g., adenoviral vectors, adeno-associated viral vectors, RNA viral vectors, lentiviral vectors or retroviral vectors), a viral vector constructed as a BAC, or any other suitable vector that is able to express a recombinant protein, a viral vector or both.

In some embodiments, the expression vector (e.g., the viral vector) is capable of expressing one or more HCMV antigens or immunogenic or antigenic fragments thereof. An immunogenic protein is a protein that, when introduced to a subject, is recognized by the subject's immune cells, thereby stimulating an immune reaction. The immune reaction may result in antibody production (e.g., neutralizing antibody production) or T cell production against that protein. A functional or antigenic fragment of an immunogenic protein is any portion of the protein that contains an antigenic portion of the protein or is an antigenic portion of the protein which may contain at least one epitope. In some embodiments, the one or more immunogenic proteins or functional fragments thereof may be an immunogenic protein complex, which includes a set of immunogenic protein subunits or functional fragments thereof.

In one embodiment, the BAC cloning vector is used to clone a viral expression vector. In such embodiments, the BAC vector is inserted into the genome of the viral vector to generate a virus-BAC construct or plasmid. A bacterial host (e.g., E. coli) is then transfected with the virus-BAC plasmid to clone the viral vector. Transfection of the virus-BAC clones into eukaryotic cells susceptible to infection by the viral vector results in reconstitution of the recombinant virus. The resulting reconstituted viral vectors may then be used to infect target tissues or cells in a host.

In one embodiment, the viral vector is a modified vaccinia Ankara (MVA), which is cloned into the BAC cloning vector ("MVA-BAC") and is able to express one or more HCMV antigens or immunogenic or antigenic fragments thereof. Any suitable MVA strain may be cloned by a BAC in accordance with the embodiments described herein, including, but not limited to the 1974-MVA strain, VR strain or ACAM 3000 strain.

In one embodiment, one or more HCMV antigens include a set of immunogenic protein subunits or functional fragments thereof that are part of an HCMV pentamer complex (PC). The HCMV PC is a HCMV protein complex that includes the following five immunogenic protein subunits or functional fragments thereof: UL128, UL130, UL131A, gL, and gH. Co-expression of all five of the PC subunits is required in single cells to obtain functional expression and to stimulate potent NAb responses against conformational epitopes that reside within the UL128/130/131A subunits. Therefore, a single delivery vector is needed, since there is no current generally acceptable approach to guide >1 individual DNA or viral vectors to assemble a protein complex in vivo by co-expression of all 5 PC components.

Simultaneous co-expression of the PC complex that includes the UL128, UL130, UL131A, gL, and gH proteins or antigenic fragments thereof by the expression systems and viral vectors described herein results in stimulation of neutralizing antibodies (NAb) by a host's immune system that block HCMV infection of susceptible cells such as epithelial and endothelial cells and fibroblasts.

In other embodiments, the expression vector may include additional HCMV proteins including, but not limited to, pp65, gB, IE1, IE2, gM, gN, gO, and other suitable antigenic HCMV proteins known in the art. These additional genes may be inserted into a first expression vector with the PC subunits, or alternatively, may be inserted into a second expression vector to be administered in combination with the first expression vector. In some embodiments, all subunits are inserted into the same insertion site of an MVA or MVA-BAC vector. In other embodiments, one or more subunits are inserted into two or more different insertion sites of an MVA or MVA-BAC vector. In other embodiments, two or more of the antigen gene sequences may be expressed via P2A-linked polycistronic expression constructs According to the embodiments described herein, an immunization regimen is provided. The immunization regimen may include plasmids, viral vectors, live-attenuated viruses, purified protein, or virus-like particles that express or comprise the HCMV antigens. The immunization regimen may be administered via prime/boost homologous (e.g. using only the same vaccine type) or heterologous (e.g using different vaccine types) vaccination. The immunization regimen may be administered in a dose vaccination schedule involving two or more immunizations, which may be administered 2 weeks to 6 months apart.

In other embodiments, the MVA vector described above may be a priming immunization. In such a case, the aforementioned primes can also be used as booster vectors after one or more (e.g., one, two, three, four, or more) consecutive MVA immunizations. Alternatively, priming and boosting vectors can alternate such that the heterologous immunization will include an MVA or alternate vector as a prime followed by MVA or an alternate vector as a boost from 1 to 4 times as an example. Other suitable immunization schedules or regimens that are known in the art may be used according to the embodiments described herein by those skilled in the art.

According to some embodiments, the nucleic acid sequences encoding two or more HCMV antigens are assembled into a single vector, with a linking sequence inserted between the nucleic acid sequences encoding two or more subunits. For example, the HCMV PC subunits may be linked through linking sequences such as internal ribosome entry sites (IRES), derived from a number of different RNA viruses that are well known in the art, or sequences encoding 2A peptides, to link all or a portion of the subunits in one insertion site or multiple insertion sites as polycistronic expression constructs. The 2A signal sequence encoding a 2A peptide of foot-and-mouth disease virus (F2A), a 2A peptide of equine rhinitis A virus (E2A), a 2A peptide of porcine teschovirus-1 (P2A), a 2A peptide of cytoplasmic polyhedrosis virus (BmCPV 2A), a 2A peptide of flacherie virus (BmIFV 2A), or a 2A peptide of Thosea asigna virus (T2A), can be used.

In one embodiment, the HCMV gene sequences inserted into the viral or expression vector may be based on the natural DNA sequence. In other embodiments, the HCMV gene sequences may be optimized for expression and stability within the viral or expression vector. As provided in the examples herein, the HCMV gene sequences inserted into the multi-antigenic MVA vectors may be optimized for Vaccinia virus codon usage, resulting in modified gene sequences with low G/C content that may be better tolerated by MVA. These modified HCMV gene sequences or the natural HCMV gene sequences inserted into MVA may be "silently" mutated (e.g without affecting the amino acid sequence of the encoded protein) to remove sequences composed of more than four nucleotides of the same type in row. This modification has been shown to enhance the stability of antigens within MVA (87). Some non-limiting examples of the codon-optimized HCMV antigen sequences used in this disclosure are listed below:

```
Codon-optimized gH sequence (SEQ ID NO: 1):
atgagaccgggtttgccattctatcttactgtatttgcagtctatt tattgtcgcatttgccttcgcaaagatatggtgctgatgcag cttcagaggcattagatccacacgcatttcatctattgctaaacac ctacggaagacctattagatttctacgagagaatact actcagtgtacatataacagttcgctaagaaatagtacggtagtca gagagaatgctatcagtttcaatttcttccaatcctat aatcaatattatgtatttcatatgccacgttgtctatttgctggtc ctcttgctgaacagtttcttaatcaggtggacttaacagaaa ccctagaaagataccaacaaagattgaatacatatgctctagtttc caaggatcttgcgtcttaccgatcatttagtcaacaa cttaaagctcaggactccttaggacaacaaccaactacagtgccac cgccgatttaagtattccacatgtttggatgc cgccacaaacaacacctcacgattggaaaggatcacatactacatc tggtctacacagacctcatttcaatcagacgtgta ttctattcgatggtcacgatctactattcagtacagtaactccatg tctacaccaaggattctatttaatggatgaacttcgttatg taaagataacgctaacggaagatttcttcgtagtcactgtatcaat tgatgacgacacacctatgttacttatctttggtcatcta cctagagtattatttaaggcgccatatcaaagagataacttcatac taagacaaaccgagaagcatgaacttctagtccta gttaagaagacacaacttaatagacattcatatttgaaagactctg actttcttgatgcagcgttggatttcaattatcttgacttg tcagccttgttaagaaactcatttcatcgatatgcagttgatgtgt taaagtctggtagatgtcaaatgcttgatagaagaacg gttgaaatggcattcgcatatgcgttggcactatttgctgcggcta gacaggaagaggcaggaacagaaatatctataccc agagctttggatcgacaagctgcactactacaaattcaggaattca tgattacgtgtttatcacagactccaccacgtacca cgttattgttatatcctactgctgtcgatctagcaaagagagcttt atggacgccggaccaaattactgatattacaagtcttgtt agactagtttatattctaagtaaacagaatcaacagcatcttattc ctcaatgggcacttagacaaattgcagatttcgcgctt caacttcataagacccatctagctagtttcttatctgcatttgcac gtcaagaattgtatttgatgggatctttggttcatagtatgtt agttcatacgaccgaaagacgtgaaatcttcattgtcgaaactggt ttgtgctctctagcagaattatcacatttcactcaatta ctagctcatccacatcatgaatatttatcagatttgtatacaccgt gtagtagtagtggaagaagagatcactcgttggaaag attgacgagattattcccggatgcaacagtgcccgcaactgtacca gcagcccttcaatattgtccactatgcaacctagta ctttagaaacgtttcctgatctattctgtttaccattgggagagtc tttctctgcgttgactgtttcagagcatgtctcatatgttgtta caaatcaatatttaattaaaggaatttcatatcctgtatcaacaac tgttgtaggtcaaagtttgatcataacgcaaaccgact cacagagtaagtgtgaattgactagaaatatgcatactacacattc catcactgctgccttgaatatatcgttagagaattgtg cattctgtcagtcagcattattagaatatgacgatacacagggtgt gataaacattatgtacatgcatgattcggatgatgtatt attcgcattggatccctataatgaagtagtggtttccagtcctaga acacattatttaatgttactaaagaatggaacagtactt gaggtaacggatgtagtcgtagacgcaacggatagtagattgctaa tgatgtctgtatatgctttatcggcaatcattggaat atatctactatatagaatgttgaagacctgt Codon-optimized gL sequence (SEQ ID NO: 2):
atgtgtagacgtcctgattgtggatttagtttctctccgggacctg ttgttctattatggtgttgtttattacttccaatagttagttctgt agctgtttctgttgcaccgaccgcagcagagaaggttccagcagaa tgtcctgagttaactcgaagatgtttacttggagaa gtgtttcaaggagataaatatgaatcttggttaagacctttagtta atgttactggtcgtaatggacctcttttcacagttgatacg atacagaccggtaacacctgaagccgccaacagtgttctacttgac gatgcattcctagatactttggcattgctatataata atcctgatcaattaagagctttactaaccttactatcctctgacac agcgcctagatggatgaccgtgatgagaggatacagt gaatgtggagacggttctccggcggtttatacttgcgtagatgacc tatgtcgtggatatgacctaacgagattgtcctatgga cgatcgatattcactgaacatgtgttaggatttgagttagttccac catccttgtttaatgtcgttgtagccatacgtaatgaagct acgcgtactaaccgtgccgtgagattaccagtatctacagcagcag cacctgagggtattaccttattctatggtttatataat gcagttaaagagttctgcttacgtcatcaattagatccacctttgt tacgtcatttagataagtattatgcaggattaccacctga attgaagcaaacaagagtgaatttgccagcacattcacgttacgga ccacaagcagtggacgcccga Codon-optimized UL128 sequence (SEQ ID NO: 3):
atgagtcctaagaatttgacgcctttcttgacagctttatggtta ttattggatcattccagagttccgagagtgagagcagagg aatgctgtgaatttataaatgtgaatcacccacctgaaagatgcta tgactttaagatgtgtaaccgatttacagttgcattaa
```

-continued gatgtccagatggagaagtttgttactcgccggagaagacagccg agataagaggaattgtcactactatgactcactcg ctaaccagacaagtagtgcataacaaatttaacatcctgtaattat aatccactatacctagaggcagatggacgaattaga tgcggtaaggttaatgataaggctcaatacttgttaggtgcggcc ggatcagttccttatcgatggattaatctagaatatgat aagatcacaagaattgtgggattagaccagtacttagaaagtgtt aagaagcataagagattggatgtctgtcgagctaag atgggatacatgcttcag Codon-optimized UL130 sequence (SEQ ID NO: 4):
Atgctaagattgttattaagacaccactttcattgtctactatta tgcgccgtttgggctacaccctgtctagcatctccgtggtct acgcttacagctaaccagaatcctagtcctttatggtctaaactt acctattccaaacctcacgatgctgctactttctattgccc tttcatttacccctagtcctccaagatctcctttacaattctcggg tttccagagagtgttgacaggtcctgaatgcagaaatgag acattgtatctattgtataacagagagggacaaaccttgtcgaa agatcgagtacatgggttaagaaagtaatctggtatc taagtggaagaaatcaaactatacttcaacgaatgccacgaacag caagtaaaccctccgatggaaatgtacaaatatc agtagaagatgccaagatatttggagcacatatggtacctaagca aactaaattattgagatttgtggttaacgatggtaca agataccagatgtgtgttatgaaattggagtcgtgggcccatgta ttcagagattatagtgtctcatttcaagttagattaacgtt cacggaagctaacaaccaaacgtatacattctgtactcatccgaa tttgattgtt Codon-optimized UL131A sequence (SEQ ID NO: 5):
atgcgtttatgccgagtatggttatctgtatgtttatgcgctgttgt attgggacaatgtcagcgtgaaacagccgagaagaat gattattatagagtgccacattactgggacgcttgttctagagcatta cctgatcaaacaagatataaatatgtggaacaact agttgatcttaccttgaactatcactacgatgcatcgcatggtcttga taactttgatgttctaaagagaattaatgtaacagag gttagtctattgattagtgatttcagaagacagaacagaagaggtgga acaaataaacgtactacctttaacgcggcaggt tctctagcacctcacgcccgttcattagagttctctgtgagattgttt gctaat Codon-optimized pp65 sequence (SEQ ID NO: 6):
atggaatcaagaggtcgaagatgtcctgagatgatctcagtgttagg accgatcagtggacatgtgttgaaggctgtgttct caagaggagacacaccagttcttccacatgaaacaagattgttacaa actggtatccatgttcgagtttcgcagccatctct aatcttagtgtctcagtacactcctgattcgacaccatgtcatagag gagacaatcaactacaagtacaacacacctacttc actggatctgaggtggagaacgtcagtgtgaacgtacacaatcctac tggtagatctatctgtccatctcaagagcctatgtc catctatgtgtatgcgttacctcttaagatgttgaacattccgagta tcaatgtgcaccactatccgtctgcagcagaaagaaa gcaccgacacctaccggtggcagatgctgtaatccacgcaagtggaa agcagatgtggcaagctagattgactgttagt ggtcttgcctggactcgacaacagaaccaatggaaggaacctgatgt atactacactagtgcctttgtatttcctactaagga cgtggctcttagacacgtggtatgcgctcatgagttagtctgttcta tggagaacactagagctacgaagatgcaagtgattg gagatcagtatgtaaaggtatacttggaaagtttctgcgaagatgtt ccgtcaggaaagctattcatgcatgtaacactaggt agtgatgttgaagaagatctaacaatgacacgtaatcctcaaccgtt catgcgaccacatgagcgtaacggattcactgta ctatgtccaaagaatatgatcatcaaacctggaaagatatctcacat catgcttgacgtcgcattcacttcacatgagcactt cggtctattgtgtccgaagtcaattccaggactatctatcagtggta atctactaatgaatggacaacaaatcttcctagaggt acaagcgattagagaaacagtagagctaagacagtatgatcctgttg cggcactattcttcttcgacatcgatcttctactac aacgtggacctcaatactcagaacatccaacattcacatctcaatac agaattcaaggaaagttggagtatcgacatactt gggaccgacatgatgaaggtgcagctcaaggtgatgatgatgtgtgg acctcgggatcagactcagatgaagagttggtt actactgaacgtaagacacctagagttacaggaggaggtgccatggc tggtgcttcaacatcggcaggtcgtaagcgta agtcagcttcgtcggcgacagcatgcacatcaggagtaatgacgaga ggtagacttaaggcagagtcgacagtagctc cagaagaagatactgatgaagattcggataatgaaattcataatcca gctgtctttacatggcctccatggcaggcaggaa tcttggcacgtaaccttgtgccaatggttgctaccgttcaaggacag aacttgaagtatcaagaattcttctgggatgcaaac gacatctatagaatattcgctgaactagaaggagtatggcaacctgc agctcaaccgaagagaagaagacatcgacaa gaagcattgcctggaccttgcatagcatctacgcctaagaagcatag aggt -continued Codon-optimized gB sequence (SEQ ID NO: 7):
atggagagtagaatttggtgtctagttgtctgcgttaacttgtgcat tgtttgcttgggtgcggctgtgtcgtcctcctcgacgcgt ggaacaagtgctacccattcgcaccattcatcccacaccacttccgc ggcccactctcgttcgggttcggtgtcgcaaaga gttacatccagtcaaactgtttctcacggagttaatgagacgatata taacaccactcttaaatacggagacgtcgtcggtgt taatacaacgaaatatccttacagagtgtgctccatggcacaaggaa ctgatcttatacgtttcgagagaaatatcgtttgta catctatgaagcctatcaacgaggatttggatgagggaataatggtg gtctacaagcgtaacatcgtagcacatacatttaa ggtcagagtctatcagaaagtattaacctttcgtcgaagttatgcct acattcacacgacttatcttctaggatcaaacactga gtacgttgcgccaccgatgtgggagatacatcacatcaattctcatt cgcagtgctattcctcgtattcaagagttatcgcggg tacggtcttcgtagcatatcatagagatagttatgagaataagacta tgcagcttatgccagacgattacagtaacacacac agtactcgttatgtgacagttaaagaccaatggcactcccgaggttc aacgtggttgtatcgagaaacttgtaatcttaattgt atggtaacaataacgaccgcccgatcgaaatatccttatcacttctt cgctacatcaacaggtgatgtggtcgacatctcgcc attctataacggtacgaatcgtaacgcctcatactttggagagaatg cggataagttcttcatctttccaaattacactattgtta gtgactttggtcgtccgaactccgcactagagactcatcgattagtc gcgttcttagagcgagccgactcagtcatctcttgg gatatacaagacgagaagaatgttacttgccagttgacgttctggga ggcatcggagagaactattcgttccgaggctgag gactcctaccatttctcctctgcaaagatgacggcaactttcctatc gaagaaacaggaggtcaacatgtcggattctgccct tgactgtgttcgagacgaggcaatcaataagcttcagcaaatcttca acaccagttacaaccaaacatacgagaaatatg gtaatgtgtctgtattcgagacaaccggtggacttgtggtattctgg cagggaatcaaacagaagtcgttagtagagttgga acgtctagcaaatcgaagttcgttgaatcttacccataaccgtacca agcgttccacggatggaaataacgcgacccattt atctaatatggagagtgtacacaacttagtatatgctcaactacaat tcacgtacgatacactacgaggttacataaacaga gctttagcccagatagcggaagcctggtgcgtcgatcaaagacgtac ccttgaggtcttcaaggaattgtccaagataaac ccgtctgctatcttgtcggctatatacaataaaccgatagccgcgcg atttatgggagacgtattaggattagcctcttgcgta actatcaatcagacgtcggtcaaggtccttcgtgatatgaacgtgaa ggaatctcccggaagatgttattcccgtcccgtggt gatcttcaactttgcaaactcatcttacgttcagtacggtcaacttg gtgaagataacgaaatactacttggtaatcaccgaac ggaggaatgtcaattgccttcccttaagatcttcattgcaggtaact ctgcatatgaatatgttgattatttgtttaagagaatgat tgatttgtcctctatatcaacagtagactcaatgattgccctagata ttgatccacttgagaacacagacttccgagtcttggaa ttatactcccagaaagagcttcgatcatcaaacgtatttgatcttga agaaatcatgcgagaatttaactcctataaacagcg tgtgaaatatgtagag Codon-optimized 1E1 sequence (SEQ ID NO: 8):
atggtgaagcaaatcaaggtcagagtggacatggtaagacacagaat taaggaacacatgttgaagaagtatactcaa acagaggagaagttcaccggtgccttcaatatgatgggtggatgtct acagaacgctttggatatcttagataaggtacatg aaccattcgaagaaatgaagtgcattggattgacaatgcaatcaatg tatgagaactacatagtgccagaggataagcgt gaaatgtggatggcatgcatcaaggagttacatgatgtatccaaagg agcagccaacaagctaggtggtgctttgcaagc gaaggcaagagcgaagaaggatgaattgagacgaaagatgatgtaca tgtgctatcgaaacatcgaattcttcactaag aactcagcgtttcctaagactaccaatggatgcagtcaagctatggc tgcgcttcagaacttgcctcaatgtagtcctgatga aatcatggcatatgcacagaagatcttcaagatcttagatgaggaaa gagacaaggtattgactcatatcgatcacatattc atggatatactaacaacatgtgtagaaacgatgtgtaacgagtacaa ggtaacttcggacgcttgtatgatgactatgtacg gaggaatatctctacttagtgagttctgtcgagttctatgctgttac gtattagaagaaactagtgtaatgttagcgaagagac cattgatcactaagcctgaagtgatctcggttatgaagagacgaata gaggagatctgtatgaaggtgttcgcacaataca tcttaggagctgatcctctaagagtgtgtagtccatcggtagacgat ttgagagctatagcggaggaatctgacgaggaag aggcaatagttgcatacacacttgctacagctggagtatccagttct gattctcttgtaagtcctccggagtcacctgtgccag caaccataccgttgagtagtgtgattgtggctgagaactcggatcag gaagagtctgagcaatccgatgaagaagagga -continued

```
ggaaggagcacaagaggagagagaagatactgtctctgtgaagagtg aacctgtatctgaaatcgaggaagtagcac ctgaggaagaggaggatggagccgaagaaccaacagcttcgggtggt aagtcaactcatccgatggtaaccagatcta aggcagaccag
```

A recombinant vector, such as the MVA viral vector described above; or any other suitable alternative vector including suitable primer or booster vectors described above, may be part of an HCMV vaccine composition that may be used in methods to treat or prevent HCMV infection. The vaccine composition as described herein may comprise a therapeutically effective amount of a recombinant viral vector as described herein, and further comprising a pharmaceutically acceptable carrier according to a standard method. Examples of acceptable carriers include physiologically acceptable solutions, such as sterile saline and sterile buffered saline.

In some embodiments, the vaccine or pharmaceutical composition may be used in combination with a pharmaceutically effective amount of an adjuvant to enhance the anti-CMV effects. Any immunologic adjuvant that may stimulate the immune system and increase the response to a vaccine, without having any specific antigenic effect itself may be used as the adjuvant. Many immunologic adjuvants mimic evolutionarily conserved molecules known as pathogen-associated molecular patterns (PAMPs) and are recognized by a set of immune receptors known as Toll-like Receptors (TLRs). Examples of adjuvants that may be used in accordance with the embodiments described herein include Freund's complete adjuvant, Freund's incomplete adjuvant, double stranded RNA (a TLR3 ligand), LPS, LPS analogs such as monophosphoryl lipid A (MPL) (a TLR4 ligand), flagellin (a TLR5 ligand), lipoproteins, lipopeptides, single stranded RNA, single stranded DNA, imidazoquinolin analogs (TLR7 and TLR8 ligands), CpG DNA (a TLR9 ligand), Ribi's adjuvant (monophosphoryl-lipid A/trehalose dicorynoycolate), glycolipids (α-GalCer analogs), unmethylated CpG islands, oil emulsion, liposomes, virosomes, saponins (active fractions of saponin such as QS21), muramyl dipeptide, alum, aluminum hydroxide, squalene, BCG, cytokines such as GM-CSF and IL-12, chemokines such as MIP 1-a and RANTES, activating cell surface ligands such as CD40L, N-acetylmuramine-L-alanyl-D-isoglutamine (MDP), and thymosin al. The amount of adjuvant used can be suitably selected according to the degree of symptoms, such as softening of the skin, pain, erythema, fever, headache, and muscular pain, which might be expressed as part of the immune response in humans or animals after the administration of this type of vaccine.

In further embodiments, use of various other adjuvants, drugs or additives with the vaccine of the invention, as discussed above, may enhance the therapeutic effect achieved by the administration of the vaccine or pharmaceutical composition. The pharmaceutically acceptable carrier may contain a trace amount of additives, such as substances that enhance the isotonicity and chemical stability. Such additives should be non-toxic to a human or other mammalian subject in the dosage and concentration used, and examples thereof include buffers such as phosphoric acid, citric acid, succinic acid, acetic acid, and other organic acids, and salts thereof; antioxidants such as ascorbic acid; low molecular weight (e.g., less than about 10 residues) polypeptides (e.g., polyarginine and tripeptide) proteins (e.g., serum albumin, gelatin, and immunoglobulin); amino acids (e.g., glycine, glutamic acid, aspartic acid, and arginine); monosaccharides, disaccharides, and other carbohydrates (e.g., cellulose and derivatives thereof, glucose, mannose, and dextrin), chelating agents (e.g., EDTA); sugar alcohols (e.g., mannitol and sorbitol); counterions (e.g., sodium); nonionic surfactants (e.g., polysorbate and poloxamer); antibiotics; and PEG.

The vaccine or pharmaceutical composition containing a recombinant viral vector described herein may be stored as an aqueous solution or a lyophilized product in a unit or multiple dose container such as a sealed ampoule or a vial.

Preventing HCMV Entry into a Cell, Treating and Preventing HCMV Infection

The antigen expression system described above may be used in in vitro, in vivo or ex vivo methods of preventing HCMV infection by preventing the virus entry into a cell or a population of cells. In some embodiments, methods for preventing virus entry into a cell or a population of cells include steps of infecting the cell or population of cells with an effective amount of a viral vector capable of expressing multiple HCMV antigens. In other embodiments, the antigen expression system may be used to stimulate humoral and cellular immune responses by multiple immunodominant antigens to prevent HCMV infection in different target populations such as pregnant women and transplant recipients. In another embodiment, the expression system or viral vector (e.g MVA) may be used to stimulate immune responses that interfere with primary HCMV infection, re-infection with a different HCMV strain, or virus reactivation from latency. In other embodiments, the expression system may be utilized to stimulate HCMV immunity in HCMV seronegative subjects, or boost pre-existing HCMV immunity in HCMV seropositive subjects.

In other embodiments, methods for treating or preventing an HCMV infection in a subject are provided. Such methods may include administering a therapeutically effective amount of a vaccine disclosed herein to the subject. The vaccine may include at least one active ingredient, wherein the at least one active ingredient includes a viral vector that is capable of co-expressing two or more HCMV antigens simultaneously, such as those described herein.

The expression systems, vectors and vaccines described herein may be used to treat or prevent any HCMV infection. For example, HCMV infection of epithelial cells, endothelial cells, fibroblasts, a combination thereof, or any other cell type important for HCMV natural history and infection can be prevented. Examples of HCMV infections that may be treated or prevented using the methods described herein may include, but is not limited to, congenital HCMV infection, opportunistic HCMV infections in subjects with compromised immune system (e.g., organ and bone marrow transplant recipients, cancer patients and chemotherapy recipients, patients receiving immunosuppressive drugs and HIV-infected patients) and silent HCMV infections in otherwise healthy subjects.

The term "effective amount" as used herein refers to an amount of a composition that produces a desired effect. For example, a population of cells may be infected with an effective amount of a viral vector to study its effect in vitro (e.g., cell culture) or to produce a desired therapeutic effect ex vivo or in vitro. An effective amount of a composition may be used to produce a therapeutic effect in a subject, such as preventing or treating a target condition, alleviating symptoms associated with the condition, or producing a desired physiological effect. In such a case, the effective amount of a composition is a "therapeutically effective amount," "therapeutically effective concentration" or "therapeutically effective dose." The precise effective amount or therapeutically effective amount is an amount of the composition that will yield the most effective results in terms of efficacy of treatment in a given subject or population of cells. This amount will vary depending upon a variety of factors, including but not limited to the characteristics of the composition (including activity, pharmacokinetics, pharmacodynamics, and bioavailability), the physiological condition of the subject (including age, sex, disease type and stage, general physical condition, responsiveness to a given dosage, and type of medication) or cells, the nature of the pharmaceutically acceptable carrier or carriers in the formulation, and the route of administration. Further, an effective or therapeutically effective amount may vary depending on whether the composition is administered alone or in combination with another composition, drug, therapy or other therapeutic method or modality. One skilled in the clinical and pharmacological arts will be able to determine an effective amount or therapeutically effective amount through routine experimentation, namely by monitoring a cell's or subject's response to administration of a composition and adjusting the dosage accordingly. For additional guidance, see Remington: The Science and Practice of Pharmacy, 21$^{st}$ Edition, Univ. of Sciences in Philadelphia (USIP), Lippincott Williams & Wilkins, Philadelphia, PA, 2005, which is hereby incorporated by reference as if fully set forth herein.

"Treating" or "treatment" of a condition may refer to preventing the condition, slowing the onset or rate of development of the condition, reducing the risk of developing the condition, preventing or delaying the development of symptoms associated with the condition, reducing or ending symptoms associated with the condition, generating a complete or partial regression of the condition, or some combination thereof. Treatment may also mean a prophylactic or preventative treatment of a condition.

In some embodiments, the vaccine or pharmaceutical composition described herein may be used in combination with other known pharmaceutical products, such as immune response-promoting peptides and antibacterial agents (synthetic antibacterial agents). The vaccine or pharmaceutical composition may further comprise other drugs and additives. Examples of drugs or additives that may be used in conjunction with a vaccine or pharmaceutical composition described herein include drugs that aid intracellular uptake of the recombinant virus or MVA or recombinant transgenic protein of the present invention, liposome and other drugs and/or additives that facilitate transfection, (e.g., fluorocarbon emulsifiers, cochleates, tubules, golden particles, biodegradable microspheres, and cationic polymers).

In some embodiments, the amount of the active ingredient contained in the vaccine or pharmaceutical composition described herein may be selected from a wide range of concentrations, Virus Particle Unit (VPU), Plaque Forming Unit (PFU), weight to volume percent (w/v %) or other quantitative measure of active ingredient amount, as long as it is a therapeutically or pharmaceutically effective amount. The dosage of the vaccine or pharmaceutical composition may be appropriately selected from a wide range according to the desired therapeutic effect, the administration method (administration route), the therapeutic period, the patient's age, gender, and other conditions, etc.

In some aspects, when a recombinant viral vector is administered to a human subject as an active ingredient of the vaccine or pharmaceutical composition, the dosage of the recombinant virus or MVA may be administered in an amount approximately corresponding to $10^2$ to $10^{14}$ PFU, preferably $10^5$ to $10^{12}$ PFU, and more preferably $10^6$ to $10^{10}$ PFU per patient, calculated as the PFU of the recombinant virus.

In further aspects, when a recombinant viral vector is administered to a subject as an active ingredient of the vaccine or pharmaceutical composition, the dosage may be selected from a wide range in terms of the amount of expressible DNA introduced into the vaccine host or the amount of transcribed RNA. The dosage also depends on the strength of the transcription and translation promoters used in any transfer vectors used.

In some embodiments, the vaccine composition or pharmaceutical composition described herein may be administered by directly injecting a recombinant viral vector suspension prepared by suspending the recombinant virus or MVA in PBS (phosphate buffered saline) or saline into a local site (e.g., into the lung tissue, liver, muscle or brain), by nasal or respiratory inhalation, or by intravascular (i.v.) (e.g., intra-arterial, intravenous, and portal venous), subcutaneous (s.c.), intracutaneously (i.c.), intradermal (i.d.), or intraperitoneal (i.p.) administration. The vaccine or pharmaceutical composition of the present invention may be administered more than once. More specifically, after the initial administration, one or more additional vaccinations may be given as a booster. One or more booster administrations can enhance the desired effect. After the administration of the vaccine or pharmaceutical composition, booster immunization with a pharmaceutical composition containing the recombinant virus or MVA as described herein may be performed.

The following examples are intended to illustrate various embodiments of the invention. As such, the specific embodiments discussed are not to be constructed as limitations on the scope of the invention. It will be apparent to one skilled in the art that various equivalents, changes, and modifications may be made without departing from the scope of invention, and it is understood that such equivalent embodiments are to be included herein. Further, all references cited in the disclosure are hereby incorporated by reference in their entirety, as if fully set forth herein.

EXAMPLES

Example 1: Materials and Methods

Cells and viruses. Baby hamster kidney (BHK-21) cells, ARPE-19 cells, and MRC-5 cells were purchased from the American Type Culture Collection (ATCC). Chicken embryo fibroblasts (CEF) were obtained from Charles River. MVA vectors were propagated in BHK-21 or CEF cells as described previously (75, 81). All MVA virus stocks were prepared following virus propagation on CEF, and titrated on CEF as described (81). HCMV TB40/E was derived from TB40/Ewt-GFP BAC DNA (48), a kind gift from Thomas Shenk (Princeton University). HCMV strain TR expressing GFP was obtained from Jay Nelson (Oregon Health & Science University). HCMV strain Towne (RC2940) was a kind gift from Edward Mocarski. HCMV strain AD169 was obtained from John Zaia (City of Hope). TB40/E and TR virus stocks were prepared following virus propagation on ARPE-19 cells, and titrated on these cells as described (81). In contrast, Towne and AD169 virus stocks were prepared following virus propagation in MRC-5 cells, and titrated on these cell types as described (81).

Recombinant MVA vectors. MVABAC-TK-derived recombinant MVA were generated via En passant mutagenesis in GS1783 *E. coli* cells using specific transfer constructs and site-specific primers for homologous recombination (72, 73, 83, 85). Table 1 shows the primers that were used to mediate the gene insertion by En passant mutagenesis as well as the genome positions of the insertion sites.

Genescript. Detailed sequence maps generated by Vector NTI (Invitrogen) are available for all transfer plasmids and BAC constructs. All recombinant BAC vectors were verified by PCR and restriction fragment length analysis, and all

TABLE 1

Primer Sequences

| Primer Pairs for Recombination[1] | Insertion Site[2] | Genome Position[2] |
|---|---|---|
| GAATATGACTAAACCGATGACCATTTAAAAACCCCTCTCTA GCTTTCACTAAAAATTGAAAATAAATACAAAGGTTC (SEQ ID NO: 9) ATAATGTTTTTATATTATACATGTTCTAAAAGAATAATCGAT ACAGTTTACTAGTATAAAAAGGCGCGCC (SEQ ID NO: 10) | 044L/045L | 37331 |
| AATTGTACTTTGTAATATAATGATATATATTTTCACTTTATCT CATTTGATTTTTATAAAAATTGAAAATAAATACAAAGGTTC (SEQ ID NO: 11) ATTCCGAAATCTGTACATCATGCAGTGGTTAAACAAAAACA TTTTTATTCCTAGTATAAAAAGGCGCGCC (SEQ ID NO: 12) | 064L/065L | 56742 |
| ATATGAATATGATTTCAGATACTATATTTGTTCCTGTAGATA ATAACTAAAAATTTTTATCTAGTATAAAAAGGCGCGCC (SEQ ID NO: 13) GGAAAATTTTTCATCTCTAAAAAAAGATGTGGTCATTAGAG TTTGATTTTTATAAAAATTGAAAATAAATACAAAGGTTC (SEQ ID NO: 14) | 069R/070L | 63812 |
| TTGGGGAAATATGAACCTGACATGATTAAGATTGCTCTTTC GGTGGCTGGTAAAAAATTGAAAATAAATACAAAGGTTC (SEQ ID NO: 15) ACAAAATTATGTATTTTGTTCTATCAACTACCTATAAAACTT TCCAAATACTAGTATAAAAAGGCGCGCC (SEQ ID NO: 16) | Del3 | 149342 |
| GGAAAGAATCTACTCATCTAAACGATTTAGTAAACTTGACT AAATCTTAATTTTTATAAAAATTGAAAATAAATACAAAGGTT C (SEQ ID NO: 17) TAAATTTTAAGTTTTACGTGGTAAGTTTTAATATTTAACTAA TACATTAGCTAGTATAAAAAGGCGCGCC (SEQ ID NO: 18) | 163R/167R (Del3 res.) | 148381-151019 |
| GGTTTATTGGATTCGTGTAATCATATATTTTGCATAACATG CATCATTTTTATAAAAATTGAAAATAAATACAAAGGTTC (SEQ ID NO: 19) ACAATTATCCGACGCACCGGTTTCTCTTCGTGTTCTATGC CATATATTGATTTTTATCTAGTATAAAAAGGCGCGCC (SEQ ID NO: 20) | 007R/008L | 12802 |
| ATTGTTTATACTCAAGATATTCGTTAAACGAATTAAAATTAT TTAATTTTTATAAAAATTGAAAATAAATACAAAGGTTC (SEQ ID NO: 21) AGGAACAGATTAATCCAGACGATTGTTGTCTGGATATGGG AATGTATTAATTTTTATCTAGTATAAAAAGGCGCGCC (SEQ ID NO: 22) | 122R/123L | 117576 |
| ATTGATAATATAAATATGAGCATTAGTATTTCTGTGGATTAA TAGATTTTTATAAAAATTGAAAATAAATACAAAGGTTC (SEQ ID NO: 23) TTATGAGGTATTTAGAGATTAGAGATGATTAATGATCCCCA TACTAGAAATTTTTATCTAGTATAAAAAGGCGCGCC (SEQ ID NO: 24) | 148R/149L | 137500 |

Notes:
[1]Underlined sequences were used to mediate recombination;
[2]Insertion sites and genome positions based on Accession Nr. U94848.

HCMV gene sequences encoding the PC subunits or pp65 were based on HCMV strain TB40/E (TB40/E-BAC; Accession Nr. EF999921). The gene sequence expressing a truncated, transmembrane-deleted form of gB (gBΔTM) was based on HCMV strain Merlin and encoded the N-terminal 698 amino acids of the Merlin gB protein. All HCMV gene sequences were codon-optimized for Vaccinia virus expression, and runs of more than three of the same nucleotide type in a row were silently mutated to enhance the stability of the HCMV gene sequences within MVA (87). Codon-optimized and P2A-linked HCMV gene sequences were synthesized by inserted HCMV gene expression cassettes were verified by sequencing, which included the flanks used for recombination. Virus reconstitution from the BAC vectors was performed in BHK cells as described using fowl pox virus as a helper virus (17, 85).

BAC vector removal. BAC removal in MVABAC-TK-derived recombinant MVA vectors was performed by a procedure based on homologous recombination of genomic duplication inserted into the BAC sequences as previously described (18, 71, 84). Reconstituted MVA vectors mentioned herein that contain the BAC vector are labeled with a bold superscript B (e.g. MVA$^B$-7Ag1, MVA$^B$-7Ag2, MVA$^B$-7Ag3, MVA$^B$-7Ag4, MVA$^B$-7Ag5, and MVA$^B$-7Ag6 as well as MVA$^B$-8Ag1 MVA$^B$-8Ag2 MVA$^B$-8Ag3 MVA$^B$-8Ag4; while derivatives of these constructs with removed BAC vector sequences are named without superscript B (e.g. MVA-7Ag1, MVA-7Ag4, MVA-7Ag5, and MVA-7Ag6, respectively).

Figure 1B:
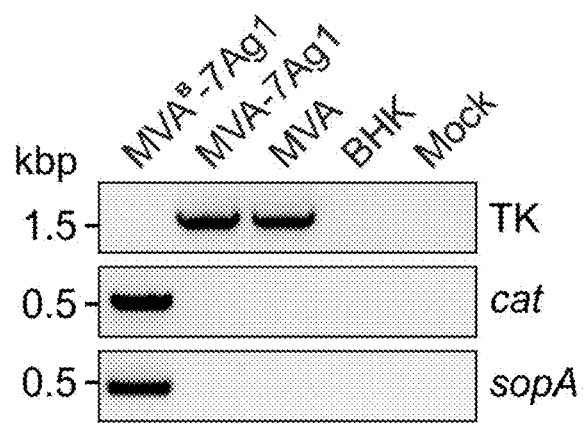
Figure 2A:
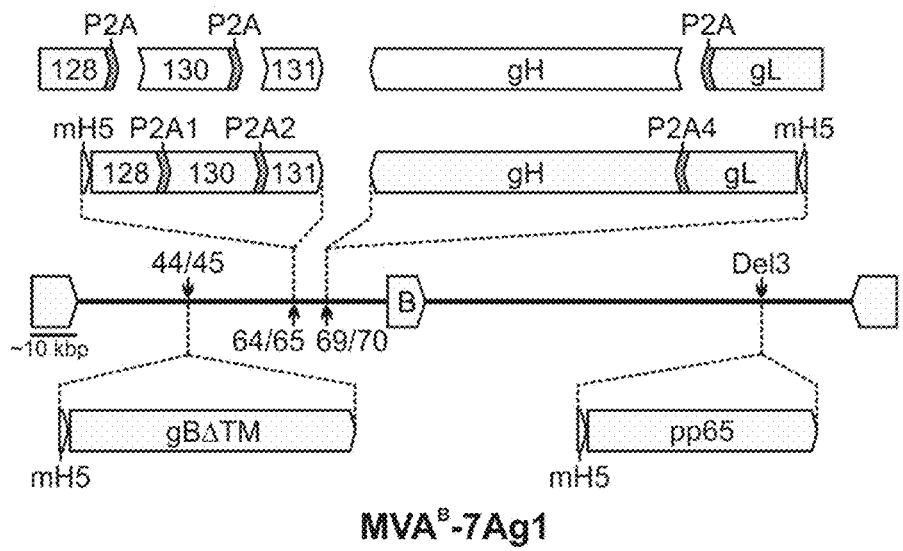
FIGS. 2A-2F show MVA vectors simultaneously expressing the PC subunits, gB and pp65 of HCMV. Using MVA-BAC-TK, different recombinant MVA vectors were generated that co-expressed all five PC subunits (gH, gL, UL128, UL130, UL131A), gB, and pp65 of HCMV. In the MVA$^B$-7Ag1-4 vectors (FIGS. 1A-1D), P2A-linked, polycistronic and single antigen expression constructs composed of UL128/130/131A, gH/gL, and pp65 were inserted as indicated into the intergenic regions (IGR) 64/65 and 69/70 and the MVA Deletion 3 site (Del3). An expression cassette for gBΔTM (gB without TM) was inserted into either IGR 44/45, 7/8, 122/123, or 148/149 to generate MVA$^B$-7Ag1 (FIG. 2A), MVA$^B$-7Ag2 (FIG. 2B), MVA$^B$-7Ag3 (FIG. 2C), or MVA$^B$-7Ag4 (FIG. 2D), respectively. In MVA$^B$-7Ag5 (FIG. 2E) and MVA$^B$-7Ag6 (FIG. 2F), P2A-linked polycistronic expression constructs composed of all five PC subunits were inserted into IGR 69/70, and P2A-linked expression constructs for pp65/gBΔTM were introduced into Del3 site or a restructured Del3 site (Del3 res.) to generate MVA$^B$-7Ag5 (FIG. 2E) and MVA$^B$-7Ag6 (FIG. 2F), respectively. MVA gene designations for the IGR were based on Accession Nr. U94848. Different coding sequences (P2A1-P2A5) were used for the P2A signal sequences between the antigens. mH5=modified H5 promoter; B=BAC vector.
Figure 2B:
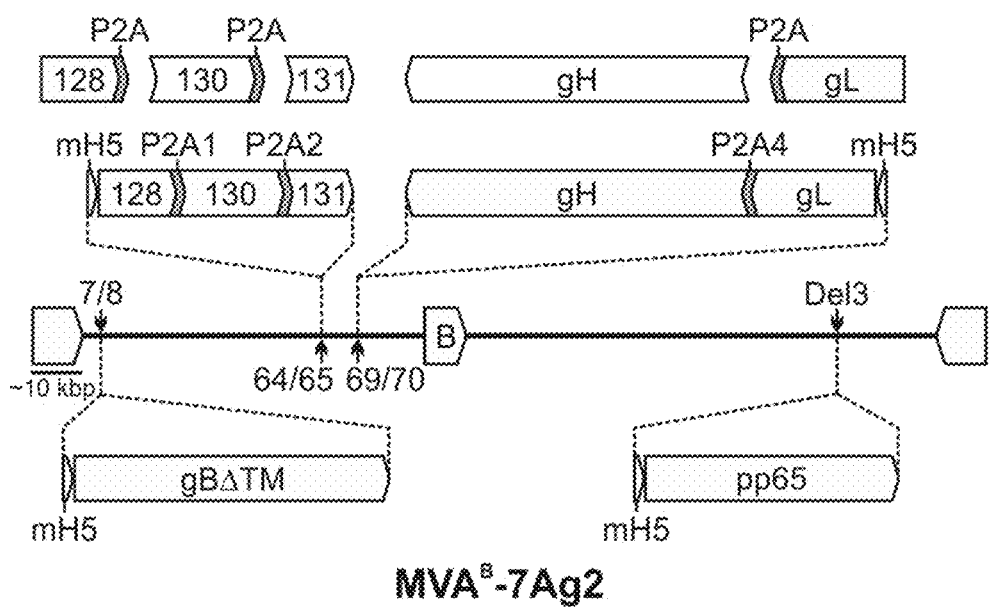
Figure 2C:
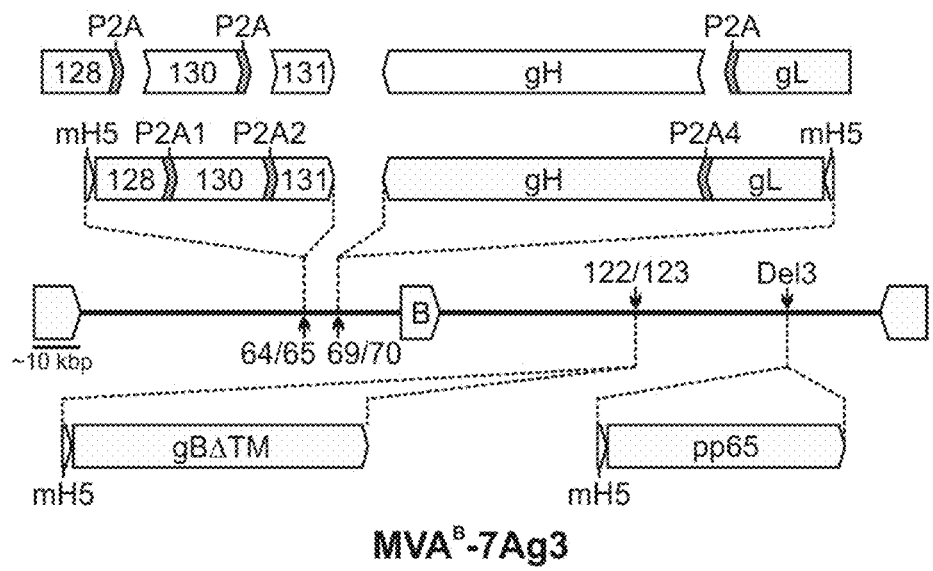
Figure 2D:
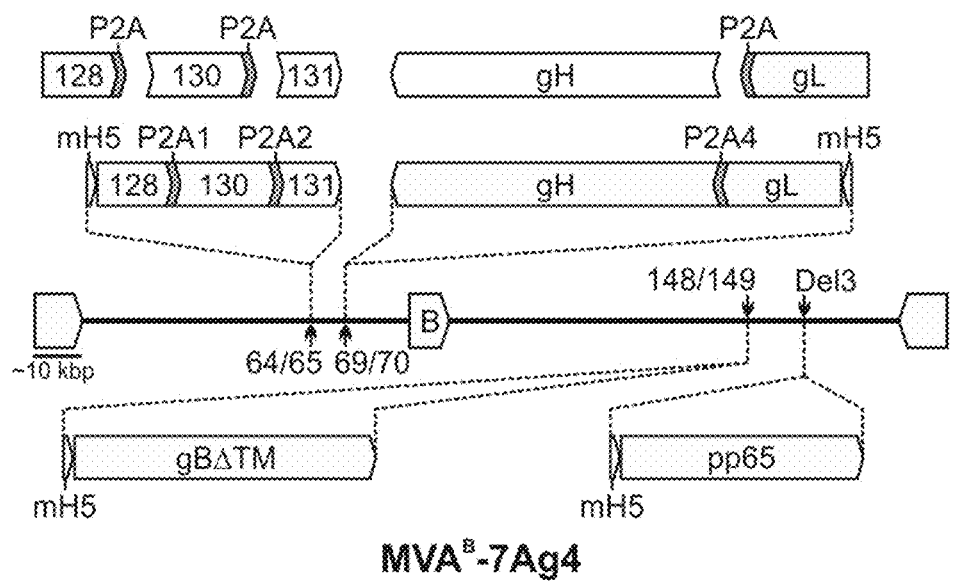
Figure 2E:
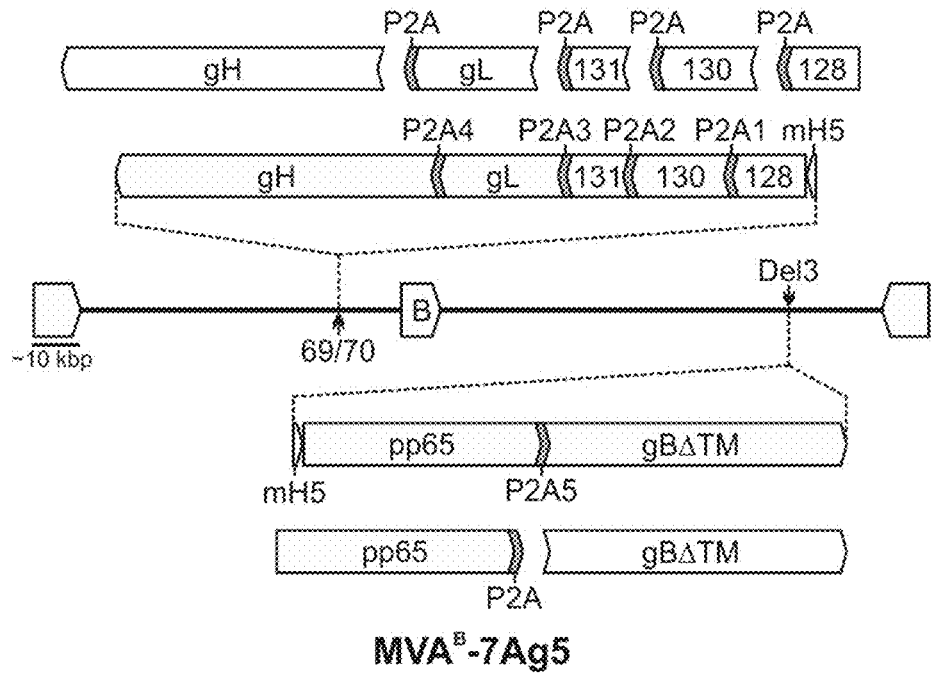
Figure 2F:
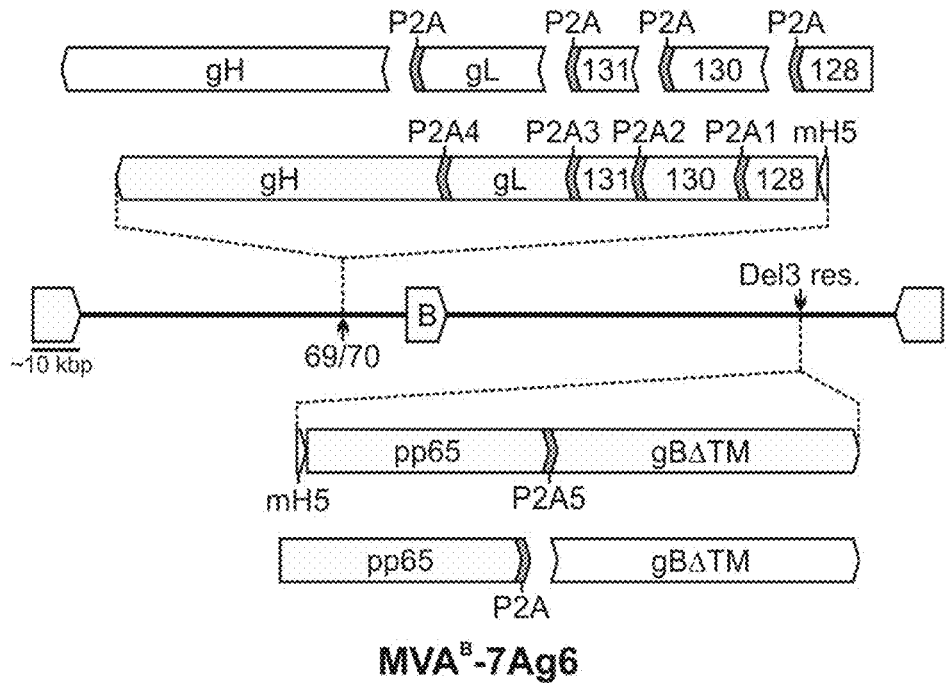

Using En passant mutagenesis (72, 73), a ~1.4 kbp genomic duplication that corresponded to base pairs 69313-70703 of MVA (Accession No. AY603355.1) and that was homologous to ~0.7 kbp MVA sequences on either site of the BAC vector within MVABAC-TK, was inserted in direct orientation between the chloramphenicol resistance marker (cat) and the mini-F replicon (OriS, repE, sopA/B/C, cos, losP) of MVABAC-TK (FIG. 1A) (83). An RFP marker was inserted along with the genomic duplication into the bacterial vector sequences so that each of the vector sequences (cat and mini-F replicon) separated by the genomic duplication within the recombinant MVABAC-TK vector contained a florescence marker (either RFP or GFP, whereby the GFP marker was already included in MVABAC-TK as a result of the original vector construction (83)). Upon virus reconstitution from the BAC, virus populations in which both parts of the bacterial vector sequences were removed were identified by viral foci showing no signs of RFP and GFP expression. Plaque purification was performed to eliminate residual virus progeny containing remaining vector sequences and to obtain pure, vector-free recombinant MVA vectors. Confluent CEF cells in a 96-well plate format were therefore infected with 20 plaque forming units of MVA (PFU) per plate. At 3 to 5 days post infection, virus from wells showing only single viral foci without signs of RFP and GFP expression was prepared by standard thaw/freeze technique and then successively expanded on CEF into larger amounts. Expanded virus was tested by PCR using primers (5'-TGG ATG ACA ACT CAA ACA TCT GC-3' (SEQ ID NO:25) and 5'-TTT CCT CGT TTG GAT CTC AC-3' (SEQ ID NO:26)) that flank the TK insertion to confirm the complete removal of the BAC vector sequences, and with primers specific for bacterial resistance marker cat (5'-TGC CAC TCA TCG CAG TAC TG-3' (SEQ ID NO:27) and 5'-AGG CAT TTC AGT CAG TTG CTC-3' (SEQ ID NO:28)) or the sopA element of the mini-F replicon (5'-TTA ACT CAG TTT CAA TAC GGT GCA G-3' (SEQ ID NO:29) and 5'-TGG GGT TTC TCA GGC TAT C-3' (SEQ ID NO:30)) to confirm the absence of any residual vector sequences (FIG. 1B). PCR fragments amplified from the TK site were sequenced to verify the restoration of the MVA TK gene locus (71, 84).

Immunoblot. Western blot analysis to detect HCMV antigens in whole cell lysates of MVA-infected BHK or CEF cells was performed using standard procedures. HCMV gL and UL131A were detected with rabbit polyclonal antisera (81); UL128 was detected using Rabbit Anti GST-UL 128 (PTA-8474) that was purchased from; gH, gB, and pp65 were detected using mAb AP86 (65), mAb p7-17 (8), and mAb 28-103 (9), respectively, kindly provided by William Britt (University of Alabama at Birmingham). UL130 was detected using MAb 3C5 (74), a kind gift from Thomas Shenk (Princeton University). Vaccinia virus B5R was detected using MAb 19C2 (63).

Flow Cytometry. Cell surface flow cytometry staining to detect HCMV PC subunits expressed by MVA$^B$-7Ag1 and control vectors by monoclonal NAb was performed as described previously (15). Briefly, BHK cells (70-90% confluent) were infected with the MVA vectors at MOI 5. At 4 h post infection, infected cells were collected, washed in PBS, and incubated for 1 h at 4° C. with 25 µg/ml NAb. After washing with PBS, the cells were incubated with Alexa Fluor 647 goat anti-mouse IgG (Life Technologies) at a dilution of 1:2,000. The cells were washed again and resuspended in PBS with 0.1% bovine serum albumin (BSA). Fifteen thousand events were collected using a BD FACSCelesta flow cytometer (BD) and analyzed with FlowJo software (Tree Star).

Mice and immunization. The Institutional Animal Care and Use Committee (IACUC) of the Beckman Research Institute of City of Hope approved protocol 98004 assigned for this study. All study procedures were carried out in strict accordance with the recommendations in the Guide for the Care and Use of Laboratory Animals and the Public Health Service Policy on the Humane Care and Use of Laboratory Animals. BALB/c and C57BL/6 mice were purchased from the Jackson Laboratory. HLA-A*0201 HHD II H-2Db/β2 microglobulin double knockout (50) (A2 Tg) and HLA-B*0702 H-2KbDb double knockout (56) (B7 Tg) transgenic mice on a C57BL/6 background were obtained from F. Lemonnier (Institut Pasteur, France) and bred at City of Hope Animal Research Center. Mice were vaccinated two or three times in four weeks intervals with the recombinant MVA vectors via i.p. route using either 5×10$^7$ PFU or 1×10$^7$ PFU (low dose). Blood samples for humoral immune analysis were collected by retro-orbital bleeding. To evaluate cellular immune responses, splenocytes were isolated according to standard procedure and resuspended in RPMI 1640 medium (Corning) supplemented with 10% FBS, penicillin/streptomycin, L-glutamine, sodium pyruvate, non-essential amino acids, HEPES (all Gibco).

Neutralization assay. HCMV microneutralization assay was performed similar to published reports (15, 81). Briefly, heat-inactivated sera were serially two-fold diluted in 75 µl volumes using complete growth medium for ARPE-19 EC or MRC-5 FB depending on the cell type used in the assay. Dilutions ranged from 1:25 to 1:204800. Diluted serum was mixed with 75 µl of complete growth medium containing approximately 2400 PFU of HCMV TB40/Ewt-GFP-derived virus. After 2 h incubation, virus/sera mixtures were added in duplicate (50 µl) to ARPE-19 or MRC-5 cells seeded the day before at 1.5×10$^4$ cells/well in a clear bottom polystyrene 96-well plate (Corning) that contained 50 µl per well of complete growth medium. Cells were grown for 48 h and fixed in methanol/acetone. Infected cells were identified by immunostaining using mouse anti-HCMV IE1 Ab (p63-27 (3); kindly provided by William Britt (University of Alabama at Birmingham)) and the Vectastain ABC kit (VectorLabs). The substrate was 3, 3'-diaminobenzidine (DAB, VectorLabs). Plates were analyzed by an automated system using the DMi8 inverted microscope equipped with a linear motorized stage (Leica). IE1 positive nuclei per field of view using a 5× objective were counted using ImagePro Premier (Media Cybernetics). For each dilution the average number of positive nuclei in duplicate was calculated. The percent neutralization titer (NT) for each dilution was calculated as follows: NT=[1−(positive nuclei number with immune sera)/(positive nuclei number with pre-immune sera)]×100. The titers that gave 50% neutralization (NT50) were calculated by determining the linear slope of the graph plotting NT versus plasma dilution by using the next higher and lower NT values that were closest to 50% neutralization.

ELISA. PC- and gB-specific binding antibodies in sera of immunized mice were quantified by ELISA using purified PC or gB protein that was derived either via expression from plasmids (PC) or MVA (gB) in mammalian cells (15, 75). Microtiter wells (Costar) were coated overnight with 1

μg/ml of purified protein and wells were blocked with 1% BSA/PBS. After extensive washing two-fold serum dilutions were added in duplicate wells. Anti-mouse IgG horseradish peroxidase conjugate (Sigma-Aldrich) was used at a dilution of 1:2,000. Plates were developed with 3,3',5,5'-tetramethylbenzidine (Thermo-Fisher) and the reaction was stopped using 1M $H_2SO_4$. Absorbance at 450 nm was recorded using FilterMax F3 microplate reader (Molecular Devices). Endpoint titers were calculated as the highest serum dilution to produce an absorbance higher than the geometric mean plus three times the standard deviation of the absorbance obtained using serum from 5 naïve mice diluted 100 times.

Peptides. The peptides libraries of pp65 and gB were composed of overlapping 15 amino acid peptides spanning the entire proteins. The pp65 peptide library was obtained from NIH (AIDS Reagent Program, Division of AIDS, NIAID). The gB peptide library was purchased from JPT Peptide Technologies GmbH (Berlin, Germany). The human MHC class I-restricted immunodominant peptides HLA-A*0201 $pp65_{(495-503)}$ and HLA-B*0702 $pp65_{(265-275)}$ were described previously (19). For detecting mouse H-2b restricted pp65- and gB-specific T cells, mixtures of previously identified 11 or 17 immunoreactive peptides, respectively, were used (64). For detecting mouse H-2b-restricted T cell responses specific for the PC subunits, a mixture of gH (PHGWKESHTTSGLHR (SEQ ID NO:31), TQGVINIMYMHDSDD (SEQ ID NO:32)), gL (LIRYRPVTPEAANSV (SEQ ID NO:33)), UL128 (NKLTSCNYNPLYLEA (SEQ ID NO:34)), UL130 (KLTYSKPHDAATFYC (SEQ ID NO:35)) and UL131A (LNYHYDAS HGLDNFD (SEQ ID NO:36)) immunodominant peptides was used (64). Except for the peptide libraries, all peptides were synthesized at the City of Hope Core Facility (14).

ELISpot. IFNγ ELISpot assay was performed following manufacturer's instructions. Briefly, Millipore Multiscreen-IP filter plates were coated overnight with capture antibody (Mouse IFN-γ ELISpot Development Module, R&D systems). After extensive washing, plates were blocked for 2 hours with blocking buffer (1% BSA, 5% Sucrose in PBS). After this time, plates were washed and $2\times10^5$ splenocytes in RPMI were added to each well and incubated overnight at 37° C. in the presence of 2 μg/ml peptides and 1 μg/ml CD28 and CD49d co-stimulatory Ab (Biolegend). Splenocytes from Tg mice were seeded in lower amount ($5\times10^4$) when pp65 library was used as a stimulus. After 24 hours, plates were washed and detection antibody was added and incubated at 4° C. overnight. Plates were developed the following day using ELISpot Blue Color Module (R&D systems). Spots were counted using AID EliSpot Reader. The number of spots obtained in wells in which 2 μl of DMSO was added was subtracted from each well. An arbitrary number of 3000 spots was assigned to wells in which the number of spots was too high to be counted.

Surrogate ADCC-reporter gene bioassay. ADCC was measured by a mouse FcγRIV (mFcγRIV) Reporter Bioassay (Promega). This reporter assay allows measuring ADCC without the need of troublesome isolation of NK cells from PBMCs and without variability in mFcγRIV amounts (49). mFcγRIV is the main receptor involved in ADCC in mouse and it is the most closely related to human FcγRIIIa, the primary Fc receptor involved in ADCC in humans (47). To perform this assay, ARPE-19 EC were infected with TB40/E at an MOI of 5 for 24 hours (target cells). Infected cells were transferred to white, flat-bottomed 96-well plates. After additional 24 hours, pooled heat-inactivated serum from immunized mice was 2-fold diluted in assay buffer (RPMI 1640 supplemented with 4% Low IgG serum) and added to the target cells. Engineered mFcγRIV cells expressing a luciferase reporter driven by a Nuclear Factor of Activated T-cells-response element were added to each well and incubated for 6 hours following which Bio-Glo reagent was added. Plates were developed using a BioTeck Cytation3 luminometer. Fold induction was calculated relative to luciferase activity in the absence of serum.

Statistics. GraphPad Prism software version 5.0 (GraphPad) was used for statistical analysis. NAb titers and IFNγ-secreting T cells in each group were compared using one-way analysis of variance (ANOVA) followed by Tukey's multiple comparison test, while differences between NAb titers were calculated using two-way ANOVA followed by Sidak's multiple comparison test.

Example 2: Construction of MVA Vectors Simultaneously Expressing all Five PC Subunits, gB, and Pp65

Using the original MVA BAC generated by Cottingham et al. (17), recombinant MVA vectors with expression cassettes of all five PC subunits inserted into separate insertion sites were previously generated (81, 85). These first generation MVA-PC vectors stimulated robust HCMV-specific NAb responses in mice and RM that even exceeded those measurable for HCMV seropositive individuals (81). In order to simplify the vaccine construction and to reduce the expressing cassettes and insertion sites needed to express the PC subunits, a novel MVA BAC, termed MVABAC-TK, with BAC cassette inserted into the Thymidine kinase (TK) gene locus was recently constructed (82). By exploiting this novel BAC in addition to the ribosomal skipping mechanism mediated by 2A peptides of picornavirus, MVA vectors expressing the PC subunits as polycistronic expression constructs employing only one or two MVA insertion sites were generated (82). These second generation MVA-PC vectors based on the novel MVABAC-TK were as potent as the first generation MVA-PC vectors derived from the original MVABAC to stimulate high-titer and sustained HCMV-specific NAb responses in mice (82).

Building on these constructs, different recombinant MVA vectors that co-expressed all five PC subunits together with gB and pp65 were generated. FIG. 2 provides examples of such seven-antigenic MVA vectors. Two concepts of vector construction were followed primarily. The first concept of vector construction (FIGS. 2A-D), herein represented by the $MVA^B$-7Ag1-4 vectors was based on the insertion of the seven HCMV antigens into four separate insertion sites. In all of these vectors P2A-linked polycistronic expression constructs composed of UL128/130/131A and gH/gL were inserted into the intergenic regions (IGR) between the MVA genes 64L and 65L (IGR64/65) and the MVA genes 69R and 70L (IGR69/70), respectively (all MVA genes mentioned herein are based on Accession Nr. U94848), and pp65 was inserted as a single antigen expression construct into the MVA Deletion 3 site (Del3). All of these MVA insertion sites (IGR64/65 (also known as IGR3), IGR69/70 (also known as G1L/I8R), and Del3) are commonly used insertion sites that allow stable antigen expression (45, 76, 87). In contrast gB was inserted within the $MVA^B$-7Ag1-4 vectors into four different MVA insertion sites to identify an additional insertion site within the MVA genome that allows stable expression of the gB antigen. In $MVA^B$-7Ag1 the gB antigen was inserted into the IGR between the MVA genes 044L and 045L (IGR44/45); in $MVA^B$-7Ag2 the gB antigen was inserted into the IGR between the MVA genes 007R and 008L (IGR7/8); in MVA$^B$-7Ag3 the gB antigen was inserted into the IGR between the MVA genes 122R and 123L (IGR122/123); and in MVA$^B$-7Ag4 the gB antigen was inserted into the IGR between the MVA genes 148R and 149L (IGR148/149). All of these insertion sites have not been characterized in detail previously. The commonly employed Deletion 2 site (Del2) was not utilized herein for the recombinant vector construction because of previous observations showing that antigen instability can occur frequently at this site (76).

The second concept of vector construction, herein represented by MVA$^B$-7Ag5 and MVA$^B$-7Ag6 (FIGS. 2E-2F), was characterized by inserting the seven HCMV antigens into only two MVA insertion sites. In both of these vectors, P2A-linked polycistronic expression constructs composed of all five PC subunits were inserted into the IGR between the MVA genes 69R and 70L (IGR69/70; also known as G1L/I8R). In addition, in both of the vectors pp65 and gB were inserted as P2A-linked, polycistronic expression constructs. However, while the pp65/gB expression cassette in MVA$^B$-7Ag5 was inserted into the commonly used Del3 site, the pp65/gB expression cassette in MVA$^B$-7Ag6 was inserted into a restructured Del3 site (Del3 res.) that was generated by deleting the MVA sequences between MVA genes 163R and 167R. As a result, the gB/pp65 expression cassette in MVA$^B$-7Ag6 was inserted directly adjacent to the 163R and 167R MVA genes. Such a restructured Del3 site has been proposed to promote enhanced antigen stability, although this has not been characterized in detail (86). All primer sequences that were utilized to insert the HCMV antigens into the different MVA insertion sites within MVA-BAC-TK by PCR using En passant mutagenesis as well as all targeted insertion sites within MVA are shown in Table 1.

All 2A signal sequences were based on the 2A peptide of porcine teschovirus-1 (P2A) as this signal sequence has been shown to mediate highly-efficient polyprotein cleavage in different mouse and human cell lines and in different animal models (34). Different coding sequences were used for the P2A sequences between the different HCMV antigens to prevent homologous recombination of the multiple P2A signal sequences and, hence, to reduce the potential of antigen instability within the MVA constructs (81). In all constructs, gH was introduced with its transmembrane domain (TM) to express a membrane-tethered form of the PC, since it was shown previously that this form of the PC within MVA is substantially more immunogenic than a soluble form of the PC without the gH TM, at least when considering the numbers of immunizations required to elicit robust NAb (16, 81). In contrast, gB was inserted in all vectors without its TM as there is evidence that a soluble form of gB compared to the full-length gB protein can afford enhanced immunogenicity (75). Another consideration for including gB without its TM was to eliminate the fusogenic function of gB and consequently to reduce its potential for cellular cytotoxicity (75).

Figure 3:
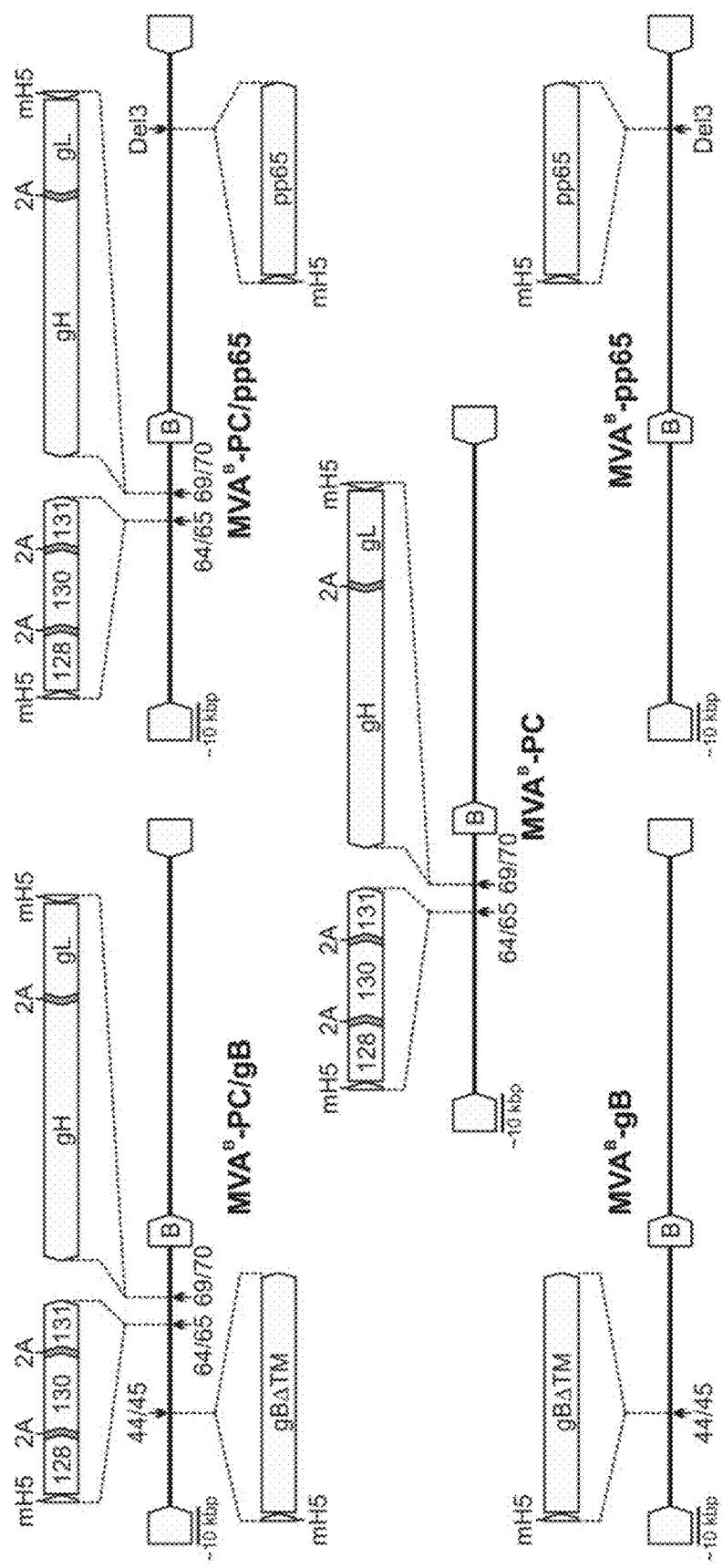
FIG. 3 shows control vectors. Using MVABAC-TK, MVA vectors were generated expressing either all five PC subunits together with gB (MVA$^B$-PC/gB), the PC subunits together with pp65 (MVA$^B$-PC/pp65), or MVA expressing only the PC subunits (MVA$^B$-PC), gB (MVA$^B$-gB), or pp65 (MVA$^B$-pp65) using identical insertion sites and expression constructs as used for the construction of MVA$^B$-7Ag1 (FIG. 2A).

The HCMV gene sequences encoding the PC subunits and pp65 were based on TB40/E. The gene sequence expressing a truncated, transmembrane-deleted variant of gB (gBΔTM) was based on HCMV strain Merlin and encoded the N-terminal 698 amino acids of the Merlin gB protein. All HCMV gene sequences inserted into the MVA$^B$-7Ag1-6 vectors were codon-optimized for Vaccinia virus expression, and runs of more than three of the same nucleotides type in a row were silently mutated to enhance the stability of the HCMV gene sequences within the MVA genome (87). MVA vectors that were similar in construction to the MVA$^B$-7Ag1-6, but that contained non-codon-optimized HCMV genes sequences of gB and pp65 (e.g. unmodified gene sequences derived from HCMV) were also generated. These vectors containing non-codon-optimized genes sequences are labeled herein with a superscript NCO (e.g MVA$^B$-7Ag1$^{NCO}$). For controls, MVABAC-TK-derived recombinants MVA vectors expressing either all five PC subunits together with gB (MVA$^B$-PC/gB), the PC subunits together with pp65 (MVA$^B$-PC/pp65), or MVA expressing only the PC subunits (MVA$^B$-PC), gB (MVA$^B$-gB), or pp65 (MVA$^B$-pp65) were generated using identical insertion sites and expression constructs as used for the construction of MVA$^B$-7Ag1 (FIG. 3).

Figure 4A:
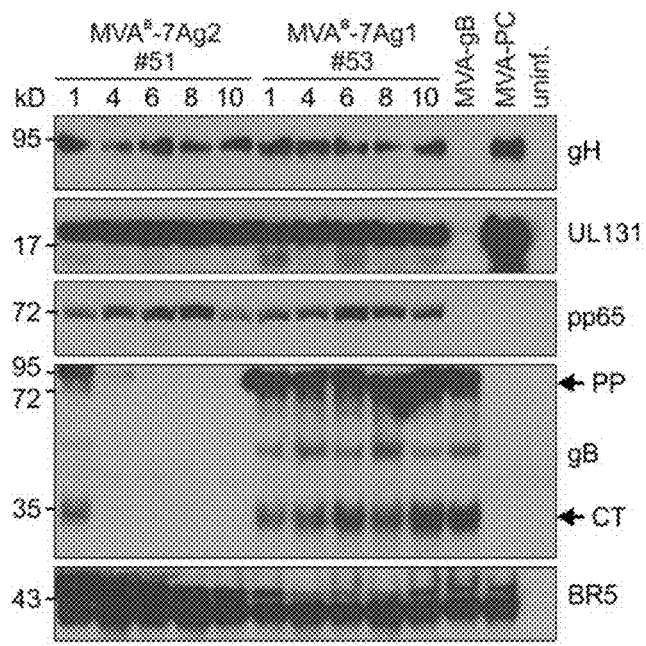
Figure 4B:
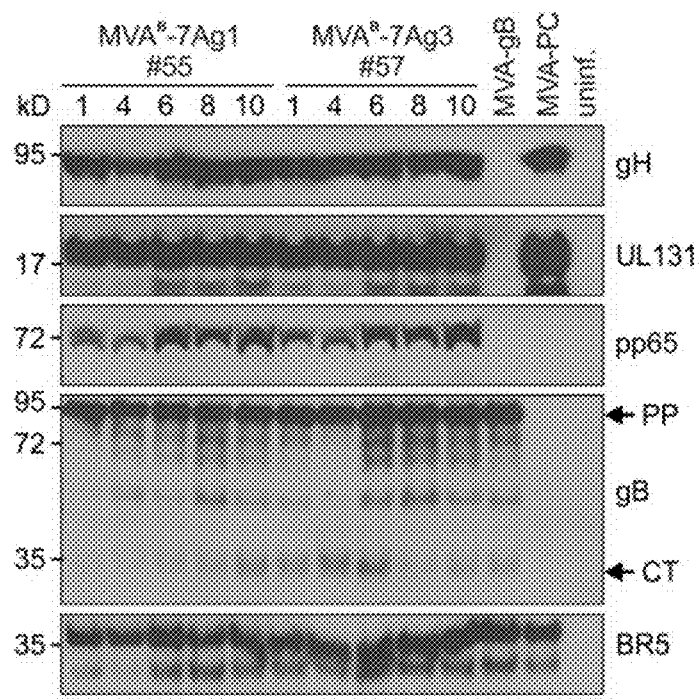

Example 3: In Vitro Characterization of HCMV Antigen Expression by Seven-Antigen MVA Vectors As stable antigen expression is of fundamental importance for every viral vaccine vector, HCMV antigen expression by the different seven-antigen MVA vectors was investigated following ten virus passages on BHK cells or CEF. BHK cells and CEF are the only two cell lines that allow efficient MVA propagation, whereas in other cells MVA replication is abortive due to late block in virus assembly (67, 68). In addition, CEF cells are commonly used to produce MVA vaccines for human use. The passaging analysis in BHK cells and CEF revealed that most of the seven-antigen vectors (MVA$^B$-7Ag1-6, FIG. 2) with codon-optimized HCMV gene sequences efficiently expressed the HCMV antigens during ten virus passages, except for the MVA$^B$-7Ag2 vector that showed decreased expression of the gB antigen inserted into IGR7/8 (data not shown and FIG. 4). FIG. 4 shows examples for HCMV antigen expressing by MVA$^B$-7Ag1 MVA$^B$-7Ag2, MVA$^B$-7Ag3, and MVA$^B$-7Ag4 following virus passage on BHK cells.

Figure 5A:
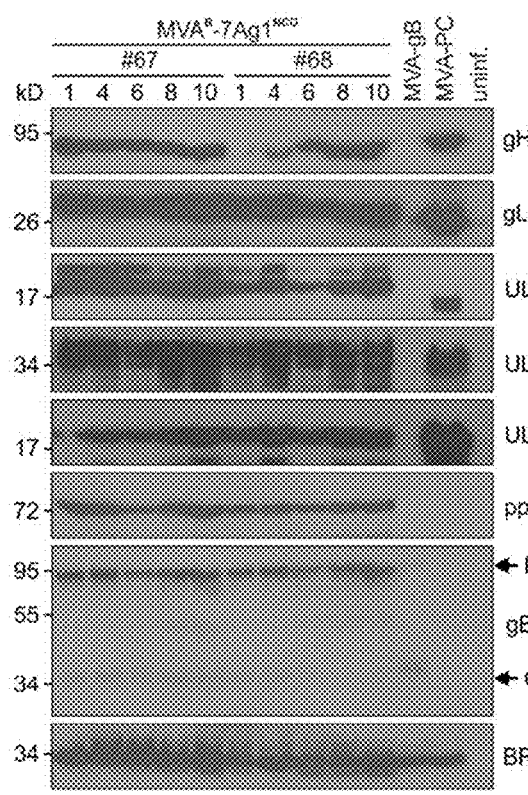
FIGS. 5A and 5B show stability tests of the HCMV antigen expression by seven-antigenic MVA vectors with non-codon-optimized HCMV antigens. Two different clones of MVA$^B$-7Ag1$^{NCO}$ (#67 and #68) and MVA$^B$-7Ag3$^{NCO}$ vectors that contained codon-optimized PC subunit gene sequences and non-codon-optimized pp65 and gB gene sequences were propagated at low multiplicity of infection via 10 virus passages on BHK cells. Virus from the 10 virus passages (1-10) was used to infect BHK cells, and whole cell lysates of infected cells were evaluated by Immunoblot with polyclonal (UL131A, gL, UL128) and monoclonal (gH, UL130, pp65, gB) antibodies specific for the individual antigens. BHK cells infected with previously generated MVA-gB and MVA-PC vectors (81) as well as uninfected BHK cells were used as controls. The vaccinia virus BR5 protein was detected for loading control. Note that for an unknown reason overall only very low amounts of protein were detected at passage 4 and 6 of MVA$^B$-7Ag3$^{NCO}$. PP=precursor protein; CT=C-terminal cleavage product.
Figure 5B:
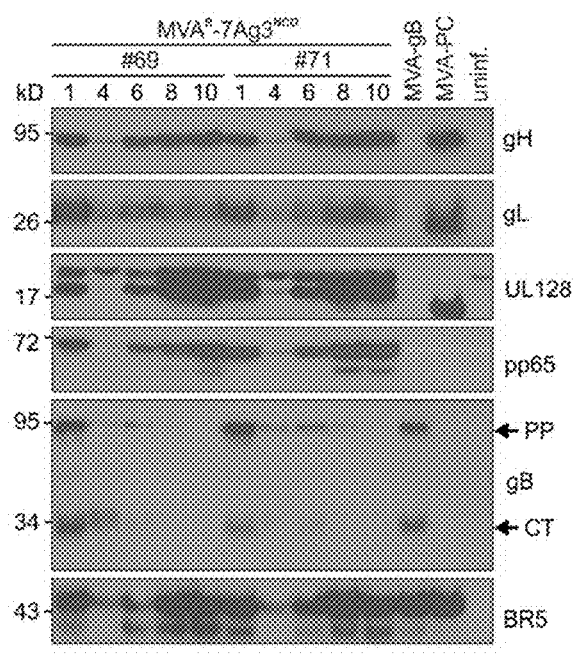

MVA vectors that were identical in construction to the MVA$^B$-7Ag1-4 vectors, but that contained non-codon-optimized pp65 and gB gene sequences (herein designated as MVA$^B$-7Ag1-4$^{NCO}$), demonstrated also efficient expression of the HCMV antigens during virus passaging, although decreased gB expression was observed upon passaging of MVA$^B$-7Ag3$^{NCO}$ and MVA$^B$-7Ag3$^{NCO}$ with the gB gene inserted into IGR7/8 or IGR122/123 (data not shown and FIG. 5). FIG. 5 shows examples for HCMV antigen expression upon ten virus passages of MVA$^B$-7Ag1$^{NCO}$ and MVA$^B$-7Ag3$^{NCO}$ with non-codon-optimized gene sequence inserted into IGR44/45 or IGR122/123, respectively. These observations indicated that stable HCMV antigen expression was provided by MVA$^B$-7Ag1 and the MVA$^B$-7Ag3-6 vectors (FIG. 2), but not by the MVA-7Ag2 vector (FIG. 2). In contrast, of the counterpart vectors of the MVA$^B$-7Ag1-4 vectors with non-codon-optimized pp65 and gB sequences) (MVA$^B$-7Ag1-4$^{NCO}$, stable antigen expression was only provided by MVA$^B$-7Ag1$^{NCO}$ and MVA$^B$-7Ag4$^{NCO}$ with gB inserted into IGR44/45 or IGR148/149, respectively. These results overall suggest that codon-optimization can enhance the stability of the HCMV gB gene sequence within MVA, and that the insertion sites between the MVA genes 044L and 045L and MVA genes 148R and 149L allow most stable gB antigen expression.

Figure 6A:
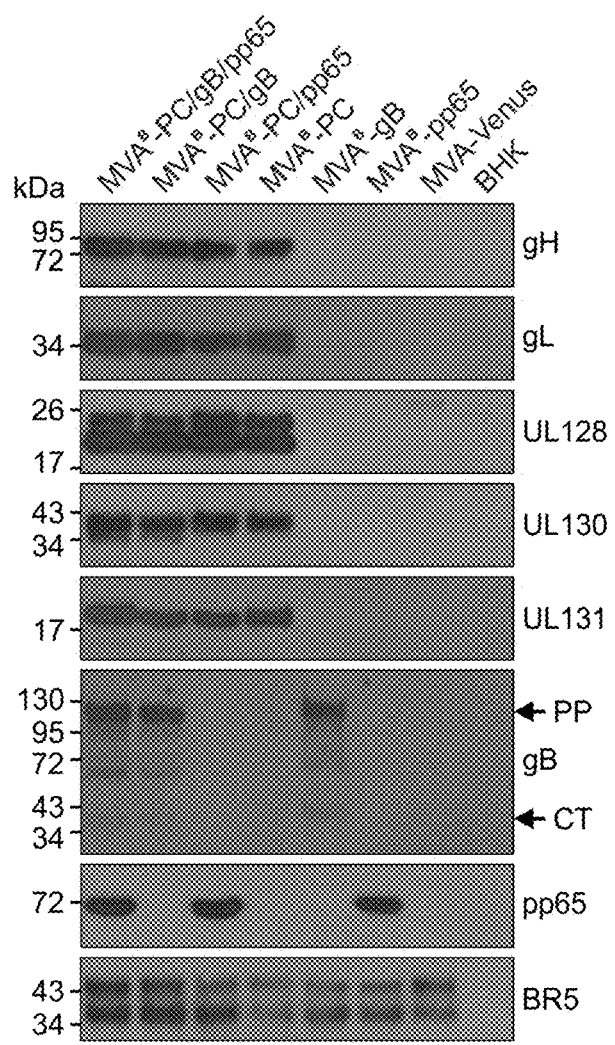
FIGS. 6A and 6B show comparison of HCMV antigen expression by MVA$^B$-7Ag1 and control vectors.
Figure 7:
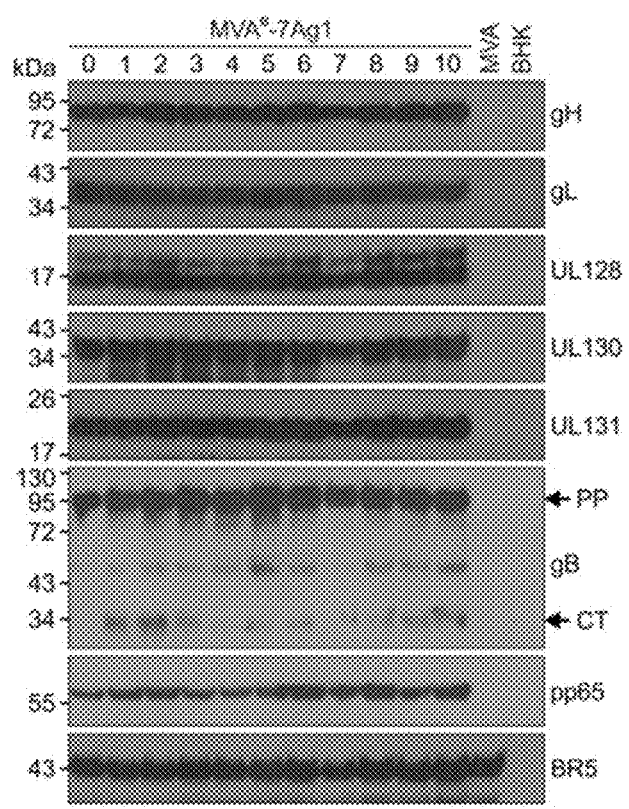
FIG. 7 shows the stability of the antigen expression following virus propagation of MVA$^B$-7Ag1 in CEF. MVA$^B$-7Ag1 vector as indicated in FIG. 2A with codon-optimized HCMV gene sequence were propagated at low multiplicity of infection via 10 virus passages on CEF cells. Virus from the initial inoculum (0) and the 10 virus passages (1-10) was used to infect BHK cells, and whole cell lysates of infected BHK cells were evaluated by Immunoblot with polyclonal and monoclonal antibodies specific for the individual antigens. BHK cells infected with MVA-Venus or uninfected cells were analyzed as controls. The vaccinia virus BR5 protein was detected for loading control. PP=gB precursor protein; CT=C-terminal cleavage product.
Figure 8A:
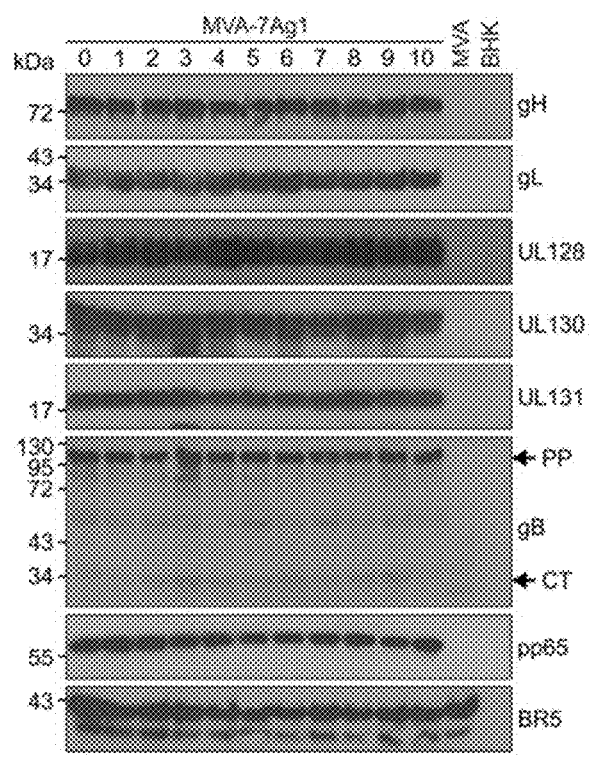
FIGS. 8A and 8B show the stability of the antigen expression by MVA-7Ag1 (FIG. 8A) and MVA-7Ag5 (FIG. 8B) following BAC vector removal. MVA-7Ag1 and MVA-7Ag5 with removed BAC sequences (see FIG. 1 for BAC removal) and codon-optimized HCMV gene sequence were propagated at low multiplicity of infection via 10 virus passages on CEF cells. Virus from the initial inoculum (0) and the 10 virus passages (1-10) was used to infect BHK cells, and whole cell lysates of infected BHK cells were evaluated by immunoblot with polyclonal and monoclonal antibodies specific for the individual antigens. BHK cells infected with MVA-Venus or uninfected cells were analyzed as controls. The vaccinia virus BR5 protein was detected for loading control. PP=gB precursor protein; CT=C-terminal cleavage product.
Figure 8B:
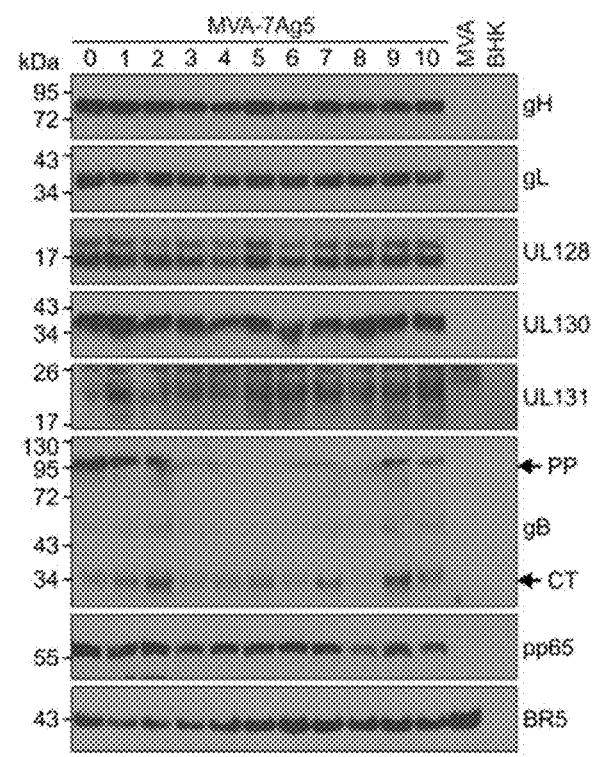

To further characterize the expression of the PC subunits, gB, and pp65 when simultaneously expressed from as single MVA vector, HCMV antigen expression by MVA$^B$-7Ag1 (FIG. 2A) and the control vectors (FIG. 3) in infected BHK cells were compared. While MVA$^B$-7Ag1 (also referred to as MVA$^B$-PC/gB/pp65) expressed all seven HCMV antigens, the control vectors expressed only antigen subsets (PC/gB, PC/pp65, or PC) or single antigens (gB or pp65) (FIG. 6A). The detectable protein sizes of the individual HCMV antigens were generally consistent with expected molecular weight values (gH=~85 kDa; gL ~35 kDa; UL128=~15 kDa; UL130=~38 kDa; UL131A=18 kDa; gBΔTM=~110 kDa precursor protein and ~35 kDa C-terminal cleavage product; pp65=~65 kDa (9, 57, 75)), factoring in that some or most of the expressed HCMV antigens contained C-terminal P2A peptide remnants (~2 kDa) as a consequence of the P2A polyprotein processing. Similar to previous observations (75, 81), gBΔTM was primarily detectable as a ~110 kDa precursor form, and in minor amounts also as a ~35 kDa C-terminal furin cleavage product. The two protein bands detected for UL128 for all vectors expressing the PC subunits have been observed previously and appear to be specifically associated with the P2A-linked polycistronic expression constructs (83). The expression levels of the individual HCMV proteins encoded by MVA$^B$-7Ag1 and all control vectors were generally comparable to one another, suggesting that co-expression of the PC subunits together with gB and pp65 by MVA does not significantly impact the expression of the individual antigens. Moreover, all seven HCMV antigens within MVA$^B$-7Ag1 were expressed in comparable levels following ten virus passages on CEF (FIG. 7), confirming that all seven HCMV gene sequences within MVA$^B$-7Ag1 are stably maintained upon virus passaging in a cell type that is commonly used for human MVA vaccine production. Moreover, all HCMV antigens were stable expressed by MVA-7Ag1 and MVA-7Ag5 after removal of the BAC vector (FIG. 8), suggesting that the BAC removal within these vectors does not impact the stability of the HCMV antigens. These results confirm that all five PC subunits, gB, and pp65 of HCMV can be efficiently and stably co-expressed by a single MVA vector.

Figure 6B:
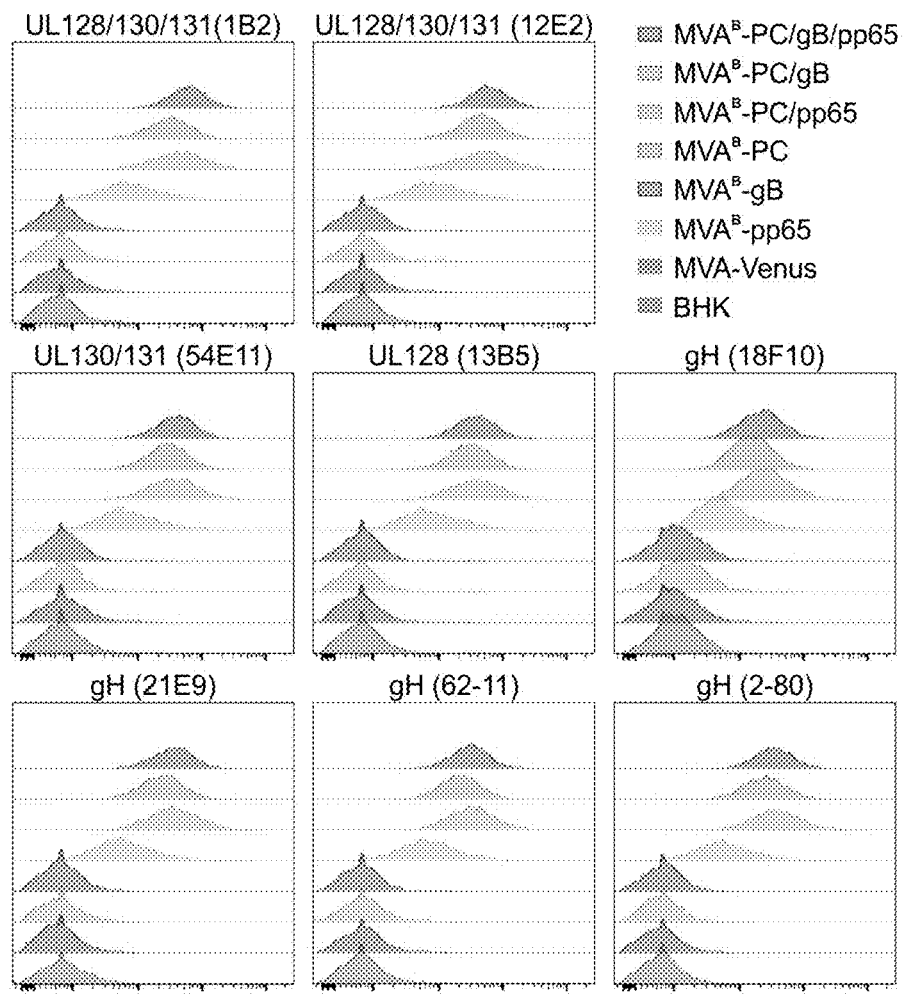

A panel of monoclonal NAb was recently isolated from mice immunized with the first generation MVA-PC vector, which showed antigen recognition and neutralization potency similar to human UL128/130/131A subunit- and gH-specific NAb isolated from HCMV seropositive individuals (15, 43). The mouse monoclonal NAb recognized different quaternary conformational epitopes formed by UL128/130/131A (1B2, 12E2) or UL130/131A (21F6, 54E11) (15), a continuous neutralizing epitope at the C-terminus of UL128 (1365) (14), or different epitopes within gH (62-11, 62-100, 18F10, 21E9, 2-80) (15). Utilizing the isolated mouse NAb it was confirmed that the P2A-linked PC subunits encoded by the second generation MVA-PC vectors assembled with each other and formed PC- and gH-specific neutralizing epitopes (83). To verify whether the P2A-linked PC subunits when co-expressed by MVA together with gB and pp65 retain the ability to form complexes and present neutralizing epitopes, cell surface flow cytometry staining of BHK cells infected with MVA$^B$-7Ag1 (FIG. 2A) and the control vectors (FIG. 3) were performed utilizing the isolated NAb. As shown in FIG. 6B, BHK cells infected with MVA$^B$-7Ag1 (MVA$^B$-PC/gB/pp65) and all control vectors expressing the PC subunits (MVA$^B$-PC/gB, MVA$^B$-PC/pp65, MVA$^B$-PC) were stained efficiently and with similar intensity with all NAb. Only slightly lower staining intensity was observed with all NAb for MVA$^B$-PC-infected BHK cells. In contrast, staining with the NAb was not observed for BHK cells infected with the control vectors expressing only gB or pp65 (MVA$^B$-gB and MVA$^B$-pp65). These results suggest that the five PC subunits when co-expressed together with gB and pp65 by MVA can assemble into protein complexes that are transported to the cell surface and present a variety of neutralizing epitopes within the UL128/130/131A subunits and gH.

Example 4: Humoral Immune Responses Elicited by MVA$^B$-7Ag1 in Mice

To characterize the immunogenicity of the PC subunits, gB, and pp65 when co-expressed by MVA, the induction of HCMV-specific humoral and cellular immune responses by MVA$^B$-7Ag1 and the control vectors in C57BL/6 wild-type mice was compared. C57BL/6 mice were immunized three times in four-week intervals with the different MVA vectors by intraperitoneal (i.p.) route, and HCMV-specific immune responses were evaluated one week following the second booster immunization. As an additional control to better gauge the magnitude of the T cell responses, a previously generated and clinically evaluated MVA vaccine vector co-expressing pp65 together with an immediate-early 1/2 fusion protein (IE1/2) was included. This MVA vaccine vector, also known as Triplex (herein referred to as MVA-pp65/IE), showed robust expansion of T cell responses in HCMV seropositive and -negative adults in a phase I trial (39), and it is currently under evaluation in a phase II trial in hematopoietic cell transplant recipients (NCT02506933).

It has been shown previously that the first generation MVA-PC vector is substantially more immunogenic to elicit EC- and FB-specific NAb responses than MVA vectors expressing only PC subunit subsets (UL128/130/131A or gH/gL) or gB (81). This study used exclusively heat-inactivated immune sera and hence evaluated only complement-independent neutralizing responses, although antibodies targeting gB have been shown to exert their neutralizing function in part through complement (10, 42). Hence, to determine HCMV neutralization mediated through co-expression of the PC subunits and gB by MVA$^B$-7Ag1, HCMV NAb titers were measured in heat-inactivated immune sera in the absence or presence of guinea pig complement.

Figure 9A:
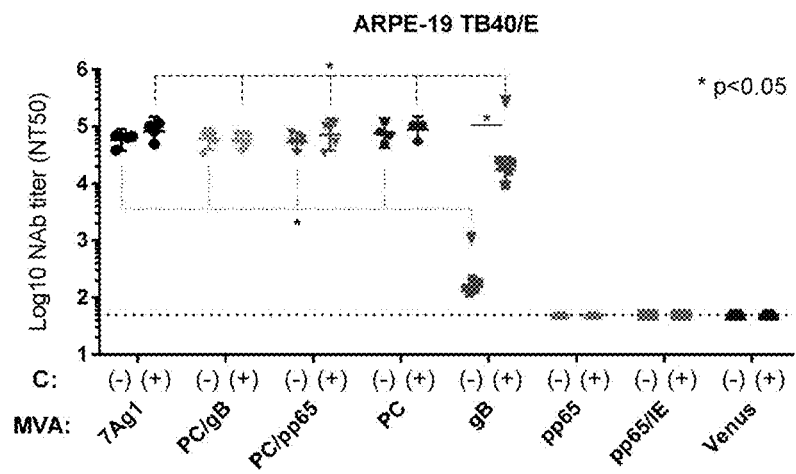
FIGS. 9A-9F show NAb responses induced by MVA$^B$-7Ag1 and the control vectors in mice. C57BL/6 mice (N=4-5) were vaccinated three times every four weeks by intraperitoneal (i.p.) route with MVA$^B$-7Ag1 (herein in the Figure panels designates as MVA$^B$-PC/gB/pp65) or the control vectors (MVA$^B$-PC/gB, MVA$^B$-PC/pp65, MVA$^B$-PC, MVA$^B$-gB, MVA$^B$-pp65), and HCMV-specific serum NAb titers (NT50; geometric mean titer (GMT)) were measured for the vaccine groups on ARPE-19 cells and MRC-5 cells against the HCMV strains TB40/E (FIGS. 9A, 9B), TR (FIGS. 9C, 9D), Towne (FIG. 9E), and AD169 (FIG. 9F) in the absence (−) or presence (+) of 5% guinea pig serum as a source of complement. Bars represent geometric mean with 95% confidence interval. Statistical significance of differences comparing each group was calculated using one-way analysis of variance (ANOVA) followed by Tukey's multiple comparison test (NS=p>0.05), while differences between NAb titers in the presence or absence of complement were calculated using two-way ANOVA followed by Sidak's multiple comparison test.
Figure 9B:
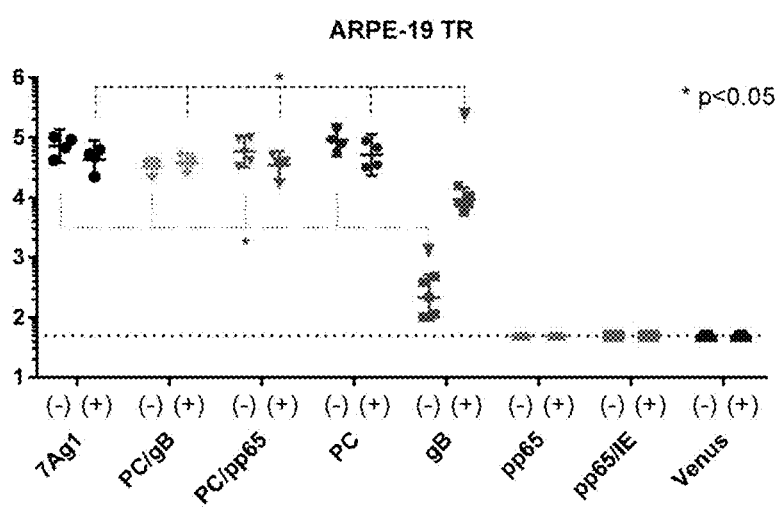
Figure 9C:
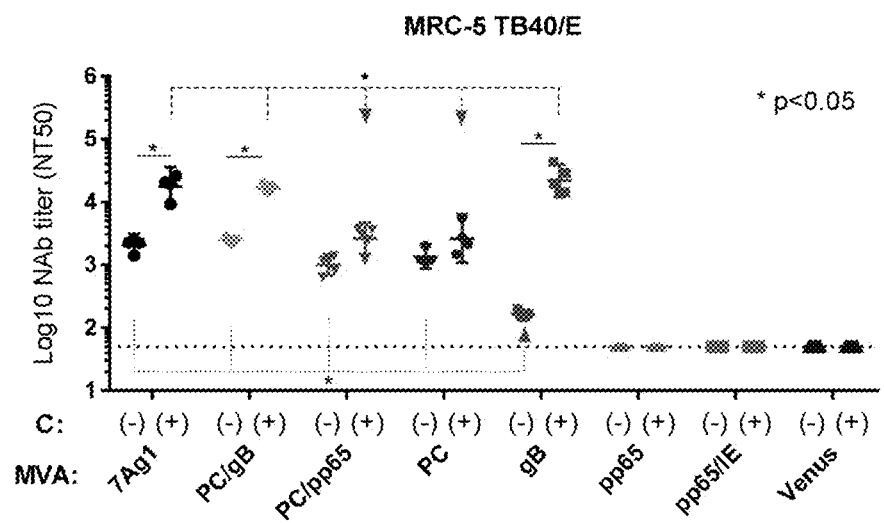
Figure 9D:
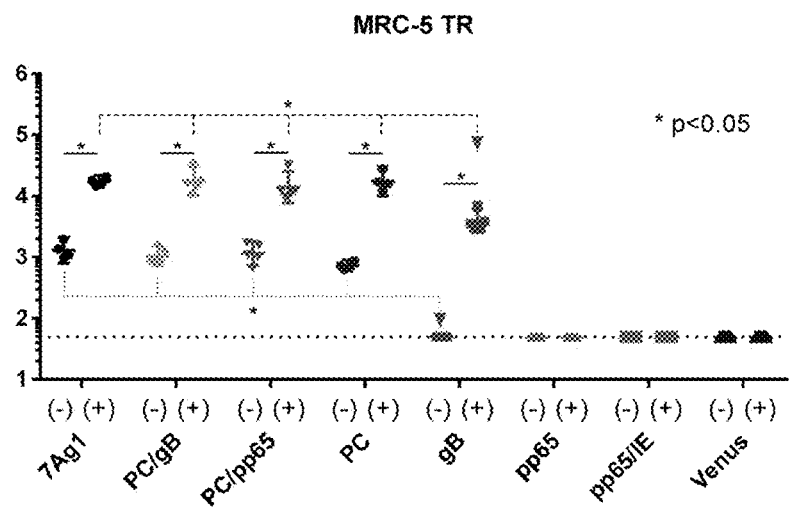
Figure 9E:
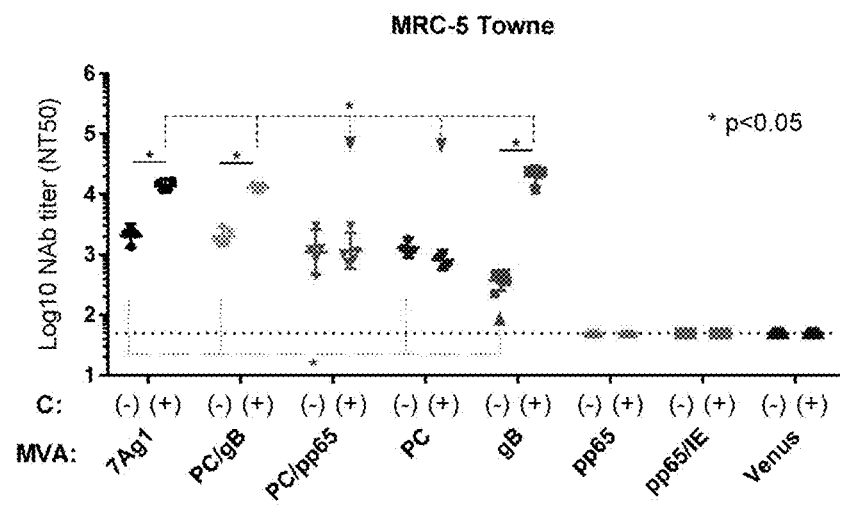
Figure 9F:
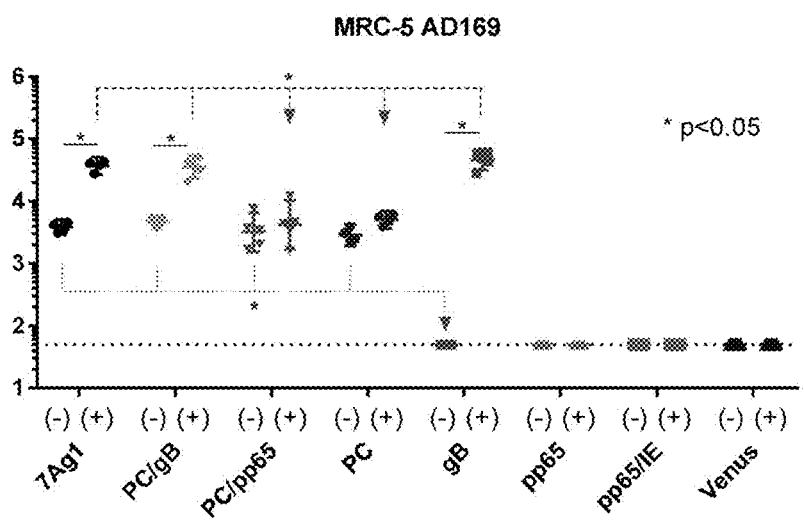

EC-specific NAb titers at which 50% HCMV infection was inhibited (NT50) were measured on ARPE-19 cells against HCMV strains TB40/E and TR, two so-called "clinical-like" HCMV strains that express an intact PC and that can efficiently infect EC, endothelial cells, and monocyte/macrophages (46). As shown in FIGS. 9A and 9B, MVA$^B$-7Ag1-derived immune sera (MVA$^B$-PC/gB/pp65) potently interfered with HCMV TB40E and TR infection of ARPE-19 cells in the absence of complement, although complement addition did not enhance the neutralization potency of the MVA$^B$-7Ag1-derived immune sera to prevent infection of ARPE-19 cells. These EC-specific neutralization potencies measured in the absence or presence of complement for MVA$^B$-7Ag1-derived immune sera were comparable to those measured for the immune sera derived with all control vectors expressing the PC subunits (MVA$^B$-PC/gB, MVA$^B$-PC-pp65, MVA$^B$-PC). Consistent with the known complement-dependent neutralizing activity of gB-specific NAb, the immune sera derived with MVA$^B$-gB showed only relatively low neutralization potency to block HCMV infection of ARPE-19 cells in the absence of complement, whereas in the presence of complement the neutralization potency of the MVA$^B$-gB-derived immuno sera to block HCMV infection of ARPE-19 cells increased substantially. However, the ARPE-19-specific neutralization potencies measured for the immune sera derived with MVA$^B$-gB in either the absence or presence of complement against TB40/E or TR were significantly lower than those measured for the immune sera derived with MVA$^B$-7Ag1 and all control vectors expressing the PC subunits (MVA$^B$-PC/gB, MVA$^B$-PC-pp65, MVA$^B$-PC). The control vectors MVA$^B$-pp65 and MVA-pp65/IE (MVA-Venus) did not elicit measurable NAb responses that blocked infection of ARPE-19 cells.

These observations in mice suggest that MVA$^B$-7Ag1 can stimulate potent EC-specific NAb responses against two "clinical-like" HCMV strains. Co-expression of the PC subunits, gB, and pp65 by MVA$^B$-7Ag1 does neither interfere with nor enhance the induction of in vitro measurable EC-specific NAb responses when compared to the expression of the PC subunits alone by MVA. In addition, these results confirm that the PC is superior to gB as an immunogen to stimulate EC-specific NAb responses and suggest that the EC-specific NAb responses induced by MVA$^B$-7Ag1 are dominated by complement-independent NAb responses that target the PC. Based on these in vitro measurements, it appears that the PC when vectored by MVA might be sufficient to stimulate EC-specific NAb responses, although the complement-dependent neutralizing activity of gB-specific NAb induced by the MVA$^B$-7Ag1 vector that interferes with EC infection could be masked by the potency of NAb that target the PC.

FB-specific NAb responses stimulated by the different vaccine vectors in the immunized C57BL/6 mice were measured on MRC-5 cells against TB40/E and TR, and additionally against the laboratory HCMV strains Towne and AD169, which are both defective in expressing an intact PC and therefore unable to efficiently infect EC, endothelial cells, and macrophages (46). As shown in FIGS. 9C-9F, MVA$^B$-7Ag1-derived immune sera (MVA$^B$-PC/gB/pp65) potently neutralized MRC-5 FB infection with all four HCMV strains in the absence of complement. Contrary to the measurements with ARPE-19 cells where complement addition did not enhance the neutralizing potency of MVA$^B$-7Ag1-derived immune sera, the MVA$^B$-7Ag1-derived immune sera consistently showed increased neutralizing activity against all tested HCMV strains when NAb titers were measured on MRC-5 cells in the presence of complement (FIGS. 9C-9F).

Similar MRC-5-specific NAb titers to those measured for the MVA$^B$-7Ag1-derived immune sera were measured in the absence or presence of complement against all different HCMV strains for the immune sera derived with the MVA$^B$-PC/gB control vector. The immune sera derived with the control MVA vectors that expressed the PC subunits without gB (MVA$^B$-PC/pp65 and MVA$^B$-PC) showed similar neutralization potencies to interfere with MRC-5 FB infection as the immune sera derived with MVA$^B$-7Ag1 and MVA$^B$-PC/gB when NAb titers were determined in the absence of complement. However, in contrast to the immune sera derived with MVA$^B$-7Ag1 and MVA$^B$-PC/gB, the immune sera derived with MVA$^B$-PC/pp65 and MVA$^B$-PC showed enhanced MRC-5-specific neutralizing activity in the presence of complement only when NAb responses were measured against HCMV strain TR, but not when NAb responses were measured against HCMV strains TB40/E, Towne or AD169. Similar to the measurement with ARPE-19 cells for the immune sera derived with MVA$^B$-gB, the MVA$^B$-gB-derived immune sera showed no or only relative low potency to interfere with MRC-5 FB infection in the absence of complement, but they showed substantially increased neutralizing activity against all HCMV strains in the presence of complement. However, the MRC-5-specific neutralization potencies measured in the presence of complement for the MVA$^B$-gB-derived immune sera reached only levels of comparable magnitude to those measured for the immune sera derived with the MVA$^B$-7Ag1 and MVA$^B$-PC/gB vectors when they were evaluated with against TB40/E, Towne, or AD169, but not when they were evaluated against TR. The control vectors MVA$^B$-pp65, MVA-pp65/IE, and MVA-Venus did not stimulate detectable MRC-5-specific NAb.

These results overall show that MVA$^B$-7Ag1 co-expressing the PC subunits, gB, and pp65 and control vector MVA$^B$-PC/gB co-expressing only the PC subunits and gB stimulate comparable complement-independent and complement-dependent NAb responses that potently and consistently interfere in vitro with FB infection by four different HCMV strains. In contrast, the control MVA vectors expressing only the PC subunits (MVA$^B$-PC/pp65 and MVA$^B$-PC) or only gB (MVA$^B$-gB) stimulate NAb responses that confer overall lower and more variable neutralizing activity against the different HCMV strain than MVA$^B$-7Ag1 and MVA$^B$-PC/gB co-expressing the PC subunits and gB. Hence, these results provide the first proof-of-concept showing that the combination of the PC subunits together with gB in a subunit vaccine formulation, as herein demonstrated with MVA, can enhance the stimulation of NAb responses that interfere in vitro with FB infection by heterologous HCMV strains.

Example 5: ADCC-Promoting Responses Induced by MVA$^B$-7Ag1 in Mice

Based on the induction of complement-dependent NAb by MVA$^B$-7Ag1 (MVA$^B$-PC/gB/pp65) and the control vectors expressing gB (MVA$^B$-gB and MVA$^B$-PC/gB), it was hypothesized that the expression of gB by MVA$^B$-7Ag1 could promote antibody-dependent cellular cytotoxicity (ADCC), as complement-dependent cytotoxicity (CDC) or virolysis (CDV) and ADCC are promoted by similar IgG subclasses. All of these antibody functions could be an important to provide protection against HCMV infection. To address this hypothesis, a surrogate ADCC reporter assay was employed to measure ADCC-promoting antibody responses in the vaccine-derived immune sera that bind to ARPE-19 cells infected with either HCMV TB40/E or TR.

Figure 10A:
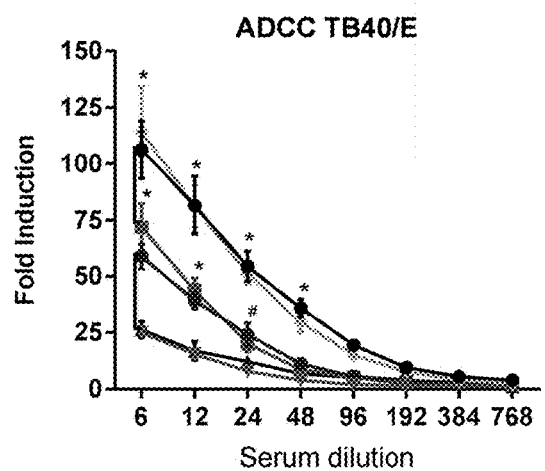
FIGS. 10A-10D show humoral immune responses mediating ADCC and binding antibodies induced by MVA$^B$-7Ag1 and the control vectors. The immune sera of the C57BL/6 mice immunized with MVA$^B$-7Ag1 (MVA-PC/gB/pp65) or the control vectors as described in FIG. 9 were evaluated for ADCC and binding antibodies.
Figure 10B:
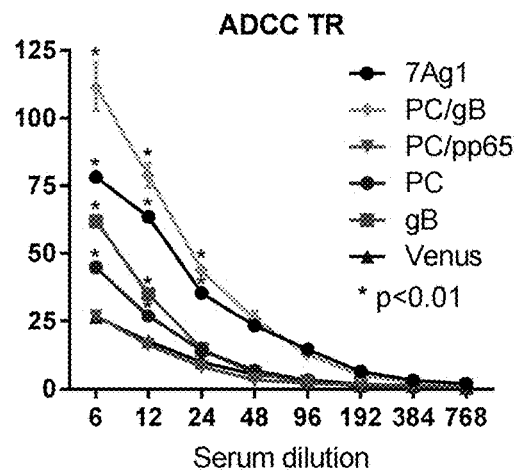
Figure 10C:
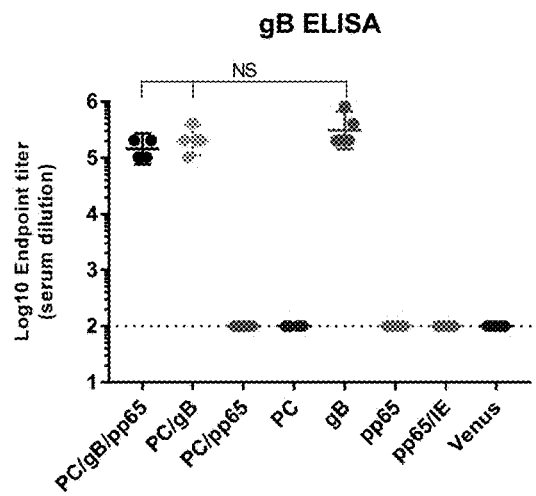
Figure 10D:
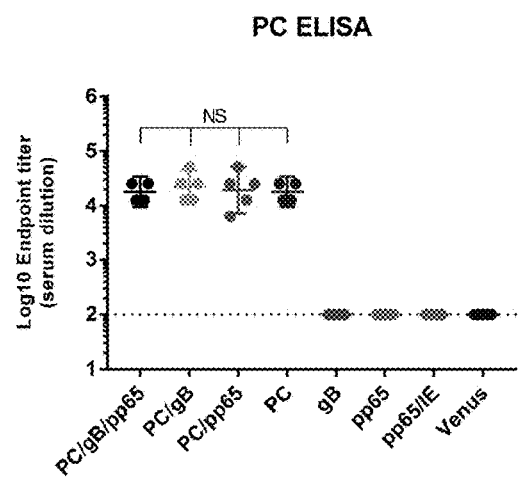

As shown in FIG. 10A, the immune sera derived with MVA$^B$-7Ag1 and MVA$^B$-PC/gB showed comparable potency to mediate ADCC when measurements were performed with TB40/E-infected cells. In contrast, significantly lower potencies to mediate TB40/E-specific ADCC compared to those measured for the immune sera derived with MVA$^B$-7Ag1 and MVA$^B$-PC/gB were measured for the immune sera derived with MVA$^B$-PC or MVA$^B$-gB. Surprisingly, the immune sera derived with MVA$^B$-PC/pp65 did not appear to promote TB40/E-specific ADCC, suggesting that pp65 in some instances may interfere with the PC immunogenicity to elicit ADCC-promoting responses. Similar levels of ADCC compared to those determined for the different vaccine groups with TB40/E-infected cells were determined for the different vaccine groups with TR-infected cells (FIG. 10B), with the notable difference that the TR-specific ADCC levels measured for MVA$^B$-PC/gB were higher than those measured for the MVA$^B$-7Ag1-derived immune sera. This may suggest that the expression of pp65 in MVA$^B$-7Ag1 can, to a minor extent, interfere with the immunogenicity of the PC subunits and gB to induce ADCC-promoting humoral immune responses. Importantly, the immune sera derived with MVA$^B$-7Ag1 and the control vectors contained comparable levels of gB-specific and PC-specific binding antibodies (FIGS. 10C-10D), supporting that co-expression of the seven HCMV antigens by MVA$^B$-7Ag1 does not substantially influence the immunogenicity of gB and the PC subunits to stimulate humoral immunity. Only slightly lower gB binding antibodies were measured for the immune sera derived with MVA$^B$-7Ag1 when compared to the immune sera derived with MVA$^B$-PC/gB and MVA$^B$-gB, yet this did not reach statistical significance. These results demonstrate that co-expression of the PC subunits and gB by MVA$^B$-7Ag1 can enhance the stimulation of antibody responses that promote ADCC. However, the additional expression of pp65 by MVA$^B$-7Ag1 may to a minor extent interfere with the PC and gB immunogenicity to stimulate ADCC promoting responses dependent upon HCMV strain.

Example 6: HCMV-Specific T Cell Responses Elicited by MVA$^B$-7Ag1 in Mice

One reason for the utilization of the C57BL/6 wild-type mice to evaluate the immunogenicity of the PC subunits, gB, and pp65 when co-expressed together by MVA$^B$-7Ag1 was prior knowledge about H2-b-restricted immunodominant peptides of the individual HCMV antigens (64). This knowledge provided the opportunity to investigate whether all seven HCMV antigens expressed by MVA$^B$-7Ag1 were efficiently processed in vivo to elicit peptide-specific T cell responses.

Figure 11A:
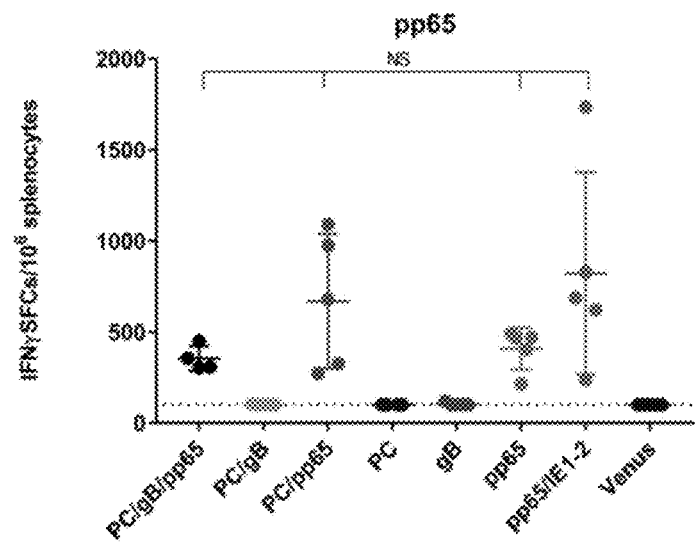
FIGS. 11A-11C show T cell responses induced by MVA$^B$-7Ag1 and the control vectors. The immune sera of the C57BL/6 mice immunized with MVA$^B$-7Ag1 (MVA$^B$-PC/gB/pp65) and control vectors were evaluated for T cell responses. Ex vivo T cell responses were determined by IFNγ-ELISPOT utilizing previously described mouse H2-b-restricted immunoreactive peptides of pp65 (FIG. 11A), gB (FIG. 11B), and the PC subunits (FIG. 11C) of HCMV. Horizontal lines represent the group mean and the bars the standard deviation. One-way ANOVA followed by Tukey's multiple comparison test was used to investigate differences between the groups (NS=p>0.05). Note that in FIG. 11C, with the exception of one mouse, all animals had an IFNγ response higher than the threshold and therefore differences between the groups could not be evaluated.
Figure 11B:
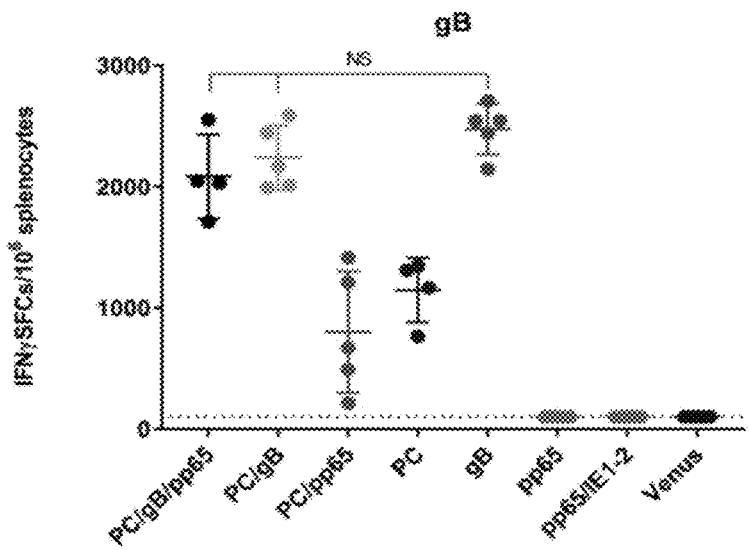
Figure 11C:
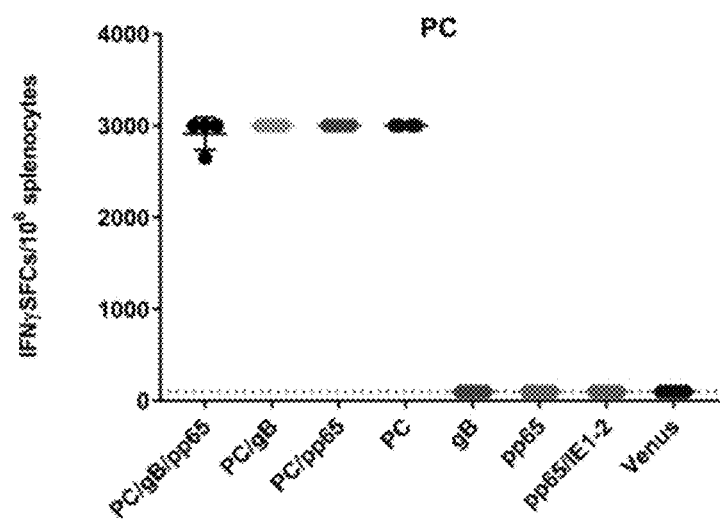

Using the H2-b-restricted peptides, ex vivo T cell responses were determined for the different vaccine groups by IFNγ ELISPOT. As shown in FIG. 11, MVA$^B$-7Ag1 (MVA$^B$-PC/gB/pp65) stimulated T cell responses that showed high-levels of reactivity with the peptides of the PC subunits, gB, and pp65, while T cells isolated from control vector immunized mice reacted in high-levels only with subsets of the peptide stimuli. Surprisingly, the T cells isolated from MVA$^B$-PC- or MVA$^B$-PC/pp65-immunized mice showed in lower levels also reactivity with the gB peptides, suggesting that the H2-b-restricted gB peptides reacted in this experiment to a minor extent non-specifically with PC-specific T cell responses induced by MVA$^B$-7Ag1. The frequency of peptide re-stimulation of the T cells isolated from MVA$^B$-7Ag1-immunized mice and T cells isolated from control vector immunized mice were generally comparable to one another, suggesting that co-expression of the PC subunits, gB, and pp65 by MVA$^B$-7Ag1 does not substantially influence the ability of these antigens to elicit T cells. In addition, the frequency of pp65-specific T cell responses derived from MVA$^B$-7Ag1-immunized mice was comparable to that derived from mice immunized with the clinically-evaluated MVA-pp65/IE vector ("Triplex"). Particularly high frequency T cell re-stimulation was observed with the PC peptides for mice immunized with MVA$^B$-7Ag1 or control vectors expressing the PC subunits (MVA$^B$-PC and MVA$^B$-PC/gB), suggesting that the PC subunits when expressed by MVA can stimulate high-level T cell responses. This is surprising considering that PC subunits have not been described as targets of potent T cell responses in humans (65). As expected, control vector MVA-Venus did not stimulate T cell responses that reacted with H2-b-restricted peptides of any of the HCMV antigens. These results suggest that the PC subunits, gB and pp65 expressed by MVA$^B$-7Ag1 can be efficiently processed in vivo and stimulate antigen-specific T cells.

Example 7: Durability of HCMV Immune Responses Induced by MVA-7Ag1 in Mice

Since the induction of sustained NAb could be important for an HCMV vaccine candidate, the durability of NAb responses induced by MVA-7Ag1 in Balb/c mice was evaluated. These mice are standardly used in the laboratory to investigate vaccine-induced humoral immunity, and these mice were used to demonstrate that the first and second generation MVA-PC vectors can stimulate potent and durable HCMV-specific NAb responses (81, 83). Balb/c mice were i.p. immunized three times in four weeks intervals with MVA-7Ag1 using a standard dose of MVA immunization ($5 \times 10^7$ PFU) or a five times lower dose than the standard dose ($5 \times 10^7$ PFU). MVA vectors expressing only the PC subunits (MVA-PC) or Venus were used as controls. NAb responses (NT50) were measured in the absence or presence of complement against TB40/E on MRC-5 FB and ARPE-19 EC before and after each immunization, and were followed over a period of 30 weeks after the initial immunization.

Figure 12A:
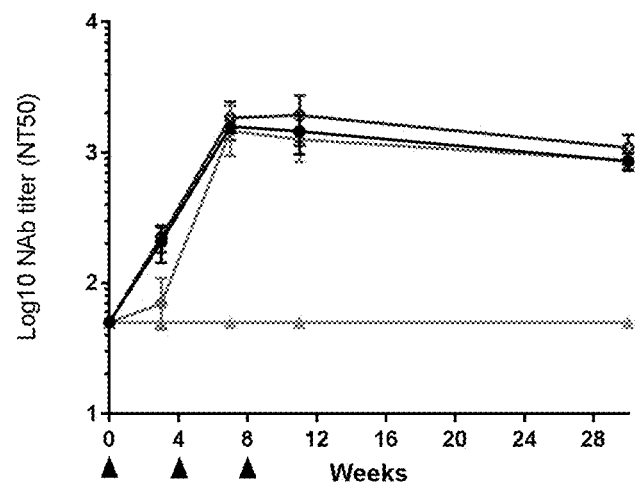
FIGS. 12A-12D show durability of HCMV immune responses induced by MVA-7Ag1 in mice. Balb/c mice were i.p. immunized three times (triangles) in four weeks intervals with MVA-7Ag1 (MVA-PC/gB/pp65) in either standard or low dose (LD), or control vectors MVA-PC and MVA-Venus in standard dose only.
Figure 12B:
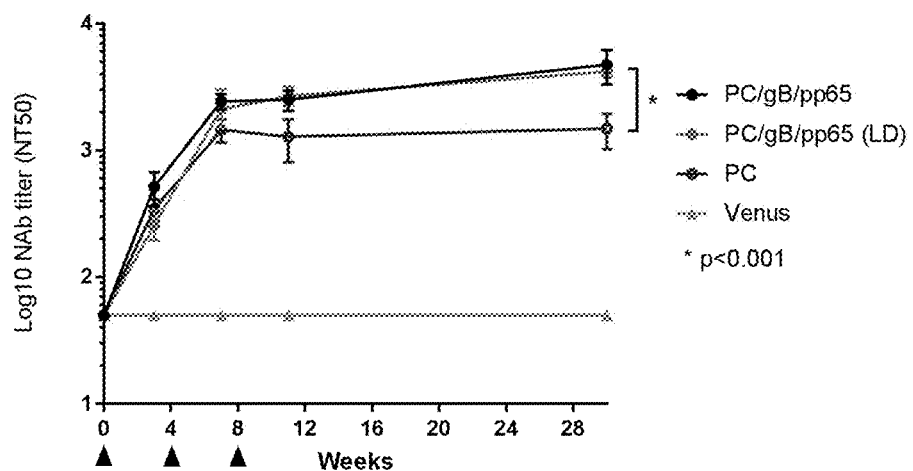
Figure 12C:
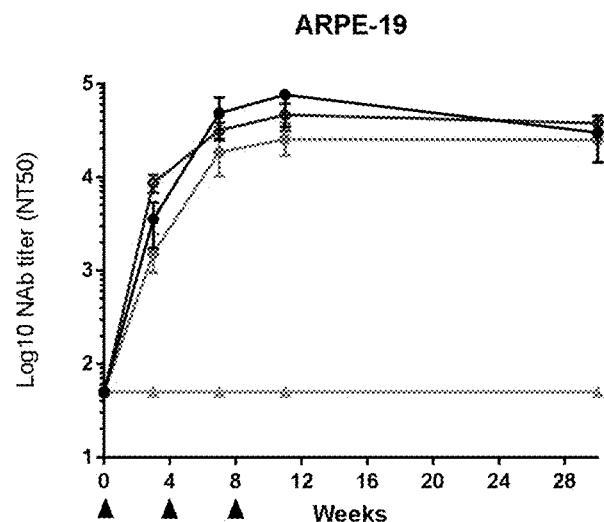

As shown in FIGS. 12A-12C, MVA-7Ag1 or control vector MVA-PC stimulated robust FB- and EC-specific NAb responses that remained relative stable during the entire 30 weeks investigation period. Similar to previous observations for the first and second generation MVA-PC vectors (81, 83), NAb responses induced by MVA-7Ag1 (in standard and low dose) or control vector MVA-PC were immediately detected after the first immunization, increased substantially after the first booster immunizations, and remained at comparable levels after the second booster immunization. While EC- and FB-specific NAb responses determined in the absence of complement were generally comparable between the MVA-7Ag1 vaccine groups (standard and low dose) and MVA-PC-immunized animals, FB-specific NAb responses measured after the second booster immunization in the presence of complement were significantly higher in the MVA-7Ag1 vaccine groups (standard and low dose) than in animals immunized with MVA-PC. Control vector MVA-Venus did not stimulate measurable EC or FB-specific NAb responses. These results confirm that the HCMV antigens expressed by MVA-7Ag1 can elicit potent and durable NAb responses in mice, whereby the combination of the PC subunits and gB within MVA-7Ag1 appears to enhance the induction of sustained complement-dependent NAb that block FB infection.

Figure 12D:
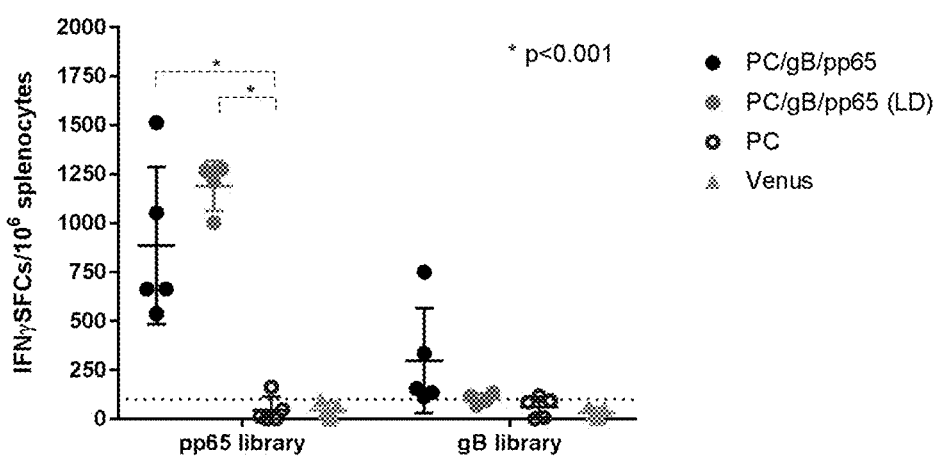

After an additional boost at week 30 post initial immunization, antigen-specific T cell responses of the immunized Balb/c mice were determined by IFNγ-ELISPOT using libraries of pp65- or gB-specific peptides (FIG. 12D). When using the pp65 peptides, robust and comparable levels of T cell responses were determined for mice immunized with either the standard or low dose of MVA-7Ag1, whereas no or only relatively low level T cell responses were measured for animals immunized with the MVA-PC vector or MVA-Venus. In contrast, when utilizing the gB peptides, robust T cell response were only detected for a proportion of animals immunized with the standard dose of MVA-7Ag1, and no or only very relative low levels of T cell responses were determined for all animals immunized with the low dose of MVA-7Ag1 or the control vectors. In a follow up experiment, similar levels and kinetics of NAb titers and levels of pp65-specific T cell responses could be confirmed for animals immunized with MVA-7Ag1 (without BAC vector) derived before (P0) and after ten (P10) virus passages on CEF cells (FIG. 13), suggesting that MVA-7Ag1 retains its immunological properties during long-term propagation on a cell substrate that is standardly used to produce MVA for clinical trials. In sum, these results suggest that MVA-7Ag1 can stimulate robust and durable HCMV humoral and cellular immune responses in Balb/c mice.

Example 8: Comparison of HCMV Immune Responses Induced by Different Seven-Antigen MVA Vectors in Mice To evaluate whether MVA expressing the seven HCMV antigens via only two separately inserted polycistronic expression constructs (MVA-7Ag5 and MVA-7Ag6) can afford similar immunogenicity as MVA expressing the seven HCMV antigens via four separately inserted expression constructs (MVA-7Ag1-6), the induction of HCMV-specific humoral and cellular immune responses of MVA-7Ag5 and MVA-7Ag6 was compared with that of MVA-7Ag4 in Balb/c mice. Balb/c mice were i.p immunized three times in four-week intervals with the BAC vector-free vaccine vectors, and EC- and FB NAb responses were determined at different time points following immunization.

Figure 13A:
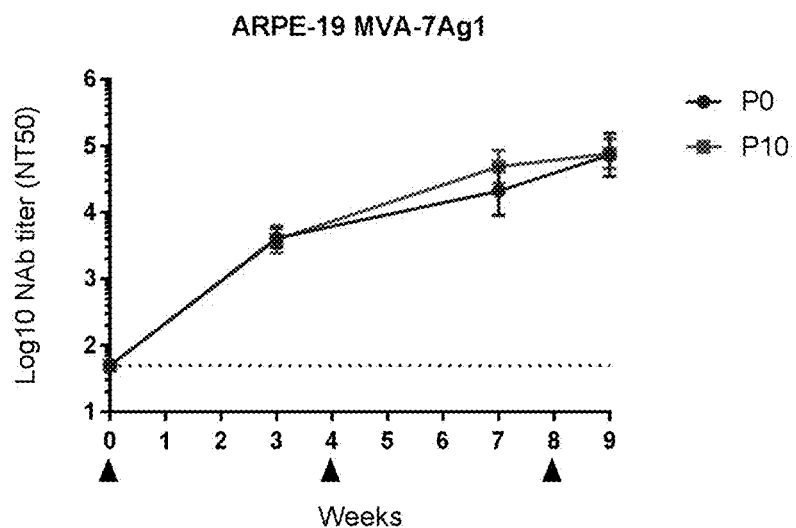
FIGS. 13A-13C show immunogenicity of MVA-7Ag1 following virus passage. Balb/c mice (n=8) were i.p immunized three times (triangles) in four weeks intervals with MVA-7Ag1 derived before and after 10 virus passages on CEF.
Figure 13B:
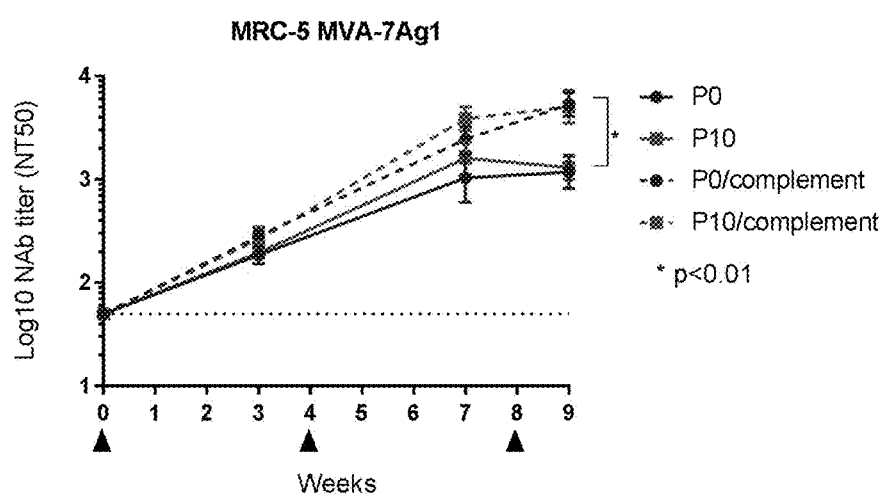
Figure 13C:
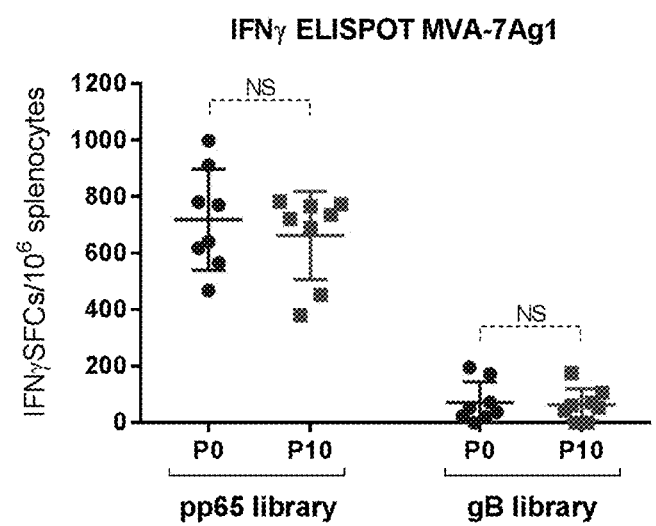
Figure 14A:
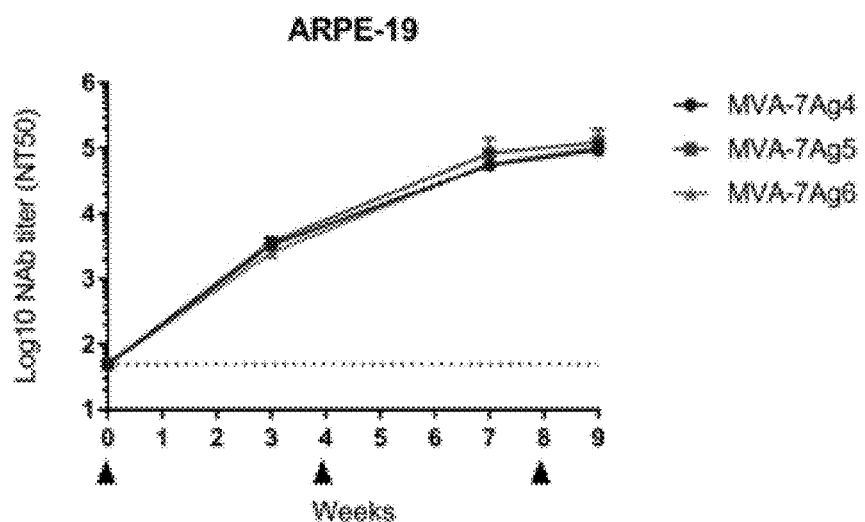
FIGS. 14A-14C show HCMV immune responses induced by MVA-7Ag4, MVA-7Ag5, and MVA-7Ag6 in mice. Balb/c mice were i.p. immunized three times (triangles) in four weeks intervals with MVA-7Ag4, MVA-7Ag5, or MVA-7Ag6 and NAb titers that prevented 50% infection (NT50) were measured against HCMV strain TB40/E on ARPE-19 cells in the absence of complement (14A), and on MRC-5 cells in the absence or presence of 5% guinea pig complement (14B).
Figure 14B:
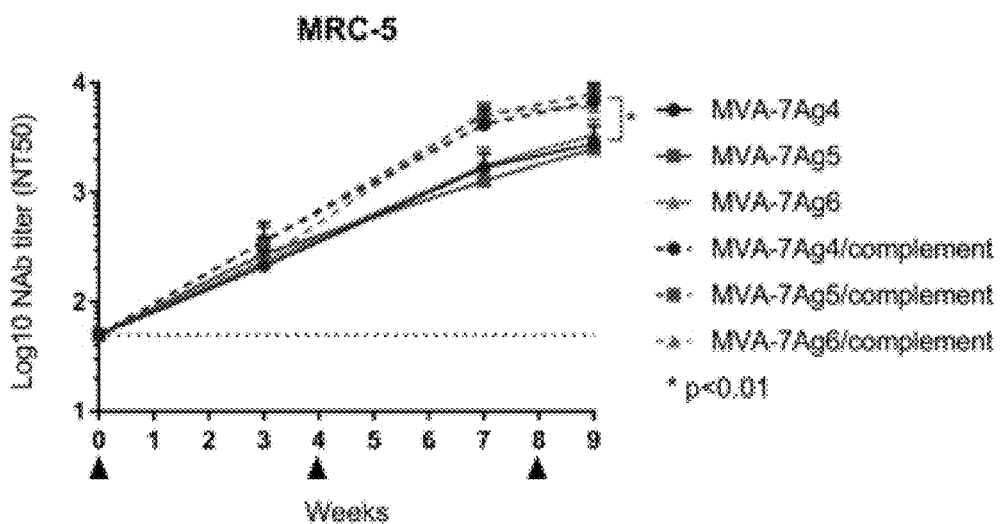
Figure 14C:
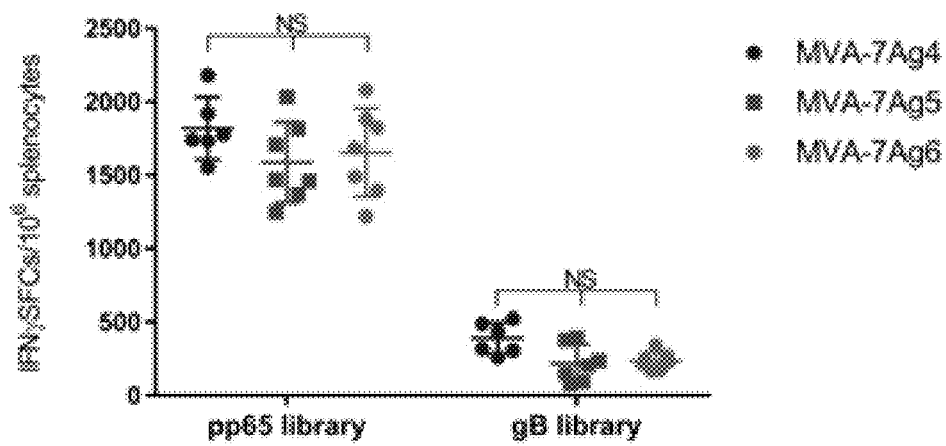

As shown in FIG. 14, both MVA-7Ag5 and MVA-7Ag6 stimulated potent NAb responses that were comparable to those induced by MVA-7Ag4. In addition, the antibody kinetics determined for the different vaccine vectors following immunization with the MVA-7Ag4-6 vectors were comparable to one another and were consistent with those of MVA-7Ag1 (FIGS. 12-14). Similar to the NAb responses stimulated by MVA-7Ag1, FB-specific NAb responses determined in the presence of complement for mice immunized with the MVA-7Ag4-6 vectors were significantly higher than those measured in the absence of complement for these vectors (FIG. 14B). T cell responses were determined one week following the second boost by IFNγ-ELISPOT using pp65- and gB-peptide libraries. The levels of T cell responses detected with the pp65 peptide were generally comparable between the vaccine groups, whereas only no or very low levels of T cells were detected with the gB library for all vaccine groups (FIG. 14C). These results suggest for MVA that the seven HCMV antigens expressed either from only two separate insertion sites or from four separate insertion sites afford comparable immunogenicity to stimulate HCMV humoral and cellular immune responses.

Example 9: Induction of Human MHC-Restricted T Cells Response by MVA-7Ag1

Figure 15A:
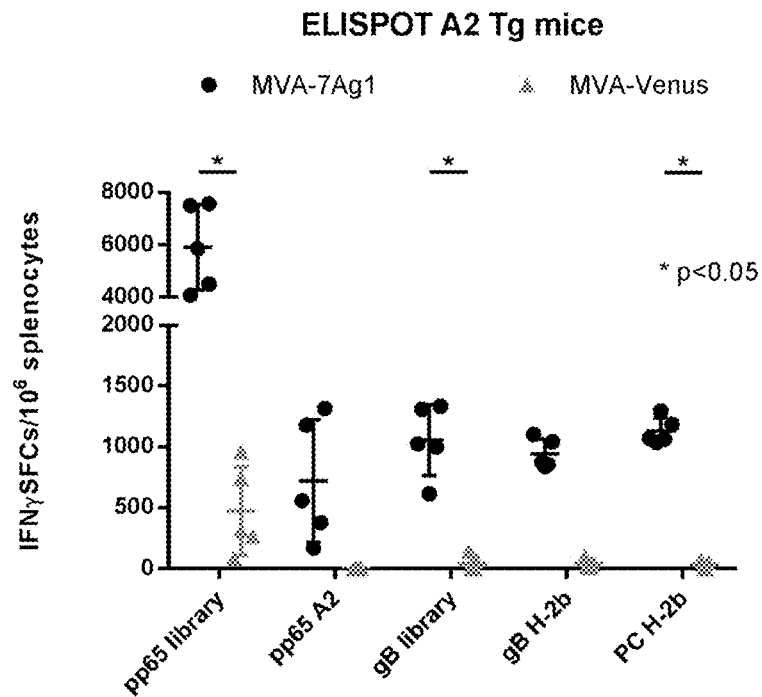
FIGS. 15A and 15B show human MHC-restricted T cell responses elicited by MVA-7Ag1. Transgenic C57BL/6 mice (n=5) expressing human HLA-A*0201 (A2 Tg, 15A) or HLA-B*0702 (B7 Tg, 15B) class I molecules were immunized two times in four weeks intervals with MVA-7Ag1 or MVA-Venus as control. One week following the booster immunization, antigen-specific T cell responses were determined by IFNγ-ELISPOT using pp65- and gB-specific peptide libraries, a HLA-A*0201 or HLA-B*0702-restricted immunodominant peptide epitopes of pp65, or pools of mouse H2-b restricted peptides of gB or the PC. Bars represent mean values with standard deviation. Significance of the difference between the groups was calculated using two-way ANOVA followed by Sidak's multiple comparisons test.
Figure 15B:
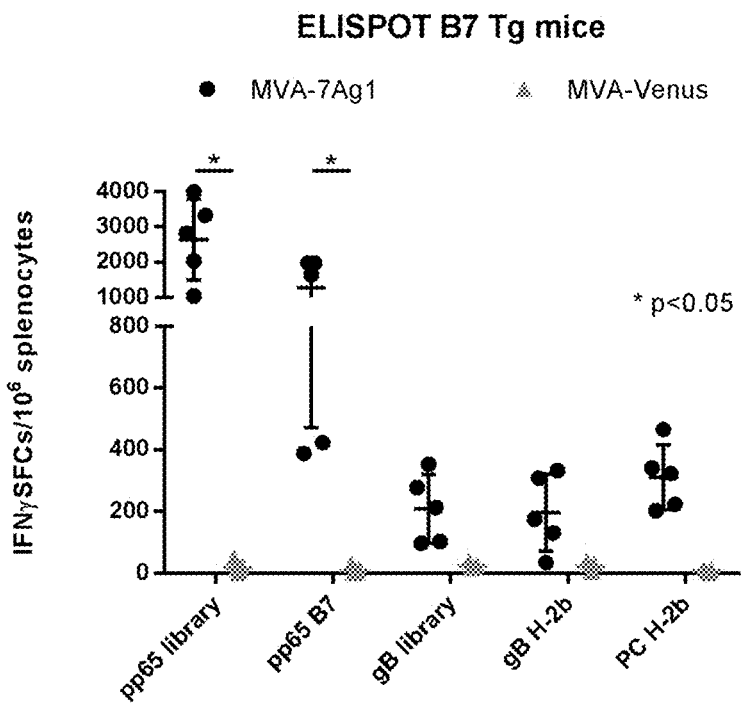

While the immunization studies with C57BL/6 and Balb/c mice showed that all HCMV antigens expressed by MVA-7Ag1 were efficiently presented by mouse MHC molecules, it remained unclear whether the antigens would also be efficiently presented by human MHC molecules. To address whether the HCMV antigens expressed by MVA-7Ag1 can be presented by human MHC, T cell induction by MVA-7Ag1 in two transgenic C57BL/6 mouse strains was evaluated. These transgenic mice are deficient in expressing mouse MHC class I molecules and contain transgenes of the commonly expressed HLA-A*0201 (A2 Tg mice) or HLA-B*0702 (B7 Tg mice) class I molecules (50, 56). When studying cellular immune responses to HCMV, these transgenic mice are an invaluable tool to evaluate HLA class I-restricted T cell responses because of their ability to efficiently process and present immunodominant epitopes of pp65 and other HCMV proteins in the context of HLA alleles (37, 40, 45, 88). Using IFNγ ELISpot, high-frequency T cell responses could be confirmed by ex vivo stimulation in MVA-7Ag1-immunized A2 and B7 Tg mice when using a pp65-specific peptide library, and in MVA-7Ag1-immunized B7 Tg mice also when using an HLA-B*0702-restricted immunodominant peptide epitope of pp65 (FIG. 15). In addition, ex vivo T cell responses were also confirmed for MVA-7Ag1-immunized A2 Tg mice using an HLA-A*0201-restricted immunodominant peptide epitope of pp65, and in MVA-7Ag1-immunized A2 and B7 Tg mice with a gB-specific peptide library and pools of mouse H2-b restricted peptides of gB and the PC subunits. These latter responses detectable in MVA-7Ag1-immunized A2 and B7 Tg mice by H-2b-restricted peptides may represent CD4+ T cells stimulated by mouse MHC class II presentation, or they may represent CD8+ responses stimulated via residual mouse MHC class I molecule expression (50). These results indicate that HCMV antigen expressed by MVA-7Ag1 can be efficiently presented by human MHC.

Figure 16A:
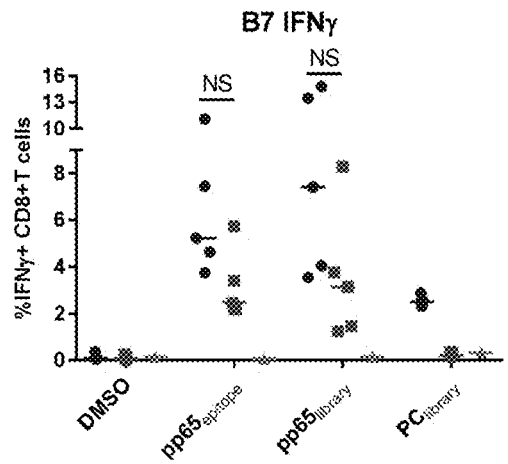
FIGS. 16A-16G show HLA-B*0702-restricted polyfunctional CD8+ T cells elicited by MVA-7Ag1.
Figure 16B:
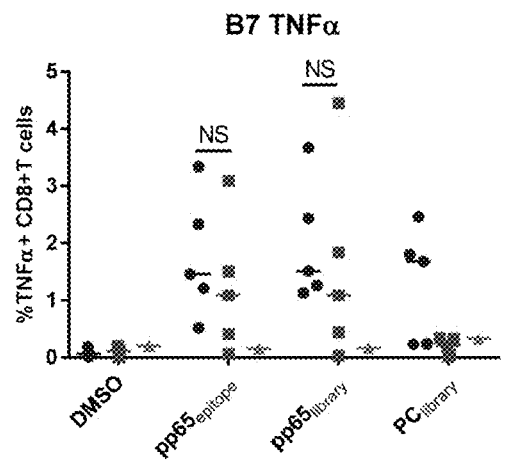
Figure 16C:
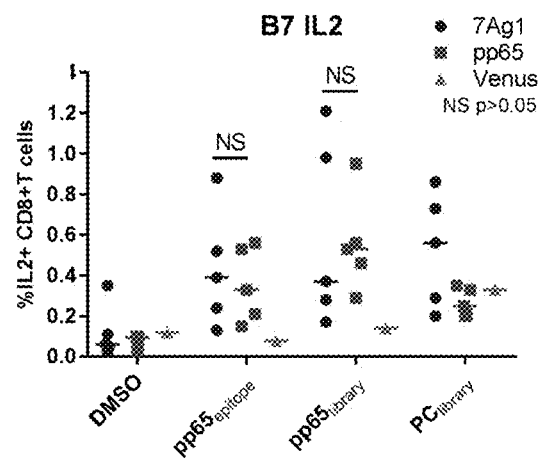
Figure 16D:
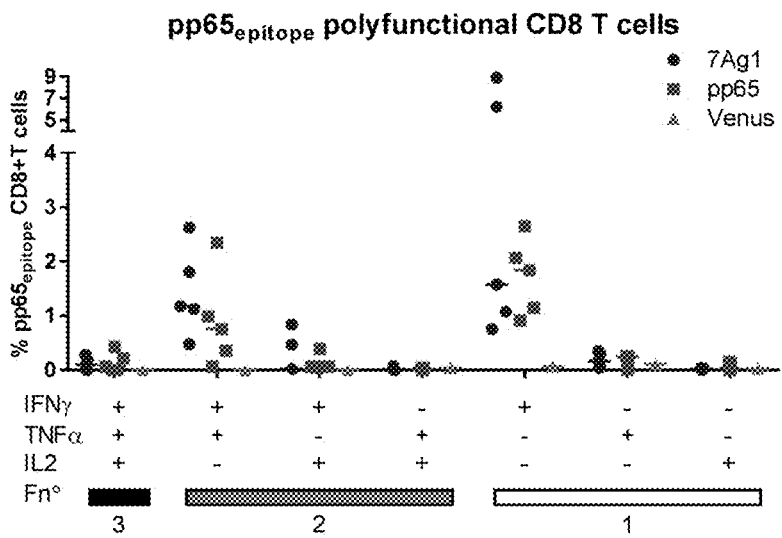
Figure 16E:
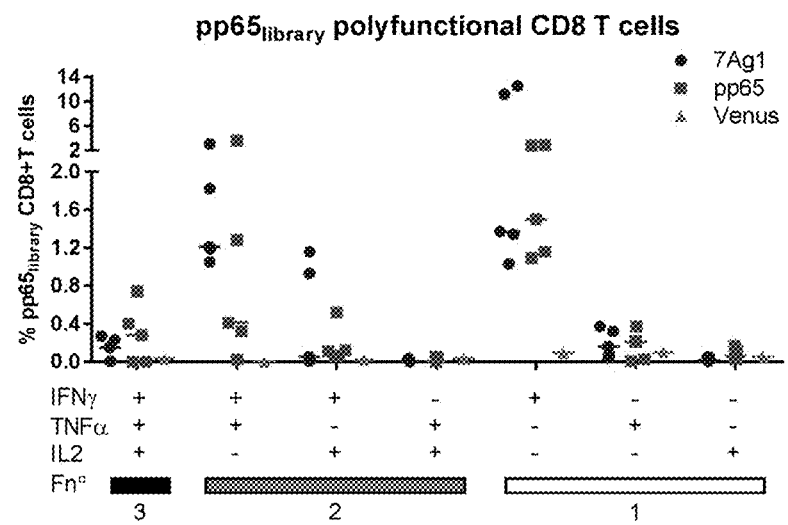
Figure 16F:
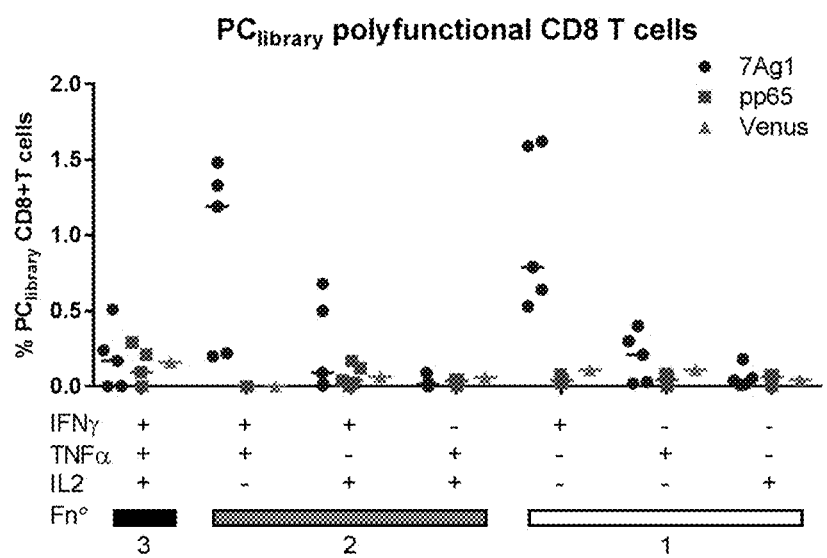
Figure 16G:
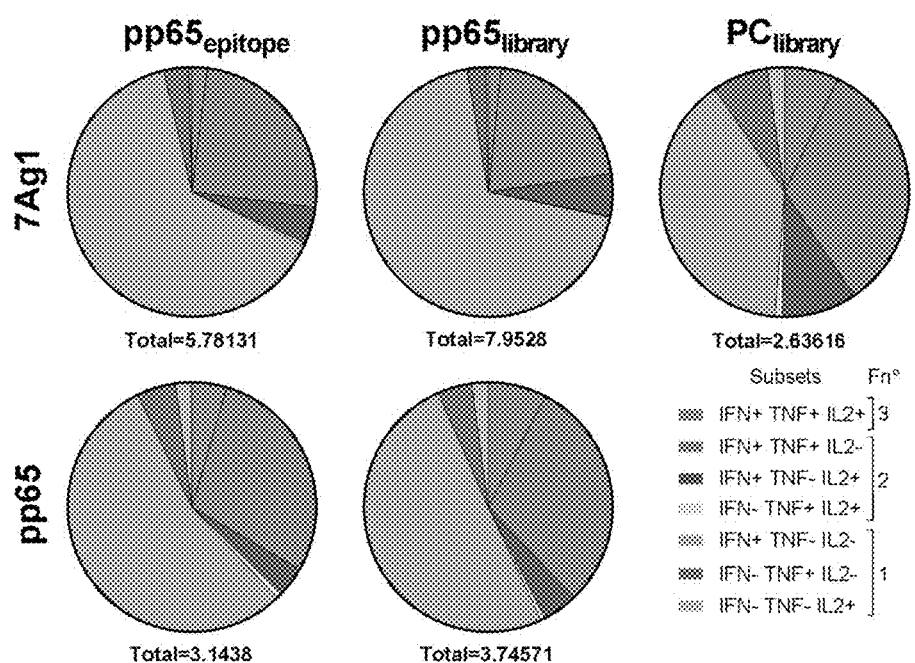

Since polyfunctionality of T cells has been implicated in preventing HCMV infection, whether the antigen-specific T cells induced by MVA-7Ag1 in A2 and B7 mice were polyfunctional was evaluated. A2 and B7 mice were immunized with MVA-7Ag1 or the control vectors MVA$^B$-pp65 and MVA-Venus, and T cell responses were evaluated by IFNγ, TNFα, and IL2 intracellular flow cytometry staining using HLA-A*0201- and HLA-B*0702-restricted pp65 peptide epitopes and pp65 and PC peptide libraries. As shown in FIGS. 16A-16C, MVA-7Ag1 and MVA$^B$-pp65 stimulated IFNγ-, TNFα-, and IL2-producing pp65-specific T cell responses in B7 mice, with highest amounts of pp65-specific T cells producing IFNγ, and lowest amounts of pp65-specific T cells producing IL2. Generally, pp65-specific T cells were detected at higher levels in MVA-7Ag1-immunized B7 mice than in MVA$^B$-pp65-immunized B7 mice (FIGS. 16A-16F), although this was not significant. In contrast, the proportion of polyfunctional pp65-specific T cells producing two or three cytokines appeared slightly reduced in MVA-7Ag1-immunized B7 mice compared to MVA$^B$-pp65-immunized B7 mice (FIG. 16G). Interestingly, MVA-7Ag1-immunized B7 mice also developed IFNγ-, TNFα-, and IL2-producing PC-specific T cells (FIGS. 16A-16F), and approximately half of the PC-specific T cells stimulated by MVA-7Ag1 in B7 mice were polyfunctional (FIG. 16G).

Figure 17A:
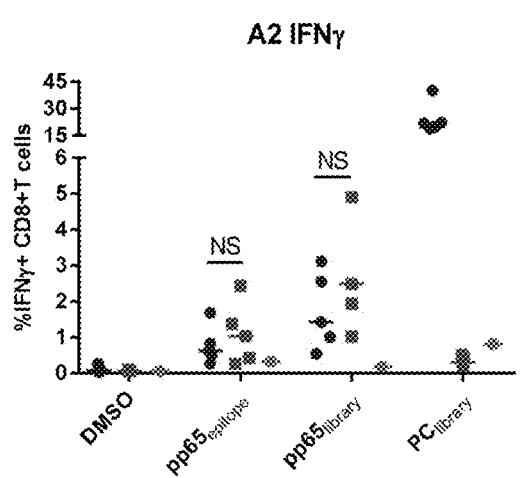
FIGS. 17A-17G show HLA-A*0201-restricted polyfunctional CD8+ T cells elicited by MVA-7Ag1. HLA-A*0201 (A2) transgenic mice (n=5) were immunized two times in four weeks intervals with MVA-7Ag1, MVA$^B$-pp65 (n=5) or MVA-Venus (n=1). One week post immunization, antigen-specific T cell responses were evaluated by multicytokine-ICS following stimulation with pp65- and PC-specific peptide libraries, or a HLA-A*0201-restricted immunodominant pp65 peptide epitope. Shown in the figures are the percentages of CD8+ T cells secreting IFNγ (FIG. 17A), TNFα (FIG. 17B) or IL-2 (FIG. 17C) following stimulation of splenocytes from A2 Tg immunized mice with different stimuli.
Figure 17B:
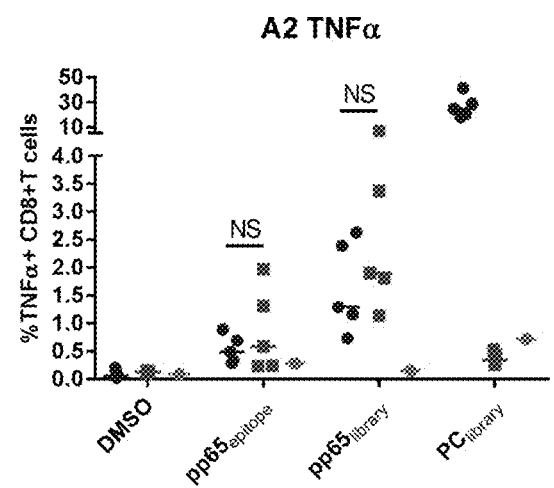
Figure 17C:
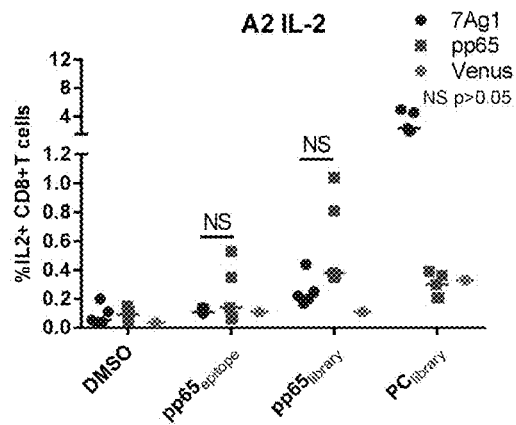
Figure 17D:
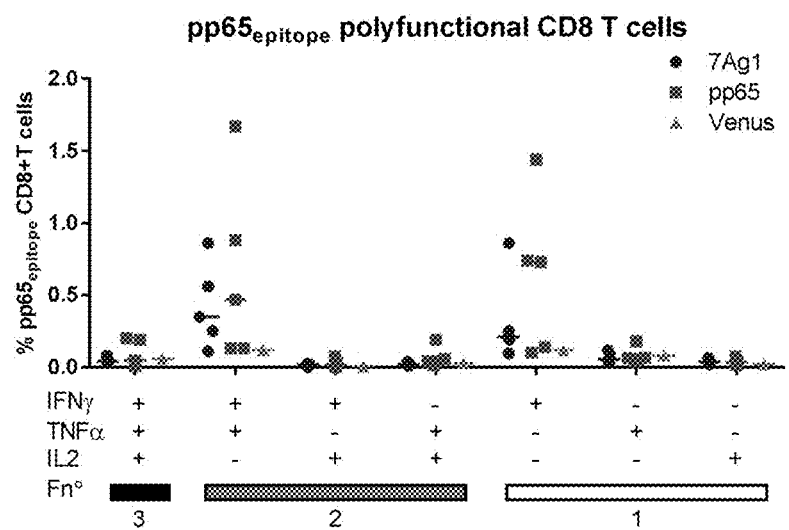
Figure 17E:
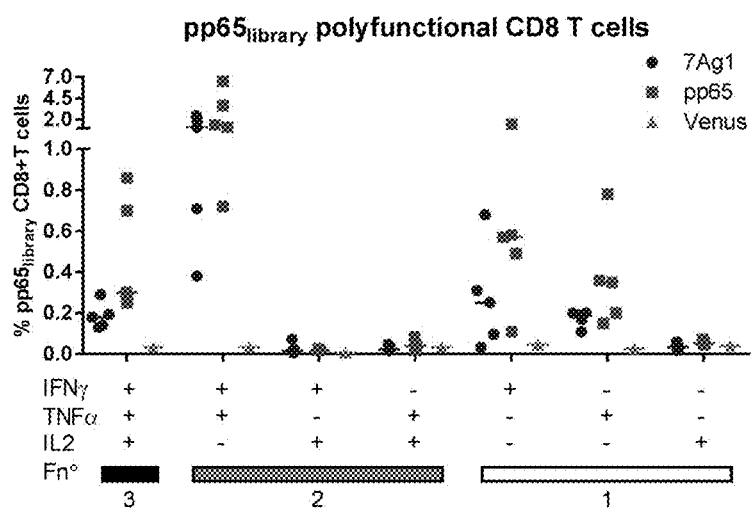
Figure 17F:
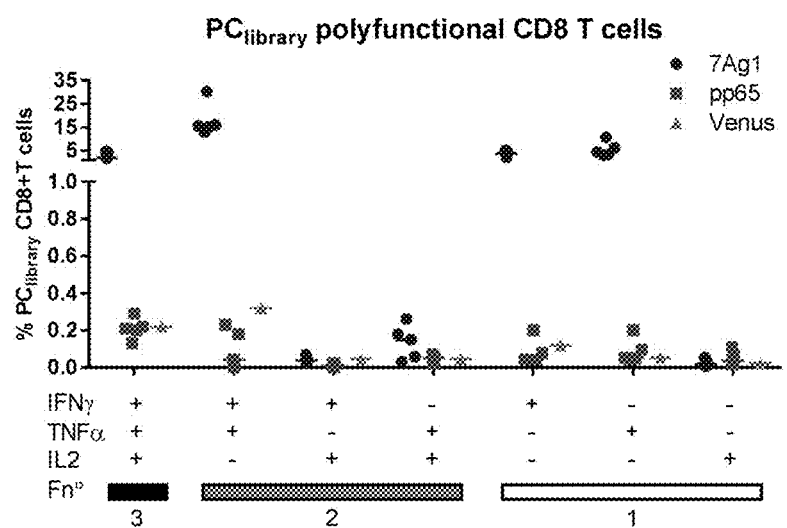
Figure 17G:
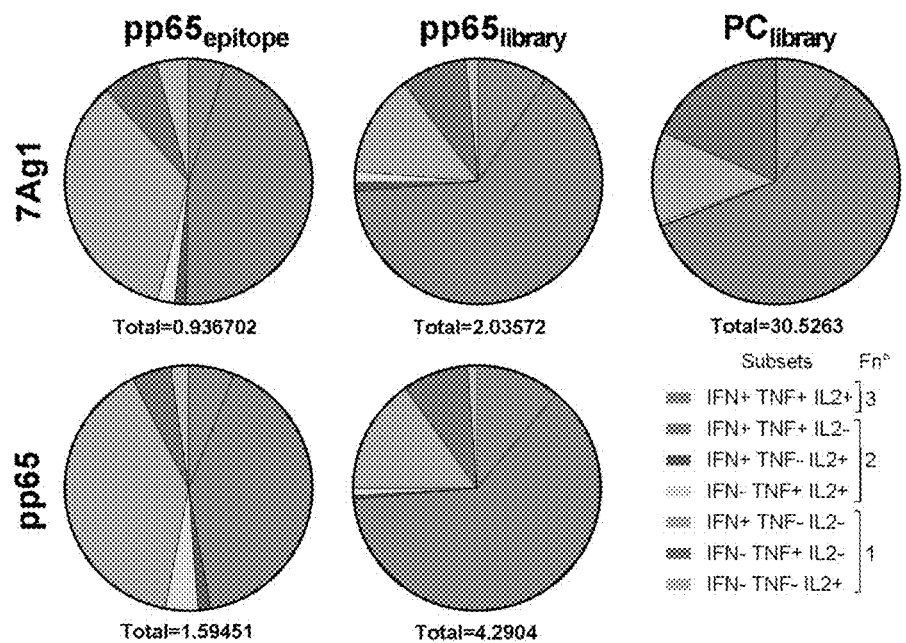
Figure 18A:
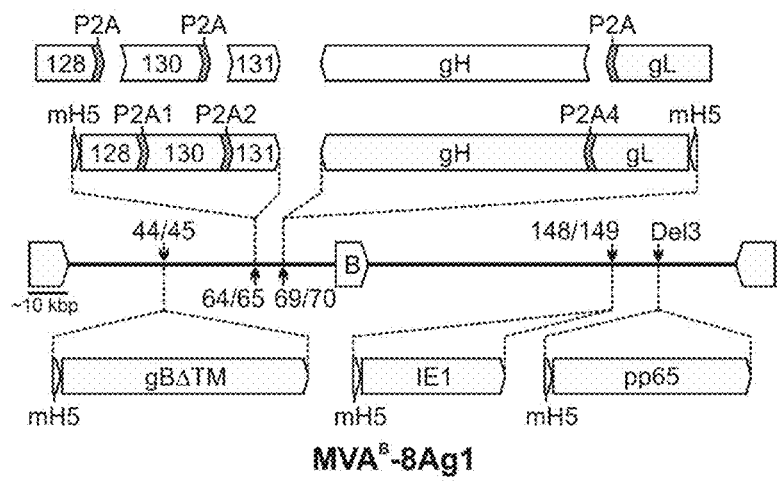
FIGS. 18A-18D illustrates construction of MVA expressing eight-antigenic HCMV antigens. Shown is the construction of MVA$^B$-8Ag1 (FIG. 18A), MVA$^B$-8Ag2 (FIG. 18B), MVA$^B$-8Ag3 (FIG. 18C), and MVA$^B$-8Ag4 (FIG. 18D) simultaneously expressing the PC subunits, gB, pp65, and IE1 of HCMV. P2A-linked, polycistronic and single antigen expression constructs of these eight HCMV antigens were inserted as indicated into different IGRs (44/45, 64/65, 69/70, 148/149) and the MVA Del3 site in MVA$^B$AC-TK. Different coding sequences (P2A1-6) were used for P2A signal sequences between the different HCMV antigens. mH5=Vaccinia modified H5 promoter; B=BAC vector.
Figure 18B:
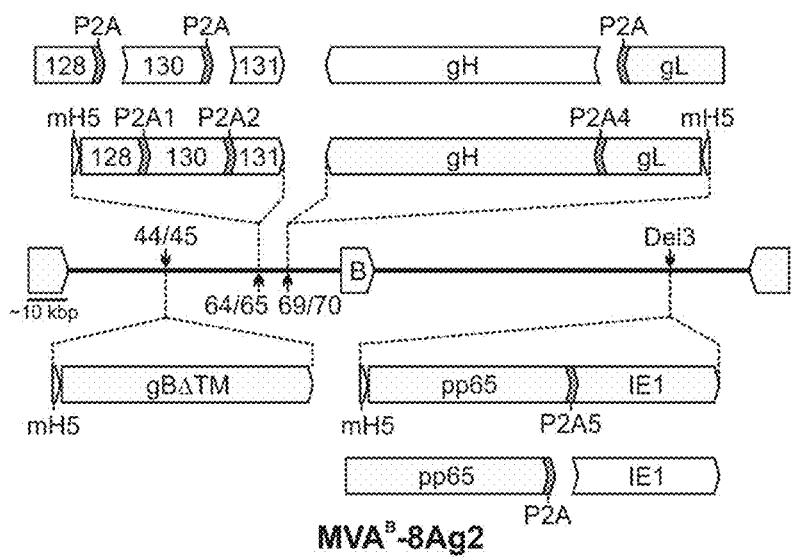
Figure 18C:
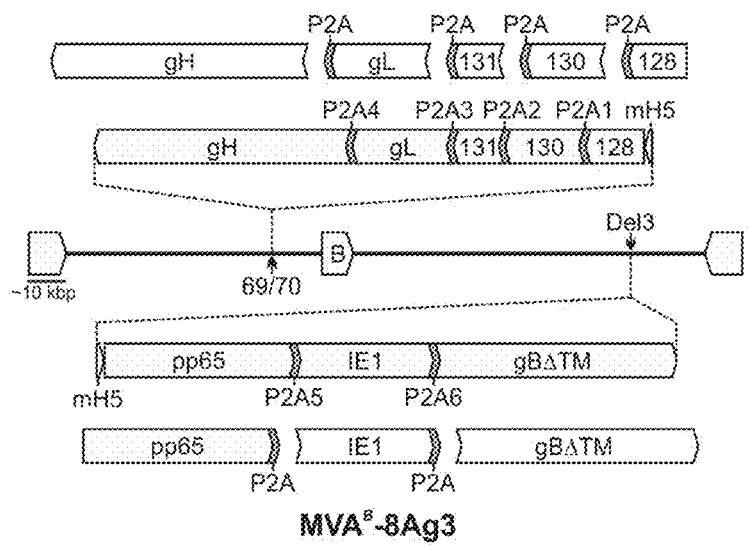
Figure 18D:
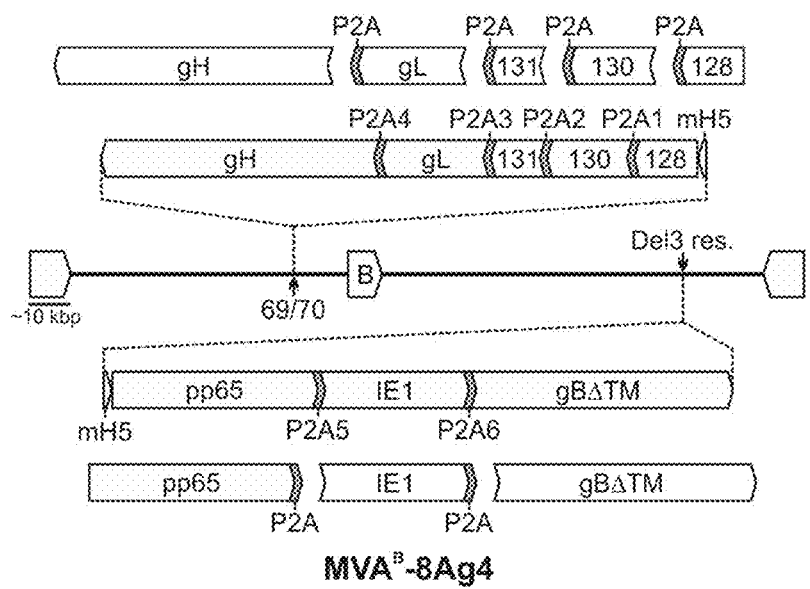

Compared to the pp65-specific T cell responses induced by MVA-7Ag1 in B7 mice, IFNγ-, TNFα-, IL2-producing pp65-specific T cell responses induced by MVA-7Ag1 in A2 mice were of lower level, and generally lower than those induced by MVA$^B$-pp65 in A2 mice (FIGS. 17A-17F), although the difference was not significant with the number of animals evaluated. Yet, unlike the pp65-specific T cells induced by MVA-7Ag1 and MVA$^B$-pp65 in B7 mice, the pp65-specific T cells induced by these vectors in A2 mice were mainly polyfunctional (FIGS. 17D-17G). Most strikingly, however, were the impressive levels of IFNγ-, TNFα-, and IL2-producing PC-specific T cells induced by MVA-7Ag1 in A2 mice, reaching up to 45% of the total CD8+ T cell population (FIGS. 17A-17F). In addition, more than half of these high-level PC-specific T cells induced MVA-7Ag1 in A2 mice were polyfunctional (FIG. 17G). These results in transgenic mice suggest that pp65 and the PC subunits expressed by MVA-7Ag1 can be efficiently processed and presented by different HLA-molecules to stimulate polyfunctional T cell responses.

Example 10: Construction of MVA Expressing Eight HCMV Antigens

Utilizing MVABAC-TK and En passant mutagenesis (72, 83), various MVA vectors (MVA$^B$-8Ag1-4) were generated that simultaneously expressed all five PC subunits (gH, gL, UL128, UL130, and UL131A), gB, pp65 and IE1 of HCMV (FIG. 18). Utilizing two, four, or five different MVA insertion sites the eight HCMV antigens were inserted in different combinations as P2A-linked polycistronic and single antigen expression constructs into the IGR 44/45, 64/65, 69/70, and 148/149, and Del3.

Example 11: HCMV Antigens Expression by MVA-8Ag Vectors

Figure 19:
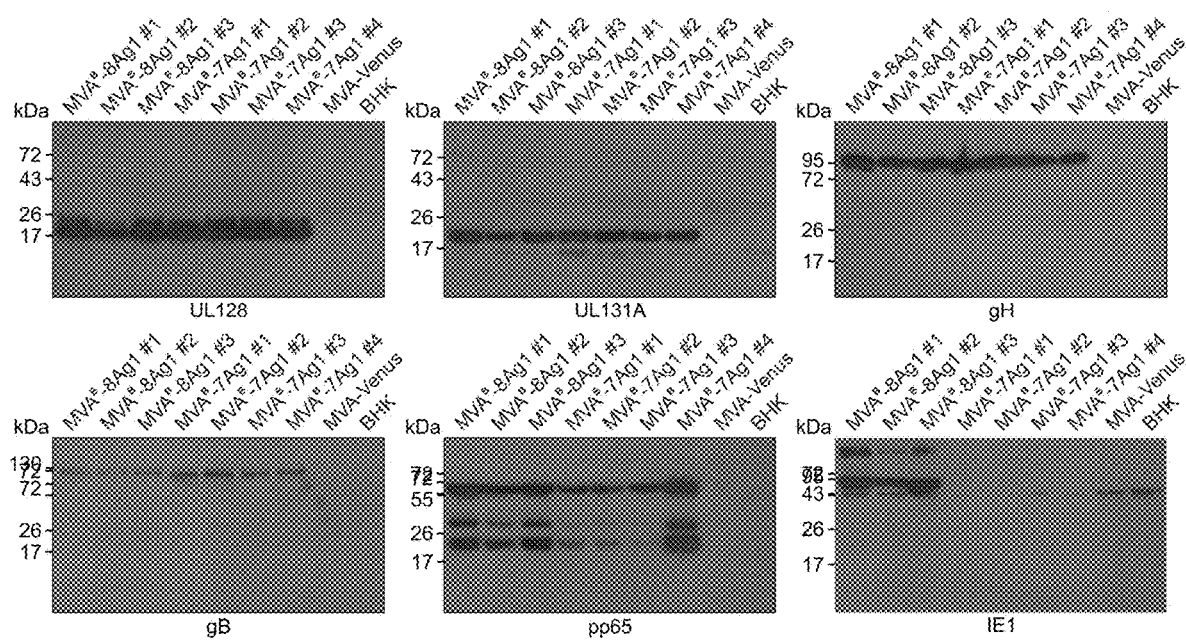
FIG. 19 shows examples for HCMV antigen expression by MVA$^B$-8Ag1 Shown are Immunoblots for comparing HCMV antigen expression in BHK cells infected with different clones of MVA$^B$-8Ag1 or MVA$^B$-7Ag1 using polyclonal and monoclonal antibodies for detection. BHK cells infected with MVA-Venus and uninfected cells were used as controls. The Vaccinia virus BR5 protein was detected for loading control.
Figure 20:
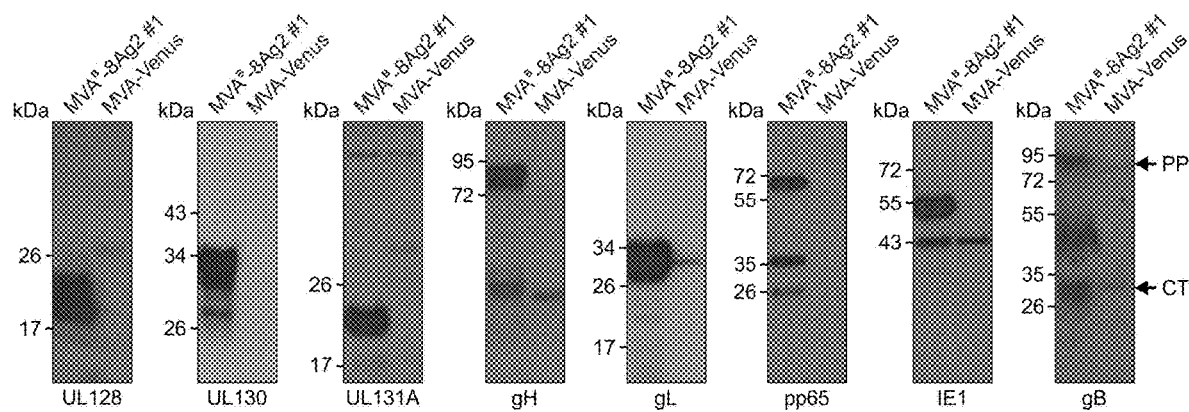
FIG. 20 shows HCMV antigen expression by MVA$^B$-8Ag2. Shown are Immunoblots for the detection of the HCMV antigens in BHK cells infected with MVA$^B$-8Ag2 or MVA-Venus as a control. Monoclonal and polyclonal antibodies were used for the antigen detection. PP=precursor protein; CT=C-terminal cleavage product.
Figure 21:
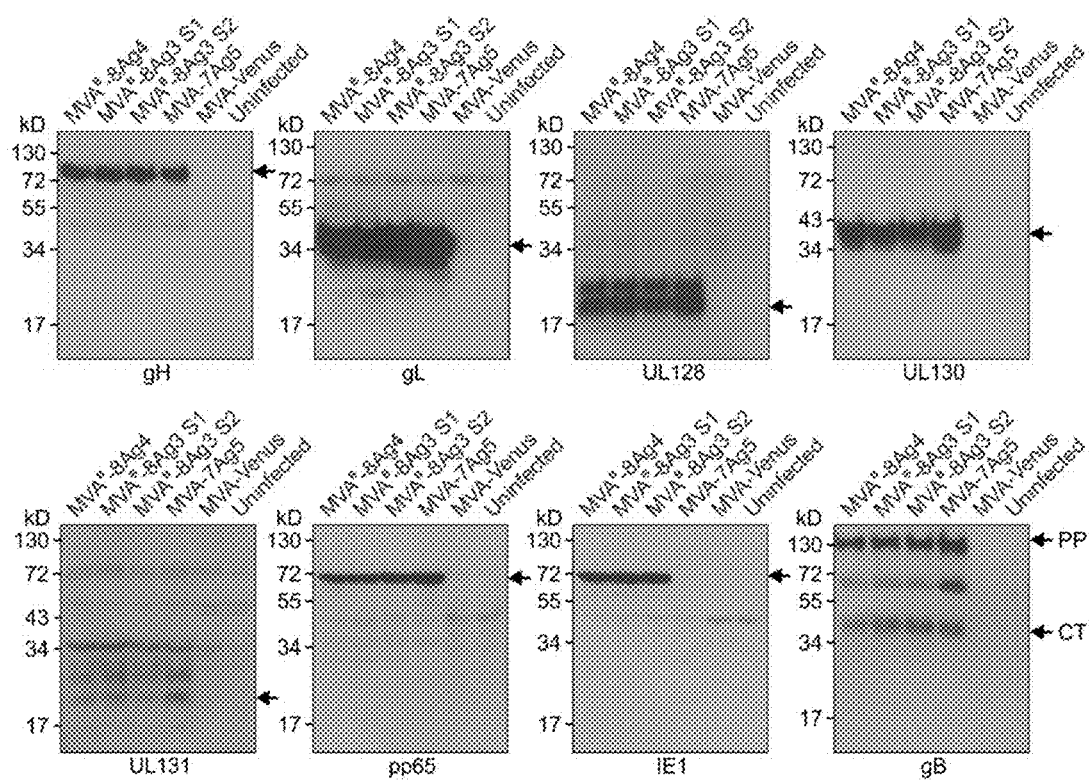
FIG. 21 shows HCMV antigen expression by the eight-antigen vectors MVA$^B$-8Ag3 and MVA$^B$-8Ag4. Shown are Immunoblots for the detection of the eight HCMV antigens expressed by MVA$^B$-8Ag3 and MVA$^B$-8Ag4. BHK cells were infected with MVA$^B$-8Ag3 from two different stocks (S1 and S1) or MVA$^B$-8Ag4 and whole cell lysates of infected BHK cells were analyzed by Immunoblots using monoclonal (gH, gB, pp65, UL130, 1E1) and polyclonal (UL128, gL, UL131A) antibodies. Cells infected with the seven-antigen vector MVA-7Ag5 or MVA-Venus or uninfected cells were analyzed for control. Arrows indicate approximate expected protein sizes of the HCMV subunits. PP=precursor protein CT=C-terminal cleavage product.
Figure 22:
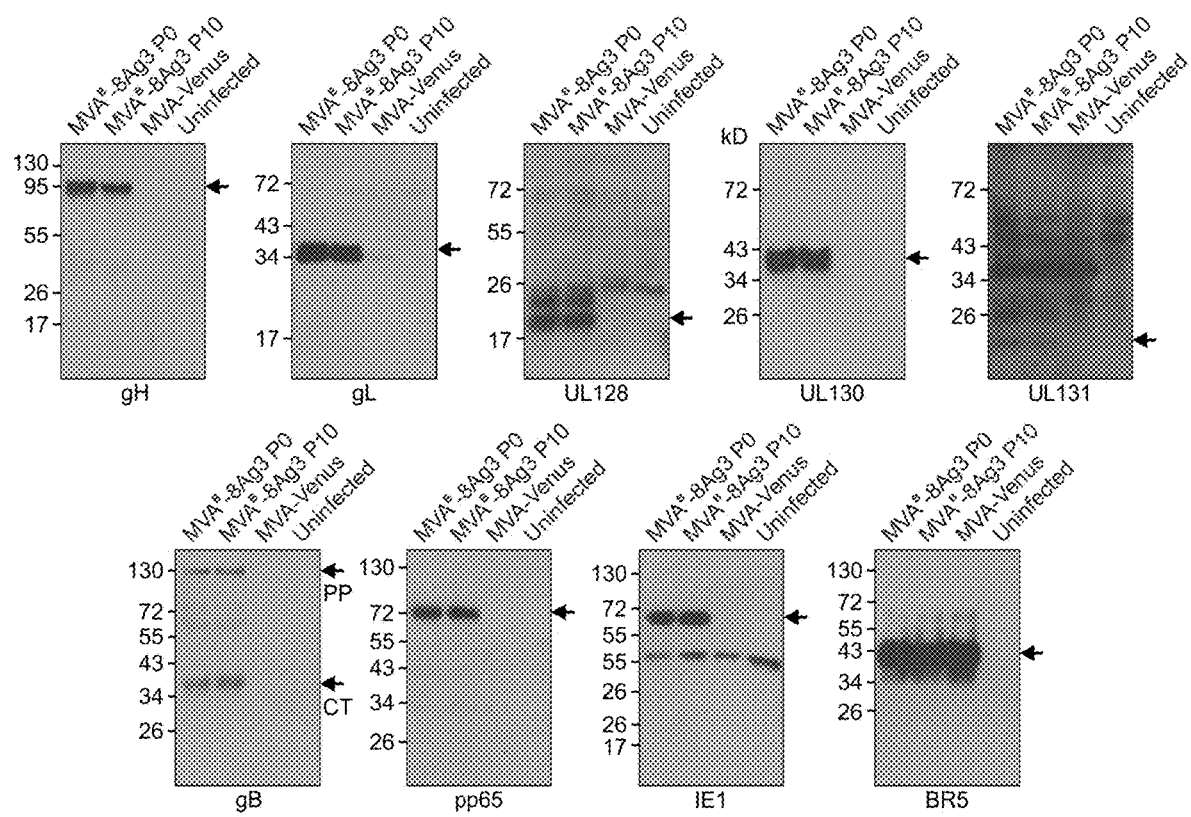
FIG. 22 shows HCMV antigen expression by MVA$^B$-8Ag3 following virus propagation. Shown are Immunoblots for comparing the HCMV antigen expression by MVA$^B$-8Ag3 derived before (P0) and after 10 (P10) virus passages on CEF. MVA-Venus infected cells or uninfected cells were analyzed for control. The Vaccinia virus BR5 protein was analyzed for loading control. Arrows indicate approximate expected protein sizes of the individual HCMV antigens.

Various MVA constructs generated in Example 10 were tested for HCMV antigen expression in BHK cells. As shown in FIG. 19, BHK cells were infected with three different clones (#1-3) of $MVA^B$-8Ag1 and compared by Immunoblot analysis for HCMV antigen expression with different clones of $MVA^B$-7Ag1. The results demonstrate that $MVA^B$-8Ag1 expressed UL128, UL130, gH, gL, pp65, and IE1. The expression of HCMV gB and UL130 was not investigated in this experiment. In addition, the antigen expression levels of $MVA^B$-8Ag1 were comparable to those of $MVA^B$-7Ag1, suggesting that the addition of IE1 into the MVA construct does not interfere with the expression of the other seven HCMV antigens. FIG. 20 confirms by Immunoblot analysis that $MVA^B$-8Ag2 expresses all eight HCMV antigens (UL128, UL130, UL131A, gH, gL, gB, pp65, and IE1). FIG. 21 provides Immunoblot examples for the HCMV antigen expression by $MVA^B$-8Ag3 and MVA $MVA^B$-8Ag4. FIG. 22 provides Immunoblot examples for expression of the eight HCMV antigens by $MVA^B$-8Ag3 and following ten virus passages on CEF.

Figure 23A:
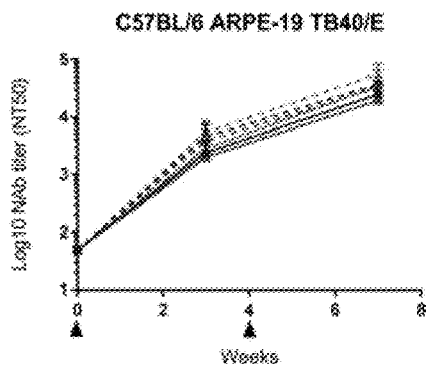
FIGS. 23A-23E show NAb and HLA-restricted T cell responses induced by the eight-antigen vectors MVA$^B$-8Ag3 and MVA$^B$-8Ag4 in mice.
Figure 23B:
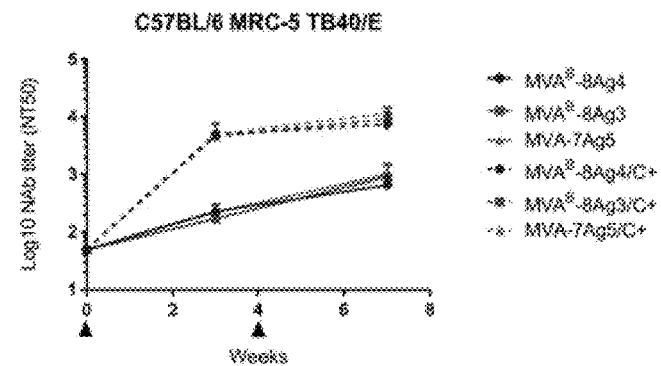
Figure 23C:
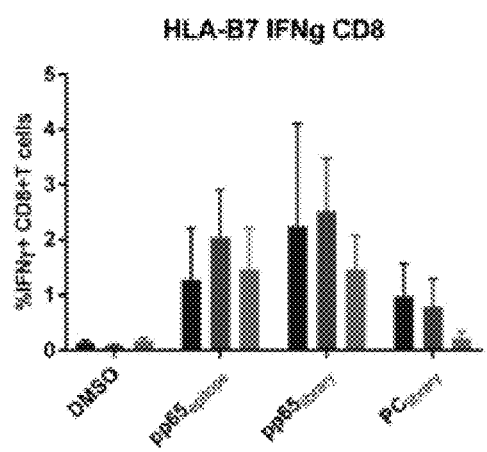
Figure 23D:
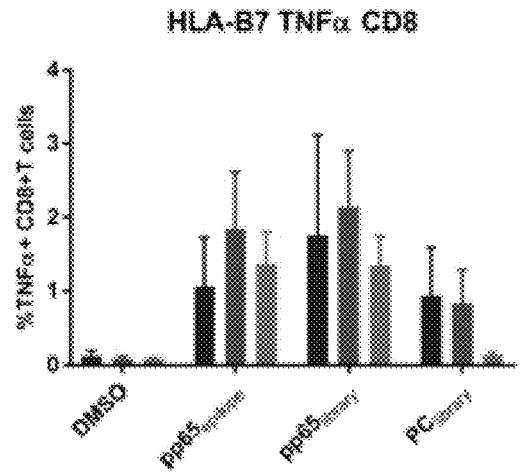
Figure 23E:
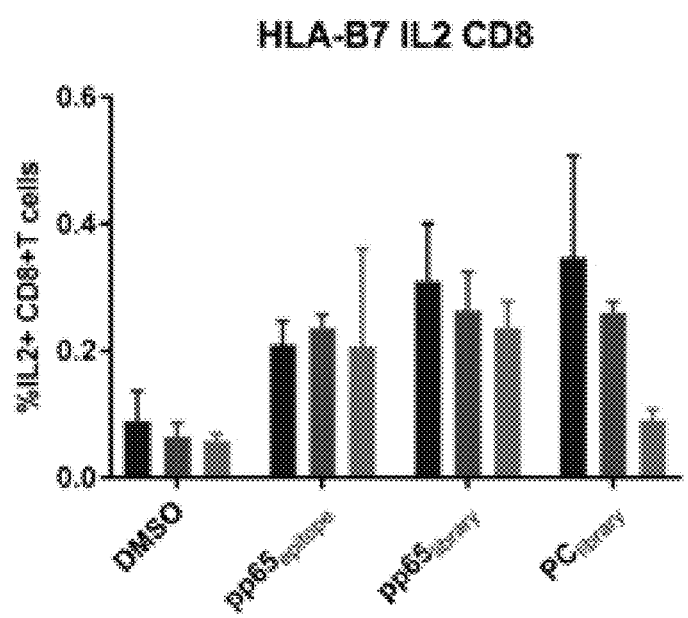

Example 12: Humoral and Cellular Immune Responses Elicited by MVA Expressing Eight HCMV Antigens in Mice Humoral immune responses induced by the eight antigen vectors $MVA^B$-8Ag3 and $MVA^B$-8Ag4 were compared to those induced by the seven-antigen vector MVA-7Ag5 in C57BL/6 mice. C57BL/6 mice were immunized twice one month apart with the vaccines and serum NAb responses were measured three weeks post-boost against HCMV strain TB40/E using ARPE-19 cells and MRC-5 fibroblasts in the absence or presence of complement. As shown in FIGS. 23A-23B, both MVA vectors expressing eight HCMV antigens successfully induced NAb responses in mice, to a level comparable to the control vector MVA-7Ag5. Cell-mediated immune responses to the eight antigen vectors $MVA^B$-8Ag3 and $MVA^B$-8Ag4 were compared to those induced by MVA-7Ag5 in HLA-B*0702 transgenic (B7 Tg) C57BL/6 mice. By stimulating the splenocytes from immunized B7 Tg mice with a pp65-specific peptide library and a pp65 HLA-B*07-restricted epitope in an intracellular cytokine staining assay, it was demonstrated that the MVA vectors encoding for 8 antigens induced IFN-γ, TNF-α and IL-2 CD8 responses comparable to those induced by the MVA-7Ag5 vector (FIGS. 23C-23E). Polyfunctional T-cell responses to the PC were also induced in $MVA^B$-8Ag3 and $MVA^B$-8Ag4 immunized transgenic mice (FIG. 23C-23E).

REFERENCES

The references, patents and published patent applications listed below, and all references cited in the specification above are hereby incorporated by reference in their entirety, as if fully set forth herein.

1. Adler, S. P., S. E. Starr, S. A. Plotkin, S. H. Hempfling, J. Buis, M. L. Manning, and A. M. Best. 1995. Immunity induced by primary human cytomegalovirus infection protects against secondary infection among women of childbearing age. The Journal of infectious diseases 171: 26-32.
2. Anderholm, K. M., C. J. Bierle, and M. R. Schleiss. 2016. Cytomegalovirus Vaccines: Current Status and Future Prospects. Drugs 76:1625-1645.
3. Andreoni, M., M. Faircloth, L. Vugler, and W. J. Britt. 1989. A rapid microneutralization assay for the measurement of neutralizing antibody reactive with human cytomegalovirus. Journal of virological methods 23:157-167.
4. Bernstein, D. I., F. M. Munoz, S. T. Callahan, R. Rupp, S. H. Wootton, K. M. Edwards, C. B. Turley, L. R. Stanberry, S. M. Patel, M. M. McNeal, S. Pichon, C. Amegashie, and A. R. Bellamy. 2016. Safety and efficacy of a cytomegalovirus glycoprotein B (gB) vaccine in adolescent girls: A randomized clinical trial. Vaccine 34:313-319.
5. Britt, W. 2015. Controversies in the natural history of congenital human cytomegalovirus infection: the paradox of infection and disease in offspring of women with immunity prior to pregnancy. Medical microbiology and immunology.
6. Britt, W. 2008. Manifestations of human cytomegalovirus infection: proposed mechanisms of acute and chronic disease. Current topics in microbiology and immunology 325:417-470.
7. Britt, W. J. 2017. Congenital Human Cytomegalovirus Infection and the Enigma of Maternal Immunity. Journal of virology 91.
8. Britt, W. J. 1984. Neutralizing antibodies detect a disulfide-linked glycoprotein complex within the envelope of human cytomegalovirus. Virology 135:369-378.
9. Britt, W. J., and D. Auger. 1985. Identification of a 65 000 dalton virion envelope protein of human cytomegalovirus. Virus research 4:31-36.
10. Britt, W. J., L. Vugler, and E. B. Stephens. 1988. Induction of complement-dependent and -independent neutralizing antibodies by recombinant-derived human cytomegalovirus gp55-116 (gB). Journal of virology 62:3309-3318.
11. Cannon, M. J., and K. F. Davis. 2005. Washing our hands of the congenital cytomegalovirus disease epidemic. BMC Public Health 5:70.
12. Cannon, M. J., K. Westbrook, D. Levis, M. R. Schleiss, R. Thackeray, and R. F. Pass. 2012. Awareness of and behaviors related to child-to-mother transmission of cytomegalovirus. Prev Med 54:351-357.
13. Centers for Disease, C., and Prevention. 2008. Impact of expanded newborn screening—United States, 2006. MMWR. Morbidity and mortality weekly report 57:1012-1015.
14. Chiuppesi, F., T. Kaltcheva, Z. Meng, P. A. Barry, D. J. Diamond, and F. Wussow. 2017. Identification of a Continuous Neutralizing Epitope within UL128 of Human Cytomegalovirus. Journal of virology 91.
15. Chiuppesi, F., F. Wussow, E. Johnson, C. Bian, M. Zhuo, A. Rajakumar, P. A. Barry, W. J. Britt, R. Chakraborty, and D. J. Diamond. 2015. Vaccine-Derived Neutralizing Antibodies to the Human Cytomegalovirus gH/gL Pentamer Potently Block Primary Cytotrophoblast Infection. Journal of virology 89:11884-11898.
16. Chiuppesi, F., F. Wussow, L. Scharf, H. Contreras, H. Gao, Z. Meng, J. Nguyen, P. A. Barry, P. J. Bjorkman, and D. J. Diamond. 2017. Comparison of homologous and heterologous prime-boost vaccine approaches using Modified Vaccinia Ankara and soluble protein to induce neutralizing antibodies by the human cytomegalovirus pentamer complex in mice. PloS one 12:e0183377.
17. Cottingham, M. G., R. F. Andersen, A. J. Spencer, S. Saurya, J. Furze, A. V. Hill, and S. C. Gilbert. 2008. Recombination-mediated genetic engineering of a bacterial artificial chromosome clone of modified vaccinia virus Ankara (MVA). PloS one 3:e1638.
18. Cottingham, M. G., and S. C. Gilbert. 2010. Rapid generation of markerless recombinant MVA vaccines by en passant recombineering of a self-excising bacterial artificial chromosome. Journal of virological methods 168:233-236.
19. Diamond, D. J., J. York, J. Y. Sun, C. L. Wright, and S. J. Forman. 1997. Development of a candidate HLA A*0201 restricted peptide-based vaccine against human cytomegalovirus infection. Blood 90:1751-1767.
20. Draper, S. J., M. G. Cottingham, and S. C. Gilbert. 2013. Utilizing poxviral vectored vaccines for antibody induction-progress and prospects. Vaccine 31:4223-4230.
21. Fowler, K. B., S. Stagno, and R. F. Pass. 2003. Maternal immunity and prevention of congenital cytomegalovirus infection. Jama 289:1008-1011.
22. Gardner, T. J., and D. Tortorella. 2016. Virion Glycoprotein-Mediated Immune Evasion by Human Cytomegalovirus: a Sticky Virus Makes a Slick Getaway. Microbiology and molecular biology reviews: MMBR 80:663-677.
23. Gerna, G., E. Percivalle, L. Perez, A. Lanzavecchia, and D. Lilleri. 2016. Monoclonal Antibodies to Different Components of the Human Cytomegalovirus (HCMV) Pentamer gH/gL/pUL128L and Trimer gH/gL/gO as well as Antibodies Elicited during Primary HCMV Infection Prevent Epithelial Cell Syncytium Formation. Journal of virology 90:6216-6223.
24. Gibson, L., C. M. Barysauskas, M. McManus, S. Dooley, D. Lilleri, D. Fisher, T. Srivastava, D. J. Diamond, and K. Luzuriaga. 2015. Reduced frequencies of polyfunctional CMV-specific T cell responses in infants with congenital CMV infection. Journal of clinical immunology 35:289-301.
25. Gilbert, S. C. 2013. Clinical development of Modified Vaccinia virus Ankara vaccines. Vaccine 31:4241-4246.
26. Griffiths, P. D., A. Stanton, E. McCarrell, C. Smith, M. Osman, M. Harber, A. Davenport, G. Jones, D. C. Wheeler, J. O'Beirne, D. Thorburn, D. Patch, C. E. Atkinson, S. Pichon, P. Sweny, M. Lanzman, E. Woodford, E. Rothwell, N. Old, R. Kinyanjui, T. Hague, S. Atabani, S. Luck, S. Prideaux, R. S. Milne, V. C. Emery, and A. K. Burroughs. 2011. Cytomegalovirus glycoprotein-B vaccine with MF59 adjuvant in transplant recipients: a phase 2 randomised placebo-controlled trial. Lancet 377:1256-1263.
27. Hahn, G., M. G. Revello, M. Patrone, E. Percivalle, G. Campanini, A. Sarasini, M. Wagner, A. Gallina, G. Milanesi, U. Koszinowski, F. Baldanti, and G. Gerna. 2004. Human cytomegalovirus UL131-128 genes are indispensable for virus growth in endothelial cells and virus transfer to leukocytes. Journal of virology 78:10023-10033.
28. Heldwein, E. E. 2016. gH/gL supercomplexes at early stages of herpesvirus entry. Current opinion in virology 18:1-8.
29. Itell, H. L., A. Kaur, J. D. Deere, P. A. Barry, and S. R. Permar. 2017. Rhesus monkeys for a nonhuman primate model of cytomegalovirus infections. Current opinion in virology 25:126-133.
30. Itell, H. L., C. S. Nelson, D. R. Martinez, and S. R. Permar. 2017. Maternal immune correlates of protection against placental transmission of cytomegalovirus. Placenta 60 Suppl 1:S73-S79.
31. Jackson, S. E., G. M. Mason, and M. R. Wills. 2011. Human cytomegalovirus immunity and immune evasion. Virus research 157:151-160.
32. John, S., O. Yuzhakov, A. Woods, J. Deterling, K. Hassett, C. A. Shaw, and G. Ciaramella. 2018. Multiantigenic human cytomegalovirus mRNA vaccines that elicit potent humoral and cell-mediated immunity. Vaccine 36:1689-1699.
33. Kabanova, A., L. Perez, D. Lilleri, J. Marcandalli, G. Agatic, S. Becattini, S. Preite, D. Fuschillo, E. Percivalle, F. Sallusto, G. Gerna, D. *Corti*, and A. Lanzavecchia. 2014. Antibody-driven design of a human cytomegalovirus gHgLpUL128L subunit vaccine that selectively elicits potent neutralizing antibodies. Proceedings of the National Academy of Sciences of the United States of America 111:17965-17970.
34. Kim, J. H., S. R. Lee, L. H. Li, H. J. Park, J. H. Park, K. Y. Lee, M. K. Kim, B. A. Shin, and S. Y. Choi. 2011. High cleavage efficiency of a 2A peptide derived from porcine teschovirus-1 in human cell lines, zebrafish and mice. PloS one 6:e18556.
35. Klenerman, P., and A. Oxenius. 2016. T cell responses to cytomegalovirus. Nature reviews. Immunology 16:367-377.
36. Koszinowski, U. H., M. J. Reddehase, and S. Jonjic. 1991. The role of CD4 and CD8 T cells in viral infections. Current opinion in immunology 3:471-475.
37. Krishnan, A., Z. Wang, T. Srivastava, R. Rawal, P. Manchanda, D. J. Diamond, and C. La Rosa. 2008. A novel approach to evaluate the immunogenicity of viral antigens of clinical importance in HLA transgenic murine models. Immunology letters 120:108-116.
38. La Rosa, C., and D. J. Diamond. 2012. The immune response to human CMV. Future virology 7:279-293.
39. La Rosa, C., J. Longmate, J. Martinez, Q. Zhou, T. I. Kaltcheva, W. Tsai, J. Drake, M. Carroll, F. Wussow, F. Chiuppesi, N. Hardwick, S. Dadwal, I. Aldoss, R. Nakamura, J. A. Zaia, and D. J. Diamond. 2016. MVA vaccine encoding CMV antigens safely induces durable expansion of CMV-specific T-cells in healthy adults. Blood.
40. Lacey, S. F., C. La Rosa, T. Kaltcheva, T. Srivastava, A. Seidel, W. Zhou, R. Rawal, K. Hagen, A. Krishnan, J. Longmate, H. A. Andersson, L. St John, R. Bhatia, V. Pullarkat, S. J. Forman, L. J. Cooper, J. Molldrem, and D. J. Diamond. 2011. Characterization of immunologic properties of a second HLA-A2 epitope from a granule protease in CML patients and HLA-A2 transgenic mice. Blood 118:2159-2169.
41. Lilleri, D., and G. Gerna. 2017. Maternal immune correlates of protection from human cytomegalovirus transmission to the fetus after primary infection in pregnancy. Reviews in medical virology 27.
42. Loomis, R. J., A. E. Lilja, J. Monroe, K. A. Balabanis, L. A. Brito, G. Palladino, M. Franti, C. W. Mandl, S. W. Barnett, and P. W. Mason. 2013. Vectored co-delivery of human cytomegalovirus gH and gL proteins elicits potent complement-independent neutralizing antibodies. Vaccine 31:919-926.
43. Macagno, A., N. L. Bernasconi, F. Vanzetta, E. Dander, A. Sarasini, M. G. Revello, G. Gerna, F. Sallusto, and A. Lanzavecchia. 2010. Isolation of human monoclonal antibodies that potently neutralize human cytomegalovirus infection by targeting different epitopes on the gH/gL/UL128-131A complex. Journal of virology 84:1005-1013.
44. Manicklal, S., V. C. Emery, T. Lazzarotto, S. B. Boppana, and R. K. Gupta. 2013. The "silent" global burden of congenital cytomegalovirus. Clin Microbiol Rev 26:86-102.
45. Manuel, E. R., Z. Wang, Z. Li, C. La Rosa, W. Zhou, and D. J. Diamond. 2010. Intergenic region 3 of modified vaccinia ankara is a functional site for insert gene expression and allows for potent antigen-specific immune responses. Virology 403:155-162.
46. Murphy, E., and T. Shenk. 2008. Human cytomegalovirus genome. Current topics in microbiology and immunology 325:1-19.
47. Nimmerjahn, F., and J. V. Ravetch. 2006. Fcgamma receptors: old friends and new family members. Immunity 24:19-28.
48. O'Connor, C. M., and E. A. Murphy. 2012. A myeloid progenitor cell line capable of supporting human cytomegalovirus latency and reactivation, resulting in infectious progeny. Journal of virology 86:9854-9865.
49. Parekh, B. S., E. Berger, S. Sibley, S. Cahya, L. Xiao, M. A. LaCerte, P. Vaillancourt, S. Wooden, and D. Gately. 2012. Development and validation of an antibody-dependent cell-mediated cytotoxicity-reporter gene assay. mAbs 4:310-318.
50. Pascolo, S., N. Bervas, J. M. Ure, A. G. Smith, F. A. Lemonnier, and B. Perarnau. 1997. HLA-A2.1-restricted education and cytolytic activity of CD8(+) T lymphocytes from beta2 microglobulin (beta2m) HLA-A2.1 monochain transgenic H-2Db beta2m double knockout mice. The Journal of experimental medicine 185:2043-2051.
51. Pass, R. F., C. Zhang, A. Evans, T. Simpson, W. Andrews, M. L. Huang, L. Corey, J. Hill, E. Davis, C. Flanigan, and G. Cloud. 2009. Vaccine prevention of maternal cytomegalovirus infection. The New England journal of medicine 360:1191-1199.
52. Permar, S. R., M. R. Schleiss, and S. A. Plotkin. 2018. Advancing our understanding of protective maternal immunity as a guide for development of vaccines to reduce congenital cytomegalovirus infections. Journal of virology.
53. Plotkin, S. A. 2013. Complex correlates of protection after vaccination. Clinical infectious diseases: an official publication of the Infectious Diseases Society of America 56:1458-1465.
54. Potzsch, S., N. Spindler, A. K. Wiegers, T. Fisch, P. Rucker, H. Sticht, N. Grieb, T. Baroti, F. Weisel, T. Stamminger, L. Martin-Parras, M. Mach, and T. H. Winkler. 2011. B cell repertoire analysis identifies new antigenic domains on glycoprotein B of human cytomegalovirus which are target of neutralizing antibodies. PLoS pathogens 7:e1002172.
55. Rawlinson, W. D., S. B. Boppana, K. B. Fowler, D. W. Kimberlin, T. Lazzarotto, S. Alain, K. Daly, S. Doutre, L. Gibson, M. L. Giles, J. Greenlee, S. T. Hamilton, G. J. Harrison, L. Hui, C. A. Jones, P. Palasanthiran, M. R. Schleiss, A. W. Shand, and W. J. van Zuylen. 2017. Congenital cytomegalovirus infection in pregnancy and the neonate: consensus recommendations for prevention, diagnosis, and therapy. The Lancet. Infectious diseases 17:e177-e188.
56. Rohrlich, P. S., S. Cardinaud, H. Firat, M. Lamari, P. Briand, N. Escriou, and F. A. Lemonnier. 2003. HLA-B*0702 transgenic, H-2KbDb double-knockout mice:
phenotypical and functional characterization in response to influenza virus. International immunology 15:765-772.
57. Ryckman, B. J., B. L. Rainish, M. C. Chase, J. A. Borton, J. A. Nelson, M. A. Jarvis, and D. C. Johnson. 2008. Characterization of the human cytomegalovirus gH/gL/UL128-131 complex that mediates entry into epithelial and endothelial cells. Journal of virology 82:60-70.
58. Schleiss, M. R. 2013. Cytomegalovirus in the neonate: immune correlates of infection and protection. Clinical & developmental immunology 2013:501801.
59. Schleiss, M. R. 2008. Cytomegalovirus vaccine development. Current topics in microbiology and immunology 325:361-382.
60. Schleiss, M. R. 2016. Cytomegalovirus vaccines under clinical development. Journal of virus eradication 2:198-207.
61. Schleiss, M. R., and M. A. McVoy. 2010. Guinea Pig Cytomegalovirus (GPCMV): A Model for the Study of the Prevention and Treatment of Maternal-Fetal Transmission. Future virology 5:207-217.
62. Schleiss, M. R., S. R. Permar, and S. A. Plotkin. 2017. Progress toward Development of a Vaccine against Congenital Cytomegalovirus Infection. Clinical and vaccine immunology: CVI 24.
63. Schmelz, M., B. Sodeik, M. Ericsson, E. J. Wolffe, H. Shida, G. Hiller, and G. Griffiths. 1994. Assembly of vaccinia virus: the second wrapping cisterna is derived from the trans Golgi network. Journal of virology 68:130-147.
64. Shedlock, D. J., K. T. Talbott, S. J. Wu, C. M. Wilson, K. Muthumani, J. D. Boyer, N. Y. Sardesai, S. Awasthi, and D. B. Weiner. 2012. Vaccination with synthetic constructs expressing cytomegalovirus immunogens is highly T cell immunogenic in mice. Human vaccines & immunotherapeutics 8:1668-1681.
65. Simpson, J. A., J. C. Chow, J. Baker, N. Avdalovic, S. Yuan, D. Au, M. S. Co, M. Vasquez, W. J. Britt, and K. L. Coelingh. 1993. Neutralizing monoclonal antibodies that distinguish three antigenic sites on human cytomegalovirus glycoprotein H have conformationally distinct binding sites. Journal of virology 67:489-496.
66. Stratton, K. R., J. S. Durch, and R. S. Lawrence. 2000. Vaccines for the 21st Century: A Tool for Decisionmaking, Vaccines for the 21st Century: A Tool for Decisionmaking, Washington (DC).
67. Sutter, G., and B. Moss. 1992. Nonreplicating vaccinia vector efficiently expresses recombinant genes. Proceedings of the National Academy of Sciences of the United States of America 89:10847-10851.
68. Sutter, G., and C. Staib. 2003. Vaccinia vectors as candidate vaccines: the development of modified vaccinia virus Ankara for antigen delivery. Curr Drug Targets Infect Disord 3:263-271.
69. Sylwester, A. W., B. L. Mitchell, J. B. Edgar, C. Taormina, C. Pelte, F. Ruchti, P. R. Sleath, K. H. Grabstein, N. A. Hosken, F. Kern, J. A. Nelson, and L. J. Picker. 2005. Broadly targeted human cytomegalovirus-specific CD4+ and CD8+ T cells dominate the memory compartments of exposed subjects. The Journal of experimental medicine 202:673-685.
70. Tan, T., T. Dalby, K. Forsyth, S. A. Halperin, U. Heininger, D. Hozbor, S. Plotkin, R. Ulloa-Gutierrez, and C. H. Wirsing von Konig. 2015. Pertussis Across the Globe: Recent Epidemiologic Trends From 2000 to 2013. The Pediatric infectious disease journal 34:e222-232.
71. Tischer, B. K., B. B. Kaufer, M. Sommer, F. Wussow, A. M. Arvin, and N. Osterrieder. 2007. A self-excisable infectious bacterial artificial chromosome clone of varicella-zoster virus allows analysis of the essential tegument protein encoded by ORF9. Journal of virology 81:13200-13208.
72. Tischer, B. K., G. A. Smith, and N. Osterrieder. 2010. En passant mutagenesis: a two step markerless red recombination system. Methods in molecular biology 634:421-430.
73. Tischer, B. K., J. von Einem, B. Kaufer, and N. Osterrieder. 2006. Two-step red-mediated recombination for versatile high-efficiency markerless DNA manipulation in *Escherichia coli*. BioTechniques 40:191-197.
74. Wang, D., and T. Shenk. 2005. Human cytomegalovirus virion protein complex required for epithelial and endothelial cell tropism. Proceedings of the National Academy of Sciences of the United States of America 102:18153-18158.
75. Wang, Z., C. La Rosa, R. Maas, H. Ly, J. Brewer, S. Mekhoubad, P. Daftarian, J. Longmate, W. J. Britt, and D. J. Diamond. 2004. Recombinant modified vaccinia virus Ankara expressing a soluble form of glycoprotein B causes durable immunity and neutralizing antibodies against multiple strains of human cytomegalovirus. Journal of virology 78:3965-3976.
76. Wang, Z., J. Martinez, W. Zhou, C. La Rosa, T. Srivastava, A. Dasgupta, R. Rawal, Z. Li, W. J. Britt, and D. Diamond. 2010. Modified H5 promoter improves stability of insert genes while maintaining immunogenicity during extended passage of genetically engineered MVA vaccines. Vaccine 28:1547-1557.
77. Wen, Y., J. Monroe, C. Linton, J. Archer, C. W. Beard, S. W. Barnett, G. Palladino, P. W. Mason, A. Carfi, and A. E. Lilja. 2014. Human cytomegalovirus gH/gL/UL128/UL130/UL131A complex elicits potently neutralizing antibodies in mice. Vaccine 32:3796-3804.
78. Wille, P. T., A. J. Knoche, J. A. Nelson, M. A. Jarvis, and D. C. Johnson. 2010. A human cytomegalovirus gO-null mutant fails to incorporate gH/gL into the virion envelope and is unable to enter fibroblasts and epithelial and endothelial cells. Journal of virology 84:2585-2596.
79. Wille, P. T., T. W. Wisner, B. Ryckman, and D. C. Johnson. 2013. Human cytomegalovirus (HCMV) glycoprotein gB promotes virus entry in trans acting as the viral fusion protein rather than as a receptor-binding protein. mBio 4:e00332-00313.
80. Wussow, F., F. Chiuppesi, H. Contreras, and D. J. Diamond. 2017. Neutralization of Human Cytomegalovirus Entry into Fibroblasts and Epithelial Cells. Vaccines (Basel) 5.
81. Wussow, F., F. Chiuppesi, J. Martinez, J. Campo, E. Johnson, C. Flechsig, M. Newell, E. Tran, J. Ortiz, C. La Rosa, A. Herrmann, J. Longmate, R. Chakraborty, P. A. Barry, and D. J. Diamond. 2014. Human cytomegalovirus vaccine based on the envelope gH/gL pentamer complex. PLoS pathogens 10:e1004524.
82. Wussow, F., F. Chiuppesi, Z. Meng, J. Martinez, J. Nguyen, P. A. Barry, and D. J. Diamond. 2018. Exploiting 2A peptides to elicit potent neutralizing antibodies by a multi-subunit herpesvirus glycoprotein complex. Journal of virological methods 251:30-37.
83. Wussow, F., F. Chiuppesi, Z. Meng, J. Martinez, J. Nguyen, P. A. Barry, and D. J. Diamond. 2017. Exploiting 2A peptides to elicit potent neutralizing antibodies by a multi-subunit herpesvirus glycoprotein complex. Journal of virological methods 251:30-37.
84. Wussow, F., H. Fickenscher, and B. K. Tischer. 2009. Red-mediated transposition and final release of the mini-F vector of a cloned infectious herpesvirus genome. PLoS one 4:e8178.
85. Wussow, F., Y. Yue, J. Martinez, J. D. Deere, J. Longmate, A. Herrmann, P. A. Barry, and D. J. Diamond. 2013. A vaccine based on the rhesus cytomegalovirus UL128 complex induces broadly neutralizing antibodies in rhesus macaques. Journal of virology 87:1322-1332.
86. Wyatt, L. S., P. L. Earl, and B. Moss. 2017. Generation of Recombinant Vaccinia Viruses. Current protocols in protein science 89:5 13 11-15 13 18.
87. Wyatt, L. S., P. L. Earl, W. Xiao, J. L. Americo, C. A. Cotter, J. Vogt, and B. Moss. 2009. Elucidating and minimizing the loss by recombinant vaccinia virus of human immunodeficiency virus gene expression resulting from spontaneous mutations and positive selection. Journal of virology 83:7176-7184.
88. Zhong, J., M. Rist, L. Cooper, C. Smith, and R. Khanna. 2008. Induction of pluripotent protective immunity following immunisation with a chimeric vaccine against human cytomegalovirus. PloS one 3:e3256.
89. Zhou, M., J. M. Lanchy, and B. J. Ryckman. 2015. Human cytomegalovirus gH/gL/gO promotes the fusion step of entry into all cell types whereas gH/gL/UL128-131 broadens virus tropism through a distinct mechanism. Journal of virology.

What is claimed is:

1. An expression system comprising an MVA vector comprising four expression cassettes, each expression cassette comprising:
a single promoter;
a nucleic acid sequences that encodes one or more human cytomegalovirus (HCMV) antigens,
one or more 2A peptide signal sequences that mediate ribosomal skipping or one or more internal ribosomal entry sites between each of the multiple nucleic acid sequences;
wherein the one or more HCMV antigens, when co-expressed by the expression system simultaneously, effectively elicit multi-functional humoral and cellular immune responses; and
wherein a first expression cassette encodes HCMV antigens comprising gH and gL inserted into an insertion site between genes 69R and 70L (IGR69/70) of the MVA vector; a second expression cassette encodes HCMV antigens pp65 inserted into Del3 of the MVA vector; a third expression cassette encodes gBΔTM inserted into an insertion site between genes 44L and 45L (IGR44/45); and a fourth expression cassette encodes UL128, UL130, and US131A inserted into an insertion site between genes 64L and 65L (IGR64/65).

2. The expression system of claim 1, wherein the multi-functional humoral and cellular immune responses include neutralizing antibodies, antibodies promoting ADCC, CDC, or CDV, and polyfunctional CD4+ and CD8+ T cell responses.

3. The expression system of claim 1, wherein the one or more 2A peptide signal sequences encode a 2A peptide of foot-and-mouth disease virus (F2A), a 2A peptide of equine rhinitis A virus (E2A), a 2A peptide of porcine teschovirus-1 (P2A), a 2A peptide of cytoplasmic polyhedrosis virus (BmCPV 2A), a 2A peptide of flacherie virus (BmIFV 2A), or a 2A peptide of Thosea asigna virus (T2A).

4. The expression system of claim 1, wherein the promoter is a vaccinia virus mH5 promoter, a pSyn promoter, a p7.5 promoter, or a p11 promoter of Vaccinia, or any other natural or synthetic promoter sequence that stimulates Vaccinia gene expression.

5. The expression system of claim 1, wherein at least one of the nucleic acid sequences encoding at least one of the HCMV antigens are codon-optimized for Vaccinia virus expression to enhance the expression or stability of the nucleic acid sequences within the MVA genome.

6. The expression system of claim 5, wherein the at least one nucleic acid sequences that is codon-optimized is silently mutated without affecting the encoded amino acid sequence to avoid sequences with four or more consecutive, same nucleotides.

7. An expression system comprising a recombinant bacterial artificial chromosome (BAC) construct comprising a BAC vector and a viral vector, the viral vector comprising at least four expression cassettes, wherein each expression cassette comprises:
a single promoter;
one or more nucleic acid sequences that encode one or more human cytomegalovirus (HCMV) antigens;
one or more 2A signal sequences between each of the two or more nucleic acid sequences;
wherein the viral vector is a modified vaccinia Ankara (MVA) vector; wherein a first expression cassette expresses HCMV antigens UL128, UL130, and UL131A and is inserted into an insertion site between MVA genes 64L and 65L (IGR64/65);
a second expression cassette expresses HCMV antigens gH and gL and is inserted into an insertion site between MVA genes 69R and 70L (IGR69/70); and
a third expression construct expresses HCMV antigen gBΔTM and is inserted into an insertion site between MVA genes 44 and 45 (IGR44/45); and
a fourth expression construct expresses HCMV antigen pp65 and is inserted into Del3.

8. The expression system of claim 7, wherein the one or more nucleic acid sequences within each expression cassette are codon-optimized for Vaccinia virus expression to enhance the expression or stability of the nucleic acid sequences within the MVA vector.

9. The expression system of claim 8, wherein the nucleic acid sequences are silently mutated without affecting the encoded amino acid sequence to avoid sequences with four or more consecutive, same nucleotides.

10. A method of inhibiting or treating HCMV infection in a subject comprising administering a prophylactically or therapeutically effective amount of a vaccine to the subject, wherein the vaccine comprises an MVA viral vector capable of co-expressing eight HCMV antigens simultaneously, and a pharmaceutically acceptable carrier, adjuvant, additive or combination thereof, wherein the viral vector comprises:
a first expression cassette expressing HCMV antigens gH and gL inserted into an insertion site between genes 69R and 70L (IGR69/70) of the MVA viral vector;
a second expression cassette expressing HCMV antigens UL128, UL130, and UL131A inserted into an insertion site between genes 64 and 65 (IGR64/65) of the MVA viral vector;
a third expression cassette expressing HCMV antigen gBΔTM inserted into an insertion site between genes 44 and 45 of the MVA viral vector; and
a fourth expression cassette expressing HCMV antigen pp65 inserted into Del3 of the MVA viral vector
wherein the HCMV antigens expressed by the expression cassettes are linked by one or more 2A signal sequences.

11. The expression system of claim 1, wherein the single promoter is a vaccinia virus mH5 promoter.

12. The expression system of claim 11, wherein the gH antigen comprises SEQ ID NO: 1; wherein the gL antigen comprises SEQ ID NO: 2; wherein the UL128 antigen comprises SEQ ID NO: 3; wherein the UL130 antigen comprises SEQ ID NO: 4; wherein the UL131A antigen comprises SEQ ID NO: 5; wherein the pp65 antigen comprises SEQ ID NO: 6; and wherein the gB antigen comprises SEQ ID NO: 7.

13. The expression system of claim 12, wherein the gH and gL HCMV antigens are separated by a P2A4 sequence; wherein the UL128 and L130 are separated by a P2A1 sequence; and wherein the UL130 and UL131 are separated by a P2A2 sequence.

14. The expression system of claim 7, wherein the single promoter is a vaccinia virus mH5 promoter.

15. The expression system of claim 14, wherein the gH antigen comprises SEQ ID NO: 1; wherein the gL antigen comprises SEQ ID NO: 2; wherein the UL128 antigen comprises SEQ ID NO: 3; wherein the UL130 antigen comprises SEQ ID NO: 4; wherein the UL131A antigen comprises SEQ ID NO: 5; wherein the pp65 antigen comprises SEQ ID NO: 6; and wherein the gB antigen comprises SEQ ID NO: 7.

16. The expression system of claim 15, wherein the gH and gL HCMV antigens are separated by a P2A4 sequence; wherein the UL128 and L130 are separated by a P2A1 sequence; and wherein the UL130 and UL131 are separated by a P2A2 sequence.

17. The expression system of claim 10, wherein the first expression cassette, the second expression cassette, the third expression cassette, and the fourth expression cassette each comprise is a vaccinia virus mH5 promoter.

18. The expression system of claim 17, wherein the gH antigen comprises SEQ ID NO: 1; wherein the gL antigen comprises SEQ ID NO: 2; wherein the UL128 antigen comprises SEQ ID NO: 3; wherein the UL130 antigen comprises SEQ ID NO: 4; wherein the UL131A antigen comprises SEQ ID NO: 5; wherein the pp65 antigen comprises SEQ ID NO: 6; and wherein the gB antigen comprises SEQ ID NO: 7.

19. The expression system of claim 18, wherein the gH and gL HCMV antigens are separated by a P2A4 sequence; wherein the UL128 and L130 are separated by a P2A1 sequence; and wherein the UL130 and UL131 are separated by a P2A2 sequence.

* * * * *

SEQUENCE LISTING

<160> NUMBER OF SEQ ID NOS: 43

<210> SEQ ID NO 1
<211> LENGTH: 2229
<212> TYPE: DNA
<213> ORGANISM: Artificial Sequence
<220> FEATURE:
<223> OTHER INFORMATION: codon-optimized gH sequence

<400> SEQUENCE: 1

```
atgagaccgg gtttgccatt ctatcttact gtatttgcag tctatttatt gtcgcatttg      60
ccttcgcaaa gatatggtgc tgatgcagct tcagaggcat tagatccaca cgcatttcat     120
ctattgctaa acacctacgg aagacctatt agatttctac gagagaatac tactcagtgt     180
acatataaca gttcgctaag aaatagtacg gtagtcagag agaatgctat cagtttcaat     240
ttcttccaat cctataatca atattatgta tttcatatgc cacgttgtct atttgctggt     300
```

-continued

```
cctcttgctg aacagtttct taatcaggtg gacttaacag aaaccctaga aagataccaa    360
caaagattga atacatatgc tctagttccc aaggatcttg cgtcttaccg atcatttagt   420
caacaactta aagctcagga ctccttagga caacaaccaa ctacagtgcc accgccgatt   480
gatttaagta ttccacatgt ttggatgccg ccacaaacaa cacctcacga ttggaaagga   540
tcacatacta catctggtct acacagacct catttcaatc agacgtgtat tctattcgat   600
ggtcacgatc tactattcag tacagtaact ccatgtctac accaaggatt ctatttaatg   660
gatgaacttc gttatgtaaa gataacgcta acggaagatt tcttcgtagt cactgtatca   720
attgatgacg acacacctat gttacttatc tttggtcatc tacctagagt attatttaag   780
gcgccatatc aaagagataa cttcatacta agacaaaccg agaagcatga acttctagtc   840
ctagttaaga gacacaact taatagacat tcatatttga aagactctga ctttcttgat   900
gcagcgttgg atttcaatta tcttgacttg tcagccttgt taagaaactc atttcatcga   960
tatgcagttg atgtgttaaa gtctggtaga tgtcaaatgc ttgatagaag aacggttgaa  1020
atggcattcg catatgcgtt ggcactattt gctgcggcta gacaggaaga ggcaggaaca  1080
gaaatatcta tcccagagc tttggatcga caagctgcac tactacaaat tcaggaattc   1140
atgattacgt gtttatcaca gactccacca cgtaccacgt tattgttata tcctactgct  1200
gtcgatctag caaagagagc tttatggacg ccggaccaaa ttactgatat tacaagtctt  1260
gttagactag tttatattct aagtaaacag aatcaacagc atcttattcc tcaatgggca  1320
cttagacaaa ttgcagattt cgcgcttcaa cttcataaga cccatctagc tagtttctta  1380
tctgcatttg cacgtcaaga attgtatttg atgggatctt tggttcatag tatgttagtt  1440
catacgaccg aaagacgtga aatcttcatt gtcgaaactg gtttgtgctc tctagcagaa  1500
ttatcacatt tcactcaatt actagctcat ccacatcatg aatatttatc agatttgtat  1560
acaccgtgta gtagtagtgg aagaagagat cactcgttgg aaagattgac gagattattc  1620
ccggatgcaa cagtgcccgc aactgtacca gcagcccttt caatattgtc cactatgcaa  1680
cctagtactt tagaaacgtt tcctgatcta ttctgtttac cattgggaga gtctttctct  1740
gcgttgactg ttttcagagca tgtctcatat gttgttacaa atcaatattt aattaaagga  1800
atttcatatc ctgtatcaac aactgttgta ggtcaaagtt tgatcataac gcaaaccgac  1860
tcacagagta agtgtgaatt gactagaaat atgcatacta cacattccat cactgctgcc  1920
ttgaatatat cgttagagaa ttgtgcattc tgtcagtcag cattattaga atatgacgat  1980
acacagggtg tgataaacat tatgtacatg catgattcgg atgatgtatt attcgcattg  2040
gatccctata tgaagtagt ggtttccagt cctagaacac attatttaat gttactaaag   2100
aatggaacag tacttgaggt aacggatgta gtcgtagacg caacggatag tagattgcta  2160
atgatgtctg tatatgcttt atcggcaatc attggaatat atctactata tagaatgttg  2220
aagacctgt                                                           2229
```

<210> SEQ ID NO 2
<211> LENGTH: 834
<212> TYPE: DNA
<213> ORGANISM: Artificial Sequence
<220> FEATURE:
<223> OTHER INFORMATION: codon-optimized gL sequence

<400> SEQUENCE: 2

```
atgtgtagac gtcctgattg tggatttagt ttctctccgg gacctgttgt tctattatgg    60
```

```
tgttgtttat tacttccaat agttagttct gtagctgttt ctgttgcacc gaccgcagca    120
gagaaggttc cagcagaatg tcctgagtta actcgaagat gtttacttgg agaagtgttt    180
caaggagata aatatgaatc ttggttaaga cctttagtta atgttactgg tcgtaatgga    240 cctcttttcac agttgatacg atacagaccg gtaacacctg aagccgccaa cagtgttcta   300
cttgacgatg cattcctaga tacttggca ttgctatata ataatcctga tcaattaaga    360
gctttactaa ccttactatc ctctgacaca gcgcctagat ggatgaccgt gatgagagga    420
tacagtgaat gtggagacgg ttctccggcg gtttatactt gcgtagatga cctatgtcgt    480
ggatatgacc taacgagatt gtcctatgga cgatcgatat tcactgaaca tgtgttagga    540
tttgagttag ttccaccatc cttgtttaat gtcgttgtag ccatacgtaa tgaagctacg    600
cgtactaacc gtgccgtgag attaccagta tctacagcag cagcacctga gggtattacc    660
ttattctatg gtttatataa tgcagttaaa gagttctgct tacgtcatca attagatcca    720
cctttgttac gtcatttaga taagtattat gcaggattac cacctgaatt gaagcaaaca    780
agagtgaatt tgccagcaca ttcacgttac ggaccacaag cagtggacgc ccga          834
```

<210> SEQ ID NO 3  
<211> LENGTH: 513  
<212> TYPE: DNA  
<213> ORGANISM: Artificial Sequence  
<220> FEATURE:  
<223> OTHER INFORMATION: codon-optimized UL128 sequence

<400> SEQUENCE: 3

```
atgagtccta agaatttgac gcctttcttg acagctttat ggttattatt ggatcattcc     60
agagttccga gagtgagagc agaggaatgc tgtgaattta taaatgtgaa tcacccacct    120
gaaagatgct atgactttaa gatgtgtaac cgatttacag ttgcattaag atgtccagat    180
ggagaagttt gttactcgcc ggagaagaca gccgagataa aggaattgt cactactatg    240 actcactcgc taaccagaca agtagtgcat aacaaattaa catcctgtaa ttataatcca    300
ctatacctag aggcagatgg acgaattaga tgcggtaagg ttaatgataa ggctcaatac    360
ttgttaggtg cggccggatc agttccttat cgatggatta atctagaata tgataagatc    420
acaagaattg tgggattaga ccagtactta gaaagtgtta agaagcataa agattggat     480 gtctgtcgag ctaagatggg atacatgctt cag                                 513
```

<210> SEQ ID NO 4  
<211> LENGTH: 642  
<212> TYPE: DNA  
<213> ORGANISM: Artificial Sequence  
<220> FEATURE:  
<223> OTHER INFORMATION: codon-optimized UL130 sequence

<400> SEQUENCE: 4

```
atgctaagat tgttattaag acaccacttt cattgtctac tattatgcgc cgtttgggct     60
acaccctgtc tagcatctcc gtggtctacg cttacagcta accagaatcc tagtcccttta   120 tggtctaaac ttacctattc caaacctcac gatgctgcta cttctctattg cccttttcatt  180 taccctagtc ctccaagatc tcctttacaa ttctcgggtt tccagagagt gttgacaggt   240
cctgaatgca gaaatgagac attgtatcta ttgtataaca gagagggaca aaccccttgtc  300 gaaagatcga gtcatggggt taagaaagta atctggtatc taagtggaag aaatcaaact   360
atacttcaac gaatgccacg aacagcaagt aaaccctccg atggaaatgt acaaatatca   420
gtagaagatg ccaagatatt tggagcacat atggtaccta agcaaactaa attattgaga   480
```

```
tttgtggtta acgatggtac aagataccag atgtgtgtta tgaaattgga gtcgtgggcc    540
catgtattca gagattatag tgtctcattt caagttagat taacgttcac ggaagctaac    600
aaccaaacgt atacattctg tactcatccg aatttgattg tt                       642
```

<210> SEQ ID NO 5
<211> LENGTH: 387
<212> TYPE: DNA
<213> ORGANISM: Artificial Sequence
<220> FEATURE:
<223> OTHER INFORMATION: codon-optimized UL131A sequence

<400> SEQUENCE: 5

```
atgcgtttat gccgagtatg gttatctgta tgtttatgcg ctgttgtatt gggacaatgt     60
cagcgtgaaa cagccgagaa gaatgattat tatagagtgc cacattactg ggacgcttgt    120
tctagagcat tacctgatca aacaagatat aaatatgtgg aacaactagt tgatcttacc    180
ttgaactatc actacgatgc atcgcatggt cttgataact tgatgttct aaagagaatt     240 aatgtaacag aggttagtct attgattagt gatttcagaa gacagaacag aagaggtgga    300
acaaataaac gtactacctt taacgcggca ggttctctag cacctcacgc ccgttcatta    360
gagttctctg tgagattgtt tgctaat                                         387
```

<210> SEQ ID NO 6
<211> LENGTH: 1683
<212> TYPE: DNA
<213> ORGANISM: Artificial Sequence
<220> FEATURE:
<223> OTHER INFORMATION: codon-optimized pp65 sequence

<400> SEQUENCE: 6

```
atggaatcaa gaggtcgaag atgtcctgag atgatctcag tgttaggacc gatcagtgga     60
catgtgttga aggctgtgtt ctcaaggagga gacacaccag ttcttccaca tgaaacaaga    120
ttgttacaaa ctggtatcca tgttcgagtt tcgcagccat ctctaatctt agtgtctcag    180
tacactcctg attcgacacc atgtcataga ggagacaatc aactacaagt acaaacacc     240 tacttcactg gatctgaggt ggagaacgtc agtgtgaacg tacacaatcc tactggtaga    300
tctatctgtc catctcaaga gcctatgtcc atctatgtgt atgcgttacc tcttaagatg    360
ttgaacattc gagtatcaa tgtgcaccac tatccgtctg cagcagaaag aaagcaccga    420
cacctaccgg tggcagatgc tgtaatccac gcaagtggaa agcagatgtg gcaagctaga    480
ttgactgtta gtggtcttgc ctggactcga acagagaacc aatggaagga acctgatgta    540
tactacacta gtgcctttgt atttcctact aaggacgtgg ctcttagaca cgtggtatgc    600
gctcatgagt tagtctgttc tatggagaac actagagcta cgaagatgca agtgattgga    660
gatcagtatg taaaggtata cttggaaagt ttctgcgaag atgttccgtc aggaaagcta    720
ttcatgcatg taacactagg tagtgatgtt gaagaagatc taacaatgac acgtaatcct    780
caaccgttca tgcgaccaca tgagcgtaac ggattcactg tactatgtcc aaagaatatg    840
atcatcaaac ctggaaagat atctcacatc atgcttgacg tcgcattcac ttcacatgag    900
cacttcggtc tattgtgtcc gaagtcaatt ccaggactat ctatcagtgg taatctacta    960
atgaatggac aacaaatctt cctagaggta caagcgatta gagaaacagt agagctaaga    1020
cagtatgatc ctgttgcggc actattcttc ttcgacatcg atcttctact caacgtgga    1080 cctcaatact cagaacatcc aacattcaca tctcaataca gaattcaagg aaagttggag    1140
```

| | |
|---|---|
| tatcgacata cttgggaccg acatgatgaa ggtgcagctc aaggtgatga tgatgtgtgg | 1200 |
| acctcgggat cagactcaga tgaagagttg gttactactg aacgtaagac acctagagtt | 1260 |
| acaggaggag gtgccatggc tggtgcttca acatcggcag gtcgtaagcg taagtcagct | 1320 |
| tcgtcggcga cagcatgcac atcaggagta atgacgagag gtagacttaa ggcagagtcg | 1380 |
| acagtagctc cagaagaaga tactgatgaa gattcggata tgaaattca taatccagct | 1440 |
| gtctttacat ggcctccatg gcaggcagga atcttggcac gtaaccttgt gccaatggtt | 1500 |
| gctaccgttc aaggacagaa cttgaagtat caagaattct tctgggatgc aaacgacatc | 1560 |
| tatagaatat tcgctgaact agaaggagta tggcaacctg cagctcaacc gaagagaaga | 1620 |
| agacatcgac aagaagcatt gcctggacct tgcatagcat ctacgcctaa gaagcataga | 1680 |
| ggt | 1683 |

<210> SEQ ID NO 7
<211> LENGTH: 2094
<212> TYPE: DNA
<213> ORGANISM: Artificial Sequence
<220> FEATURE:
<223> OTHER INFORMATION: codon-optimized gB sequence

<400> SEQUENCE: 7

| | |
|---|---|
| atggagagta gaatttggtg tctagttgtc tgcgttaact tgtgcattgt ttgcttgggt | 60 |
| gcggctgtgt cgtcctcctc gacgcgtgga acaagtgcta cccattcgca ccattcatcc | 120 |
| cacaccactt ccgcggccca ctctcgttcg ggttcggtgt cgcaaagagt tacatccagt | 180 |
| caaactgttt ctcacggagt taatgagacg atatataaca ccactcttaa atacggagac | 240 |
| gtcgtcggtg ttaatacaac gaaatatcct tacagagtgt gctccatggc acaaggaact | 300 |
| gatcttatac gtttcgagag aaatatcgtt tgtacatcta tgaagcctat caacgaggat | 360 |
| ttggatgagg gaataatggt ggtctacaag cgtaacatcg tagcacatac atttaaggtc | 420 |
| agagtctatc agaaagtatt aacctttcgt cgaagttatg cctacattca cacgacttat | 480 |
| cttctaggat caaacactga gtacgttgcg ccaccgatgt gggagataca tcacatcaat | 540 |
| tctcattcgc agtgctattc ctcgtattca agagttatcg cgggtacggt cttcgtagca | 600 |
| tatcatagag atagttatga gaataagact atgcagctta tgccagacga ttacagtaac | 660 |
| acacacagta tctcgttatgt gacagttaaa gaccaatggc actcccgagg ttcaacgtgg | 720 |
| ttgtatcgag aaacttgtaa tcttaattgt atggtaacaa taacgaccgc ccgatcgaaa | 780 |
| tatccttatc acttcttcgc tacatcaaca ggtgatgtgg tcgacatctc gccattctat | 840 |
| aacggtacga atcgtaacgc ctcatacttt ggagagaatg cggataagtt cttcatcttt | 900 |
| ccaaattaca ctattgttag tgactttggt cgtccgaact ccgcactaga gactcatcga | 960 |
| ttagtcgcgt tcttagagcg agccgactca gtcatctctt gggatataca agacgagaag | 1020 |
| aatgttactt gccagttgac gttctgggag gcatcggaga gaactattcg ttccgaggct | 1080 |
| gaggactcct accatttctc ctctgcaaag atgacggcaa cttttcctatc gaagaaacag | 1140 |
| gaggtcaaca tgtcggattc tgcccttgac tgtgttcgag acgaggcaat caataagctt | 1200 |
| cagcaaatct tcaacaccag ttacaaccaa acatacgaga aatatggtaa tgtgtctgta | 1260 |
| ttcgagacaa ccggtggact tgtggtattc tggcagggaa tcaaacagaa gtcgttagta | 1320 |
| gagttggaac gtctagcaaa tcgaagttcg ttgaatctta cccataaccg taccaagcgt | 1380 |
| tccacgcgatg gaaataacgc gacccattta tctaatatgg gagagtgtaca caacttagta | 1440 |
| tatgctcaac tacaattcac gtacgataca ctacgaggtt acataaacag agctttagcc | 1500 |

| | |
|---|---|
| cagatagcgg aagcctggtg cgtcgatcaa agacgtaccc ttgaggtctt caaggaattg | 1560 |
| tccaagataa acccgtctgc tatcttgtcg gctatataca ataaaccgat agccgcgcga | 1620 |
| tttatgggag acgtattagg attagcctct tgcgtaacta tcaatcagac gtcggtcaag | 1680 |
| gtccttcgtg atatgaacgt gaaggaatct cccggaagat gttattcccg tcccgtggtg | 1740 |
| atcttcaact ttgcaaactc atcttacgtt cagtacggtc aacttggtga agataacgaa | 1800 |
| atactacttg gtaatcaccg aacggaggaa tgtcaattgc cttcccttaa gatcttcatt | 1860 |
| gcaggtaact ctgcatatga atatgttgat tatttgttta agagaatgat tgatttgtcc | 1920 |
| tctatatcaa cagtagactc aatgattgcc ctagatattg atccacttga aacacagac | 1980 |
| ttccgagtct tggaattata ctcccagaaa gagcttcgat catcaaacgt atttgatctt | 2040 |
| gaagaaatca tgcgagaatt taactcctat aaacagcgtg tgaaatatgt agag | 2094 |

<210> SEQ ID NO 8
<211> LENGTH: 1221
<212> TYPE: DNA
<213> ORGANISM: Artificial Sequence
<220> FEATURE:
<223> OTHER INFORMATION: codon-optimized IE1 sequence

<400> SEQUENCE: 8

| | |
|---|---|
| atggtgaagc aaatcaaggt cagagtggac atggtaagac acagaattaa ggaacacatg | 60 |
| ttgaagaagt atactcaaac agaggagaag ttcaccggtg ccttcaatat gatgggtgga | 120 |
| tgtctacaga acgctttgga tatcttagat aaggtacatg aaccattcga agaaatgaag | 180 |
| tgcattggat tgacaatgca atcaatgtat gagaactaca tagtgccaga ggataagcgt | 240 |
| gaaatgtgga tggcatgcat caaggagtta catgatgtat ccaaaggagc agccaacaag | 300 |
| ctaggtggtg ctttgcaagc gaaggcaaga gcgaagaagg atgaattgag acgaaagatg | 360 |
| atgtacatgt gctatcgaaa catcgaattc ttcactaaga actcagcgtt tcctaagact | 420 |
| accaatggat gcagtcaagc tatggctgcg cttcagaact tgcctcaatg tagtcctgat | 480 |
| gaaatcatgg catatgcaca gaagatcttc aagatcttag atgaggaaag agacaaggta | 540 |
| ttgactcata tcgatcacat attcatggat atactaacaa catgtgtaga aacgatgtgt | 600 |
| aacgagtaca aggtaacttc ggacgcttgt atgatgacta tgtacggagg aatatctcta | 660 |
| cttagtgagt tctgtcgagt tctatgctgt tacgtattag aagaaactag tgtaatgtta | 720 |
| gcgaagagac cattgatcac taagcctgaa gtgatctcgg ttatgaagag acgaatagag | 780 |
| gagatctgta tgaaggtgtt cgcacaatac atcttaggag ctgatcctct aagagtgtgt | 840 |
| agtccatcgg tagacgattt gagagctata gcggaggaat ctgacgagga gaggcaata | 900 |
| gttgcataca cacttgctac agctggagta tccagttctg attctcttgt aagtcctccg | 960 |
| gagtcacctg tgccagcaac catacccgttg agtagtgtga ttgtggctga gaactcggat | 1020 |
| caggaagagt ctgagcaatc cgatgaagaa gaggaggaag agcacaaga ggagagaaa | 1080 |
| gatactgtct ctgtgaagag tgaacctgta tctgaaatcg aggaagtagc acctgaggaa | 1140 |
| gaggaggatg gagccgaaga accaacagct tcgggtggta agtcaactca tccgatggta | 1200 |
| accagatcta aggcagacca g | 1221 |

<210> SEQ ID NO 9
<211> LENGTH: 77
<212> TYPE: DNA
<213> ORGANISM: Artificial Sequence
<220> FEATURE:

<223> OTHER INFORMATION: forward primer

<400> SEQUENCE: 9
gaatatgact aaaccgatga ccatttaaaa acccctctct agctttcact aaaaattgaa    60
aataaataca aaggttc                                                  77

<210> SEQ ID NO 10
<211> LENGTH: 70
<212> TYPE: DNA
<213> ORGANISM: Artificial Sequence
<220> FEATURE:
<223> OTHER INFORMATION: reverse primer

<400> SEQUENCE: 10
ataatgtttt tatattatac atgttctaaa agaataatcg atacagttta ctagtataaa    60
aaggcgcgcc                                                          70

<210> SEQ ID NO 11
<211> LENGTH: 84
<212> TYPE: DNA
<213> ORGANISM: Artificial Sequence
<220> FEATURE:
<223> OTHER INFORMATION: forward primer

<400> SEQUENCE: 11
aattgtactt tgtaatataa tgatatatat tttcacttta tctcatttga tttttataaa    60
aattgaaaat aaatacaaag gttc                                          84

<210> SEQ ID NO 12
<211> LENGTH: 70
<212> TYPE: DNA
<213> ORGANISM: Artificial Sequence
<220> FEATURE:
<223> OTHER INFORMATION: reverse primer

<400> SEQUENCE: 12
attccgaaat ctgtacatca tgcagtggtt aaacaaaaac attttattc ctagtataaa    60 aaggcgcgcc                                                          70

<210> SEQ ID NO 13
<211> LENGTH: 80
<212> TYPE: DNA
<213> ORGANISM: Artificial Sequence
<220> FEATURE:
<223> OTHER INFORMATION: forward primer

<400> SEQUENCE: 13
atatgaatat gatttcagat actatatttg ttcctgtaga taataactaa aaattttat    60 ctagtataaa aaggcgcgcc                                               80

<210> SEQ ID NO 14
<211> LENGTH: 80
<212> TYPE: DNA
<213> ORGANISM: Artificial Sequence
<220> FEATURE:
<223> OTHER INFORMATION: reverse primer

<400> SEQUENCE: 14
ggaaaatttt tcatctctaa aaaagatgt ggtcattaga gtttgatttt tataaaaatt    60 gaaataaat acaaaggttc                                                80

```
<210> SEQ ID NO 15
<211> LENGTH: 79
<212> TYPE: DNA
<213> ORGANISM: Artificial Sequence
<220> FEATURE:
<223> OTHER INFORMATION: forward primer

<400> SEQUENCE: 15
ttggggaaat atgaacctga catgattaag attgctcttt cggtggctgg taaaaaattg      60
aaaataaata caaaggttc                                                   79

<210> SEQ ID NO 16
<211> LENGTH: 70
<212> TYPE: DNA
<213> ORGANISM: Artificial Sequence
<220> FEATURE:
<223> OTHER INFORMATION: reverse primer

<400> SEQUENCE: 16
acaaaattat gtattttgtt ctatcaacta cctataaaac tttccaaata ctagtataaa      60
aaggcgcgcc                                                             70

<210> SEQ ID NO 17
<211> LENGTH: 84
<212> TYPE: DNA
<213> ORGANISM: Artificial Sequence
<220> FEATURE:
<223> OTHER INFORMATION: forward primer

<400> SEQUENCE: 17
ggaaagaatc tactcatcta aacgatttag taaacttgac taaatcttaa tttttataaa      60
aattgaaaat aaatacaaag gttc                                             84

<210> SEQ ID NO 18
<211> LENGTH: 70
<212> TYPE: DNA
<213> ORGANISM: Artificial Sequence
<220> FEATURE:
<223> OTHER INFORMATION: reverse primer

<400> SEQUENCE: 18
taaattttaa gttttacgtg gtaagtttta atatttaact aatacattag ctagtataaa      60
aaggcgcgcc                                                             70

<210> SEQ ID NO 19
<211> LENGTH: 80
<212> TYPE: DNA
<213> ORGANISM: Artificial Sequence
<220> FEATURE:
<223> OTHER INFORMATION: forward primer

<400> SEQUENCE: 19
ggtttattgg attcgtgtaa tcatatattt tgcataacat gcatcatttt tataaaaatt      60
gaaaataaat acaaaggttc                                                  80

<210> SEQ ID NO 20
<211> LENGTH: 77
<212> TYPE: DNA
<213> ORGANISM: Artificial Sequence
<220> FEATURE:
<223> OTHER INFORMATION: reverse primer

<400> SEQUENCE: 20
```

```
acaattatcc gacgcaccgg tttctcttcg tgttctatgc catatattga tttttatcta    60
gtataaaaag gcgcgcc                                                   77
```

<210> SEQ ID NO 21
<211> LENGTH: 80
<212> TYPE: DNA
<213> ORGANISM: Artificial Sequence
<220> FEATURE:
<223> OTHER INFORMATION: forward primer

<400> SEQUENCE: 21

```
attgtttata ctcaagatat tcgttaaacg aattaaaatt atttaatttt tataaaaatt    60
gaaaataaat acaaaggttc                                                80
```

<210> SEQ ID NO 22
<211> LENGTH: 77
<212> TYPE: DNA
<213> ORGANISM: Artificial Sequence
<220> FEATURE:
<223> OTHER INFORMATION: reverse primer

<400> SEQUENCE: 22

```
aggaacagat taatccagac gattgttgtc tggatatggg aatgtattaa tttttatcta    60
gtataaaaag gcgcgcc                                                   77
```

<210> SEQ ID NO 23
<211> LENGTH: 80
<212> TYPE: DNA
<213> ORGANISM: Artificial Sequence
<220> FEATURE:
<223> OTHER INFORMATION: forward primer

<400> SEQUENCE: 23

```
attgataata taaatatgag cattagtatt tctgtggatt aatagatttt tataaaaatt    60
gaaaataaat acaaaggttc                                                80
```

<210> SEQ ID NO 24
<211> LENGTH: 77
<212> TYPE: DNA
<213> ORGANISM: Artificial Sequence
<220> FEATURE:
<223> OTHER INFORMATION: reverse primer

<400> SEQUENCE: 24

```
ttatgaggta tttagagatt agagatgatt aatgatcccc atactagaaa tttttatcta    60
gtataaaaag gcgcgcc                                                   77
```

<210> SEQ ID NO 25
<211> LENGTH: 23
<212> TYPE: DNA
<213> ORGANISM: Artificial Sequence
<220> FEATURE:
<223> OTHER INFORMATION: primer

<400> SEQUENCE: 25

```
tggatgacaa ctcaaacatc tgc                                            23
```

<210> SEQ ID NO 26
<211> LENGTH: 20
<212> TYPE: DNA
<213> ORGANISM: Artificial Sequence
<220> FEATURE:
<223> OTHER INFORMATION: primer

<400> SEQUENCE: 26
tttcctcgtt tggatctcac                                              20

<210> SEQ ID NO 27
<211> LENGTH: 20
<212> TYPE: DNA
<213> ORGANISM: Artificial Sequence
<220> FEATURE:
<223> OTHER INFORMATION: primer

<400> SEQUENCE: 27
tgccactcat cgcagtactg                                              20

<210> SEQ ID NO 28
<211> LENGTH: 21
<212> TYPE: DNA
<213> ORGANISM: Artificial Sequence
<220> FEATURE:
<223> OTHER INFORMATION: primer

<400> SEQUENCE: 28
aggcatttca gtcagttgct c                                            21

<210> SEQ ID NO 29
<211> LENGTH: 25
<212> TYPE: DNA
<213> ORGANISM: Artificial Sequence
<220> FEATURE:
<223> OTHER INFORMATION: primer

<400> SEQUENCE: 29
ttaactcagt ttcaatacgg tgcag                                        25

<210> SEQ ID NO 30
<211> LENGTH: 19
<212> TYPE: PRT
<213> ORGANISM: Artificial Sequence
<220> FEATURE:
<223> OTHER INFORMATION: primer

<400> SEQUENCE: 30

Thr Gly Gly Gly Gly Thr Thr Thr Cys Thr Cys Ala Gly Gly Cys Thr
1               5                   10                  15

Ala Thr Cys

<210> SEQ ID NO 31
<211> LENGTH: 15
<212> TYPE: PRT
<213> ORGANISM: Artificial Sequence
<220> FEATURE:
<223> OTHER INFORMATION: gH immunodominant peptide

<400> SEQUENCE: 31

Pro His Gly Trp Lys Glu Ser His Thr Thr Ser Gly Leu His Arg
1               5                   10                  15

<210> SEQ ID NO 32
<211> LENGTH: 15
<212> TYPE: PRT
<213> ORGANISM: Artificial Sequence
<220> FEATURE:
<223> OTHER INFORMATION: gH immunodominant peptide

<400> SEQUENCE: 32

Thr Gln Gly Val Ile Asn Ile Met Tyr Met His Asp Ser Asp Asp
1               5                   10                  15

<210> SEQ ID NO 33
<211> LENGTH: 15
<212> TYPE: PRT
<213> ORGANISM: Artificial Sequence
<220> FEATURE:
<223> OTHER INFORMATION: gH immunodominant peptide

<400> SEQUENCE: 33

Leu Ile Arg Tyr Arg Pro Val Thr Pro Glu Ala Ala Asn Ser Val
1               5                   10                  15

<210> SEQ ID NO 34
<211> LENGTH: 15
<212> TYPE: PRT
<213> ORGANISM: Artificial Sequence
<220> FEATURE:
<223> OTHER INFORMATION: UL128 immunodominant peptide

<400> SEQUENCE: 34

Asn Lys Leu Thr Ser Cys Asn Tyr Asn Pro Leu Tyr Leu Glu Ala
1               5                   10                  15

<210> SEQ ID NO 35
<211> LENGTH: 15
<212> TYPE: PRT
<213> ORGANISM: Artificial Sequence
<220> FEATURE:
<223> OTHER INFORMATION: UL130 immunodominant peptide

<400> SEQUENCE: 35

Lys Leu Thr Tyr Ser Lys Pro His Asp Ala Ala Thr Phe Tyr Cys
1               5                   10                  15

<210> SEQ ID NO 36
<211> LENGTH: 15
<212> TYPE: PRT
<213> ORGANISM: Artificial Sequence
<220> FEATURE:
<223> OTHER INFORMATION: UL131A immunodominant peptide

<400> SEQUENCE: 36

Leu Asn Tyr His Tyr Asp Ala Ser His Gly Leu Asp Asn Phe Asp
1               5                   10                  15

<210> SEQ ID NO 37
<211> LENGTH: 22
<212> TYPE: PRT
<213> ORGANISM: Artificial Sequence
<220> FEATURE:
<223> OTHER INFORMATION: P2A peptide

<400> SEQUENCE: 37

Gly Ser Gly Ala Thr Asn Phe Ser Leu Leu Lys Gln Ala Gly Asp Val
1               5                   10                  15

Glu Glu Asn Pro Gly Pro
            20

<210> SEQ ID NO 38
<211> LENGTH: 66
<212> TYPE: DNA
<213> ORGANISM: Artificial Sequence
<220> FEATURE:
<223> OTHER INFORMATION: P2A1

```
<400> SEQUENCE: 38
ggatcgggag cgactaactt ctcattgttg aaacaggcag agagatgtcga agagaaccct    60 ggtcca                                                                66

<210> SEQ ID NO 39
<211> LENGTH: 66
<212> TYPE: DNA
<213> ORGANISM: Artificial Sequence
<220> FEATURE:
<223> OTHER INFORMATION: P2A2

<400> SEQUENCE: 39
ggttccggtg caacgaattt ctcccttcta aagcaagccg gtgacgtgga ggagaatccc    60
ggaccc                                                                66

<210> SEQ ID NO 40
<211> LENGTH: 65
<212> TYPE: DNA
<213> ORGANISM: Artificial Sequence
<220> FEATURE:
<223> OTHER INFORMATION: P2A3

<400> SEQUENCE: 40
ggtagtggtg ccaccatttc tcgttactta aacaagcggg tgacgttgaa gagaatccgg    60
gacct                                                                 65

<210> SEQ ID NO 41
<211> LENGTH: 66
<212> TYPE: DNA
<213> ORGANISM: Artificial Sequence
<220> FEATURE:
<223> OTHER INFORMATION: P2A4

<400> SEQUENCE: 41
ggatcaggag ctacaaactt tagtctatta aagcaggctg gagatgtaga ggagaaccca    60
ggtccg                                                                66

<210> SEQ ID NO 42
<211> LENGTH: 66
<212> TYPE: DNA
<213> ORGANISM: Artificial Sequence
<220> FEATURE:
<223> OTHER INFORMATION: P2A5

<400> SEQUENCE: 42
ggaagcggag ctactaactt cagcctgctg aagcaggctg gagacgtgga ggagaaccct    60
ggacct                                                                66

<210> SEQ ID NO 43
<211> LENGTH: 66
<212> TYPE: DNA
<213> ORGANISM: Artificial Sequence
<220> FEATURE:
<223> OTHER INFORMATION: P2A6

<400> SEQUENCE: 43
ggaagtggag ctacgaactt ctcattgttg aagcaagctg gagatgtcga agagaatcct    60
ggacca                                                                66
```